United States Patent
Liu et al.

(10) Patent No.: US 12,267,845 B2
(45) Date of Patent: Apr. 1, 2025

(54) COMMUNICATION METHOD AND APPARATUS

(71) Applicant: Huawei Technologies Co., Ltd., Shenzhen (CN)

(72) Inventors: Rongkuan Liu, Shanghai (CN); Peng Zhang, Shanghai (CN); Hua Xu, Ottawa (CA); Chixiang Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

(21) Appl. No.: 17/703,728

(22) Filed: Mar. 24, 2022

(65) Prior Publication Data

US 2022/0217690 A1 Jul. 7, 2022

Related U.S. Application Data

(63) Continuation of application No. PCT/CN2020/117191, filed on Sep. 23, 2020.

(30) Foreign Application Priority Data

Sep. 25, 2019 (CN) .......................... 201910911680.5

(51) Int. Cl.
*H04W 72/04* (2023.01)
*H04W 4/40* (2018.01)
(Continued)

(52) U.S. Cl.
CPC ............. *H04W 72/23* (2023.01); *H04W 4/40* (2018.02); *H04W 72/0446* (2013.01); *H04W 72/0453* (2013.01)

(58) Field of Classification Search
CPC ............. H04W 72/23; H04W 72/0446; H04W 72/0453; H04W 72/20; H04W 72/044;
(Continued)

(56) References Cited

U.S. PATENT DOCUMENTS

| | | |
|---|---|---|
| 2016/0234754 A1 | 8/2016 | Baghel |
| 2017/0150330 A1 | 5/2017 | Kim et al. |
| 2019/0020381 A1* | 1/2019 | Tooher ................. H04W 88/04 |

FOREIGN PATENT DOCUMENTS

| | | |
|---|---|---|
| CN | 108512576 A | 9/2018 |
| CN | 110099366 A | 8/2019 |

(Continued)

OTHER PUBLICATIONS

"Support for UE Cooperation in NR," 3GPP TSG RAN WG1 Meeting #85, Nanjing, China, R1-164379, Total 7 pages, 3rd Generation Partnership Project, Valbonne, France (May 23-27, 2016).

*Primary Examiner* — Jamal Javaid
(74) *Attorney, Agent, or Firm* — Leydig, Voit & Mayer, Ltd.

(57) ABSTRACT

This application discloses a communication method and apparatus. The communication method and apparatus are applicable to an Internet of Vehicles, or are applicable to fields such as D2D, intelligent driving, and intelligent network connected vehicles. The method includes: A network apparatus determines an $i^{th}$ sidelink transmission resource of an $i^{th}$ cooperation terminal apparatus, where the $i^{th}$ cooperation terminal apparatus belongs to N cooperation terminals, the $i^{th}$ sidelink transmission resource belongs to the $1^{st}$ sidelink transmission resource to an $N^{th}$ sidelink transmission resource, the $i^{th}$ sidelink transmission resource is different from a $j^{th}$ sidelink transmission resource, the $j^{th}$ sidelink transmission resource is a sidelink transmission resource that is of a $j^{th}$ cooperation terminal apparatus and that is determined by the network apparatus, the $i^{th}$ sidelink transmission resource is used by the $i^{th}$ cooperation terminal apparatus to send second data to a target terminal apparatus, the second data is determined based on first data sent by the network apparatus to the $i^{th}$ cooperation terminal apparatus, (Continued)

and the N cooperation terminal apparatuses and the target terminal apparatus belong to a same cooperative transmission group. The network apparatus sends the $i^{th}$ sidelink transmission resource to the $i^{th}$ cooperation terminal apparatus and the target terminal apparatus.

20 Claims, 11 Drawing Sheets

(51) Int. Cl.
*H04W 72/0446* (2023.01)
*H04W 72/0453* (2023.01)
*H04W 72/23* (2023.01)

(58) Field of Classification Search
CPC ..... H04W 72/0466; H04W 4/40; H04W 4/70; H04W 76/14
See application file for complete search history.

(56) References Cited

FOREIGN PATENT DOCUMENTS

| | | |
|---|---|---|
| CN | 110100462 A | 8/2019 |
| EP | 3148283 A1 | 3/2017 |
| WO | 2019099535 A1 | 5/2019 |

* cited by examiner

COMMUNICATION METHOD AND APPARATUS

CROSS-REFERENCE TO RELATED APPLICATIONS

This application is a continuation of International Application No. PCT/CN2020/117191, filed on Sep. 23, 2020, which claims priority to Chinese Patent Application No. 201910911680.5, filed on Sep. 25, 2019. The disclosures of the aforementioned applications are hereby incorporated by reference in their entireties.

TECHNICAL FIELD

This application relates to the field of communication technologies, and in particular, to a communication method and apparatus.

BACKGROUND

New wireless service types such as an Internet of Things service and an autonomous driving service impose higher requirements on a next-generation wireless communication system, namely, a 5G system. To further improve a capacity of the 5G system and coverage of a network, the 5G system provides a communication manner through user cooperation. Before the communication through user cooperation, a user cooperation group may be established for a target terminal apparatus, and the user cooperation group may include N cooperation terminal apparatuses. Each cooperation terminal apparatus may perform sidelink transmission with the target terminal apparatus. In this way, a base station may send same downlink data to all the terminal apparatuses in the user cooperation group, and each cooperation terminal apparatus may transmit the received downlink data to the target terminal apparatus through the sidelink transmission, to enhance receiving of a signal including the downlink data by the target terminal apparatus.

In a conventional technology, there are two transmission modes: a base station allocation mode, which is defined as a mode 3 in an LTE standard; and a user autonomous-selection mode, which is defined as a mode 4 in the LTE standard.

In the base station allocation mode, a communication process through user cooperation may specifically include two phases:

In the first phase, namely, a downlink transmission phase, a base station sends downlink data to each cooperation terminal apparatus in a cooperative transmission group to which a target terminal apparatus belongs.

In the second phase, namely, a sidelink transmission phase, the cooperation terminal apparatus forwards, to the target terminal apparatus on an established sidelink, the downlink data sent by the base station in the first phase, and the target terminal apparatus receives, on the established sidelink, sidelink data sent by the cooperation terminal apparatus to the target terminal apparatus.

In the conventional technology, especially in the sidelink transmission phase, there is only an end-to-end resource allocation manner but no mature solution to resource allocation in cooperative transmission.

SUMMARY

This application provides a communication method and apparatus, applicable to an Internet of Vehicles such as V2X, LTE-V, and V2V, or applicable to fields such as D2D, intelligent driving, and intelligent network connected vehicles, to allocate sidelink transmission resources for cooperative transmission together, and improve efficiency and transmission performance of the cooperative transmission.

According to a first aspect, a communication method is provided. The method includes:

A network apparatus determines an $i^{th}$ sidelink transmission resource of an $i^{th}$ cooperation terminal apparatus, where the $i^{th}$ cooperation terminal apparatus belongs to N cooperation terminals, and the $i^{th}$ sidelink transmission resource belongs to the $1^{st}$ sidelink transmission resource to an $N^{th}$ sidelink transmission resource, where i is an integer greater than or equal to 1 and less than or equal to N, and N is an integer greater than or equal to 1; the $i^{th}$ sidelink transmission resource is different from a $j^{th}$ sidelink transmission resource, the $j^{th}$ sidelink transmission resource is a sidelink transmission resource that is of a $j^{th}$ cooperation terminal apparatus and that is determined by the network apparatus, and the $j^{th}$ cooperation terminal apparatus belongs to the N cooperation terminals, where j is an integer greater than or equal to 1 and less than or equal to N, and j is not equal to i; and the $i^{th}$ sidelink transmission resource is used by the $i^{th}$ cooperation terminal apparatus to send second data to a target terminal apparatus, the second data is determined based on first data sent by the network apparatus to the $i^{th}$ cooperation terminal apparatus, and the N cooperation terminal apparatuses and the target terminal apparatus belong to a same cooperative transmission group.

The network apparatus sends the $i^{th}$ sidelink transmission resource to the $i^{th}$ cooperation terminal apparatus and the target terminal apparatus.

According to the method provided in this embodiment of this application, sidelink transmission resources of the N cooperation terminal apparatuses in cooperative transmission may be predetermined, and configurations of the sidelink transmission resources of the N cooperation terminal apparatuses may be optimized, thereby avoiding a waste of the sidelink transmission resources, and improving spectral efficiency. In addition, sidelink transmission of the N cooperation terminal apparatuses is prevented from interfering with each other, to effectively improve performance of the cooperative transmission.

In a possible design, the method further includes: The network apparatus determines a sidelink transmission resource set, where the sidelink transmission resource set includes the $1^{st}$ sidelink transmission resource to the $N^{th}$ sidelink transmission resource. The network apparatus sends a sidelink transmission resource set indication to the N cooperation terminal apparatuses and the target terminal apparatus. That a network apparatus determines an $i^{th}$ sidelink transmission resource of an $i^{th}$ cooperation terminal apparatus includes: The network apparatus determines the $i^{th}$ sidelink transmission resource from the sidelink transmission resource set.

In the foregoing possible design, the network apparatus may predetermine the sidelink transmission resource set for the cooperative transmission. When the cooperation terminal apparatus in the cooperative transmission group needs to send sidelink data, the network apparatus further determines the $i^{th}$ sidelink transmission resource for the $i^{th}$ cooperation terminal apparatus, to improve flexibility of sidelink transmission resource allocation.

In a possible design, the $i^{th}$ sidelink transmission resource includes an $i^{th}$ time domain resource that is of the $i^{th}$ cooperation terminal apparatus and that is determined by the network apparatus based on time domain resources, where the $i^{th}$ time domain resource is a time domain resource in the $i^{th}$ sidelink transmission resource, the $i^{th}$ time domain resource is different from a $j^{th}$ time domain resource, and the $j^{th}$ time domain resource is a time domain resource that is in the $j^{th}$ sidelink transmission resource and that is determined by the network apparatus based on the time domain resources.

In the foregoing possible design, the network apparatus may determine the $i^{th}$ time domain resource in the $i^{th}$ sidelink transmission resource in a time domain multiplexing manner, to reduce a latency of the sidelink transmission.

In a possible design, the $i^{th}$ sidelink transmission resource includes an $i^{th}$ frequency domain resource that is of the $i^{th}$ cooperation terminal apparatus and that is determined by the network apparatus based on frequency domain resources, where the $i^{th}$ frequency domain resource is a frequency domain resource in the $i^{th}$ sidelink transmission resource, the $i^{th}$ frequency domain resource is different from a $j^{th}$ frequency domain resource, and the $j^{th}$ frequency domain resource is a frequency domain resource that is in the $j^{th}$ sidelink transmission resource and that is determined by the network apparatus based on time domain resources.

In the foregoing possible design, the network apparatus may determine the $i^{th}$ frequency domain resource in the $i^{th}$ sidelink transmission resource in a frequency domain multiplexing manner, to improve an anti-interference capability of the sidelink transmission.

In a possible design, the $i^{th}$ sidelink transmission resource includes an $i^{th}$ sub-resource group that is of the $i^{th}$ cooperation terminal apparatus and that is determined by the network apparatus based on time domain resources and frequency domain resources, where the $i^{th}$ sub-resource group includes N sub-resources, a time-frequency resource in any one of the N sub-resources in the $i^{th}$ sub-resource group is different from a time-frequency resource in any one of N sub-resources in a $j^{th}$ sub-resource group, the $i^{th}$ sub-resource group is a time-frequency resource in the $i^{th}$ sidelink transmission resource, and the $j^{th}$ sub-resource group is a time-frequency resource that is in the $j^{th}$ sidelink transmission resource and that is determined by the network apparatus.

In the foregoing possible design, the network apparatus may determine an $i^{th}$ time-frequency resource in the $i^{th}$ sidelink transmission resource in a time-frequency domain multiplexing manner, to reduce a latency of the sidelink transmission and improve an anti-interference capability of the sidelink transmission.

In a possible design, the $i^{th}$ sidelink transmission resource includes an $i^{th}$ reference signal sequence that is of the $i^{th}$ cooperation terminal apparatus and that is determined by the network apparatus, where the $i^{th}$ reference signal sequence is a code resource that is in the $i^{th}$ sidelink transmission resource and that is determined by the network apparatus, the $i^{th}$ reference signal sequence is different from a $j^{th}$ reference signal sequence, and the $j^{th}$ reference signal sequence is a code resource that is in the $j^{th}$ sidelink transmission resource and that is determined by the network apparatus.

In the foregoing possible design, the network apparatus may determine an $i^{th}$ code resource in the $i^{th}$ sidelink transmission resource in a code division multiplexing manner, to improve utilization of the sidelink transmission resources and improve an interference capability of the sidelink transmission.

In a possible design, the $i^{th}$ sidelink transmission resource further includes an $i^{th}$ soft combination indication field, where the $i^{th}$ soft combination indication field is used to indicate whether the second data sent by the $i^{th}$ cooperation terminal apparatus to the target terminal apparatus is data on which the target terminal apparatus is to perform soft combination.

In the foregoing possible design, the network apparatus may set the $i^{th}$ soft combination indication field in the $i^{th}$ sidelink transmission resource, so that the $i^{th}$ cooperation terminal determines, based on the $i^{th}$ soft combination indication field, whether the soft combination needs to be performed on the second data sent to the target terminal apparatus. If it is determined that the soft combination needs to be performed, the cooperation terminal apparatuses send the same second data to the target terminal apparatus. This can improve a decoding success rate of the target terminal apparatus, and further improve the performance of the cooperative transmission.

In a possible design, the network apparatus determines an $i^{th}$ soft combination indication field of the $i^{th}$ cooperation terminal apparatus, where the $i^{th}$ soft combination indication field is used to indicate whether the second data sent by the $i^{th}$ cooperation terminal apparatus to the target terminal apparatus is data on which the target terminal apparatus is to perform soft combination.

In the foregoing possible design, the network apparatus may additionally allocate the $i^{th}$ soft combination indication field, to flexibly indicate whether the second data sent by the $i^{th}$ cooperation terminal apparatus is the data on which the soft combination needs to be performed, thereby improving flexibility of the sidelink transmission.

In a possible design, the $i^{th}$ soft combination indication field includes a first time offset and/or a second time offset, where the first time offset is used to indicate that, if the target terminal apparatus receives the second data from the $i^{th}$ cooperation terminal apparatus at a second moment obtained by increasing a first moment by the time offset, the second data is determined as the data on which the target terminal apparatus is to perform soft combination, where the first moment is a moment of receiving sidelink control signaling sent by the $i^{th}$ cooperation terminal apparatus; and the second time offset is used to indicate that, if the target terminal apparatus receives the second data from the $i^{th}$ cooperation terminal apparatus at a third moment obtained by increasing the first moment by the second time offset, the second data is determined as data on which the target terminal apparatus is not to perform soft combination.

In the foregoing possible design, the network apparatus may configure the first time offset and/or the second time offset, so that the cooperation terminal apparatus and the target terminal apparatus determine whether the soft combination is to be performed. This reduces overheads of control signaling required by a soft combination indication, and the configuration is flexible.

In a possible design, the $i^{th}$ sidelink transmission resource includes a first transmission resource and a second transmission resource, where the first transmission resource is used to indicate that the second data sent by the $i^{th}$ cooperation terminal apparatus to the target terminal apparatus on the first transmission resource is data on which the target terminal apparatus is to perform soft combination, and the second transmission resource is used to indicate that the second data sent by the $i^{th}$ cooperation terminal apparatus to the target terminal apparatus on the second transmission resource is data on which the target terminal apparatus is not to perform soft combination.

In the foregoing possible design, the network apparatus may configure the first transmission resource and the second transmission resource, so that the cooperation terminal apparatus sends, on the first transmission resource or the second transmission resource, the data on which the soft combination is to be performed, thereby reducing overheads of control signaling required by a soft combination indication, and resolving a problem that the target terminal apparatus may fail to correctly receive the data on which the soft combination is or is not to be performed, where the problem is caused by a latency and may occur in the design of determining the soft combination indication field by using the first time offset and/or the second time offset.

In a possible design, the first transmission resource includes one or more of the following: a first time-frequency resource and a first code resource; and the second transmission resource includes one or more of the following: a second time-frequency resource and a second code resource.

In the foregoing possible design, the network apparatus configures the first transmission resource and the second transmission resource, to determine, based on a time domain resource, a frequency domain resource, a code domain resource, or the like, whether the soft combination is to be performed, to reduce resource overheads.

In a possible design, the $i^{th}$ sidelink transmission resource further includes an $i^{th}$ redundancy version set, where the $i^{th}$ redundancy version set includes at least one redundancy version, the redundancy version set is used by the $i^{th}$ cooperation terminal apparatus to determine a first redundancy version in the redundancy version set, the first redundancy version is used by the $i^{th}$ cooperation terminal apparatus to determine, based on the first redundancy version, a start location at which the $i^{th}$ cooperation terminal apparatus is to send third data on which soft combination needs to be performed, and the third data is generated by the $i^{th}$ cooperation terminal based on the first data received from the network apparatus.

In the foregoing possible design, the network apparatus may configure the redundancy version, so that the cooperation terminal apparatus sends the third data based on the redundancy version, where the third data is a part or all of the second data; and further the target terminal apparatus may receive signals of more data, to improve a decoding success rate in the cooperative transmission, and further improve the performance of the cooperative transmission.

In a possible design, the $i^{th}$ sidelink transmission resource further includes an $i^{th}$ redundancy version set, where the $i^{th}$ redundancy version set includes at least one redundancy version, the redundancy version is used by the $i^{th}$ cooperation terminal apparatus to determine a second redundancy version based on an intra-group identifier of the $i^{th}$ cooperation terminal apparatus in the cooperative transmission group, the second redundancy version is used by the $i^{th}$ cooperation terminal apparatus to determine, based on the second redundancy version, a start location at which the $i^{th}$ cooperation terminal apparatus is to send third data on which soft combination needs to be performed, and the third data is generated by the $i^{th}$ cooperation terminal apparatus based on the first data received from the network apparatus.

In the foregoing possible design, the network apparatus may configure the $i^{th}$ redundancy version set, so that the $i^{th}$ cooperation terminal apparatus determines the corresponding redundancy version based on the intra-group identifier, and the $i^{th}$ redundancy version set may be reused in a plurality of times of cooperative transmission. This can reduce resources occupied by transmission resource allocation in the plurality of times of cooperative transmission, reduce resource overheads, and improve the spectral efficiency.

According to a second aspect, a communication method is provided. A network apparatus determines an $i^{th}$ sidelink transmission resource of N cooperation terminal apparatuses, where the $i^{th}$ sidelink transmission resource belongs to the $1^{st}$ sidelink transmission resource to an $N^{th}$ sidelink transmission resource, where i is an integer greater than or equal to 1 and less than or equal to N, and N is an integer greater than or equal to 1; the $i^{th}$ sidelink transmission resource is different from a $j^{th}$ sidelink transmission resource, where j is an integer greater than or equal to 1 and less than or equal to N, and j is not equal to i; and the $i^{th}$ sidelink transmission resource is a sidelink transmission resource of the N cooperation terminal apparatuses that is determined by the network apparatus, the $i^{th}$ sidelink transmission resource is used by the N cooperation terminal apparatuses to send second data to a target terminal apparatus, the second data is determined based on first data sent by the network apparatus to an $i^{th}$ cooperation terminal apparatus, and the N cooperation terminal apparatuses and the target terminal apparatus belong to a same cooperative transmission group. The network apparatus sends the sidelink transmission resource to the N cooperation terminal apparatuses and the target terminal apparatus.

In the foregoing possible design, because the cooperation terminal apparatuses send the same second data to the target terminal apparatus, the network apparatus may configure the same sidelink transmission resource for the N cooperation terminal apparatuses, to reduce sidelink transmission resource consumption.

In a possible design, the network apparatus determines a sidelink transmission resource set, where the sidelink transmission resource set includes the $1^{st}$ sidelink transmission resource to the $N^{th}$ sidelink transmission resource. The network apparatus sends a sidelink transmission resource set indication to the N cooperation terminal apparatuses and the target terminal apparatus. That a network apparatus determines a sidelink transmission resource of N cooperation terminal apparatuses includes: The network apparatus determines the $i^{th}$ sidelink transmission resource from the sidelink transmission resource set.

In the foregoing possible design, because the cooperation terminal apparatuses send the same second data to the target terminal apparatus, the network apparatus may configure the same sidelink transmission resource in the sidelink transmission resource set for the N cooperation terminal apparatuses, and the sidelink transmission resource may be the $i^{th}$ sidelink transmission resource. This can reduce complexity of configuring the sidelink transmission resource, and improve flexibility of configuring the sidelink transmission resource.

According to a third aspect, a communication method is provided. The method includes:

A first cooperation terminal apparatus receives a first sidelink transmission resource from a network apparatus, where the first cooperation terminal apparatus is an $i^{th}$ cooperation terminal apparatus in N cooperation terminals, and the first sidelink transmission resource is an $i^{th}$ sidelink transmission resource in the $1^{st}$ sidelink transmission resource to an $N^{th}$ sidelink transmission resource, where i is an integer greater than or equal to 1 and less than or equal to N, and N is an integer greater than or equal to 1: the $i^{th}$ sidelink transmission resource is different from a $j^{th}$ sidelink transmission resource, the $j^{th}$ sidelink transmission resource is a sidelink transmission resource of a $j^{th}$ cooperation terminal apparatus, and the $j^{th}$ cooperation terminal apparatus belongs to the N cooperation terminals, where j is an integer greater than or equal to 1 and less than or equal to N, and j is not equal to i; and the N cooperation terminal apparatuses and a target terminal apparatus belong to a same cooperative transmission group.

The first cooperation terminal apparatus sends second data to the target terminal apparatus on the first sidelink transmission resource, where the second data is determined by the first cooperation terminal apparatus based on first data received from the network apparatus.

According to the method provided in this embodiment of this application, the first cooperation terminal apparatus may predetermine the $i^{th}$ sidelink transmission resource, and the $i^{th}$ sidelink transmission resource is different from the $j^{th}$ sidelink transmission resource of the $j^{th}$ cooperation terminal apparatus, so that sidelink transmission of the N cooperation terminal apparatuses can be effectively prevented from interfering with each other, and performance of cooperative transmission can be effectively improved.

In a possible design, the first cooperation terminal apparatus receives a sidelink transmission resource set indication from the network apparatus, where a sidelink transmission resource set includes the $1^{st}$ sidelink transmission resource to the $N^{th}$ sidelink transmission resource, and the first sidelink transmission resource is the $i^{th}$ sidelink transmission resource in the sidelink transmission resource set.

In the foregoing possible design, the first cooperation terminal apparatus may first receive the sidelink transmission resource set predetermined by the network apparatus for the cooperative transmission, and then receive, in a cooperative transmission process, the $i^{th}$ sidelink transmission resource configured by the network apparatus for the first cooperation terminal apparatus, to effectively improve flexibility of sidelink transmission resource allocation.

In a possible design, the first cooperation terminal apparatus sends first indication information to the target terminal apparatus, where the first indication information is used to indicate that the first cooperation terminal apparatus does not correctly decode the first data.

In the foregoing possible design, the first cooperation terminal apparatus may send a decoding result to the target terminal apparatus, to reduce a resource consumed by the target terminal apparatus for receiving the second data sent by the cooperation terminal apparatus, and avoid unnecessary resource overheads.

In a possible design, a time domain resource in the $i^{th}$ sidelink transmission resource is an $i^{th}$ time domain resource, the $i^{th}$ time domain resource is different from a $j^{th}$ time domain resource, and the $j^{th}$ time domain resource is a time domain resource that is in the $j^{th}$ sidelink transmission resource and that is determined by the network apparatus based on time domain resources.

In the foregoing possible design, because the $i^{th}$ time domain resource in the $i^{th}$ sidelink transmission resource is in a time domain multiplexing manner, a latency of the sidelink transmission can be reduced.

In a possible design, a frequency domain resource in the $i^{th}$ sidelink transmission resource is an $i^{th}$ frequency domain resource, the $i^{th}$ frequency domain resource is different from a $j^{th}$ frequency domain resource, and the $j^{th}$ frequency domain resource is a frequency domain resource that is in the $j^{th}$ sidelink transmission resource and that is determined by the network apparatus based on time domain resources.

In the foregoing possible design, because the $i^{th}$ time domain resource in the $i^{th}$ sidelink transmission resource is in a frequency domain multiplexing manner, an anti-interference capability of the sidelink transmission can be improved.

In a possible design, a time-frequency resource in the $i^{th}$ sidelink transmission resource is an $i^{th}$ sub-resource group, the $i^{th}$ sub-resource group includes N sub-resources, a time-frequency resource in any one of the N sub-resources in the $i^{th}$ sub-resource group is different from a time-frequency resource in any one of N sub-resources in a $j^{th}$ sub-resource group, the $i^{th}$ sub-resource group is the time-frequency resource in the $i^{th}$ sidelink transmission resource, and the $j^{th}$ sub-resource group is a time-frequency resource that is in the $j^{th}$ sidelink transmission resource and that is determined by the network apparatus.

In the foregoing possible design, because an $i^{th}$ time domain resource in the $i^{th}$ sidelink transmission resource is in a time-frequency multiplexing manner, a latency of the sidelink transmission can be reduced, and an anti-interference capability of the sidelink transmission can be improved.

In a possible design, a code resource in the $i^{th}$ sidelink transmission resource includes an $i^{th}$ reference signal sequence, the $i^{th}$ reference signal sequence is different from a $j^{th}$ reference signal sequence, and the $j^{th}$ reference signal sequence is a code resource that is in the $j^{th}$ sidelink transmission resource and that is determined by the network apparatus.

In the foregoing possible design, because an $i^{th}$ code resource in the $i^{th}$ sidelink transmission resource is in a code division multiplexing manner, an anti-interference capability of the sidelink transmission can be improved.

In a possible design, the $i^{th}$ sidelink transmission resource further includes an $i^{th}$ soft combination indication field. The first cooperation terminal determines, based on the $i^{th}$ soft combination indication field, whether the second data sent to the target terminal apparatus is data on which the target terminal apparatus is to perform soft combination.

In the foregoing possible design, the $i^{th}$ soft combination indication field is set in the $i^{th}$ sidelink transmission resource, so that the $i^{th}$ cooperation terminal determines, based on the $i^{th}$ soft combination indication field, whether the soft combination needs to be performed on the second data sent to the target terminal apparatus. If it is determined that the soft combination needs to be performed, the cooperation terminal apparatuses send the same second data to the target terminal apparatus. This can improve a decoding success rate of the target terminal apparatus, and further improve the performance of the cooperative transmission.

In a possible design, the first cooperation terminal receives an $i^{th}$ soft combination indication field from the network apparatus. The first cooperation terminal determines, based on the $i^{th}$ soft combination indication field, whether the second data sent to the target terminal apparatus is data on which the target terminal apparatus is to perform soft combination.

In the foregoing possible design, the $i^{th}$ soft combination indication field determined by the network device is additionally received, to improve flexibility of the sidelink transmission.

In a possible design, the first cooperation terminal apparatus generates sidelink control signaling, where the sidelink control signaling includes an $i^{th}$ soft combination indication field, and the $i^{th}$ soft combination indication field is used to indicate whether the second data sent by the first cooperation terminal apparatus is data on which the target terminal apparatus is to perform soft combination.

In the foregoing possible design, the first cooperation terminal apparatus delivers the $i^{th}$ soft combination indication field to the target terminal apparatus, to improve flexibility and robustness of the sidelink transmission.

In a possible design, the $i^{th}$ soft combination indication field includes a first time offset and/or a second time offset. If determining that the second data that needs to be sent is the data on which the target terminal apparatus is to perform soft combination, the first cooperation terminal apparatus sends the second data at a second moment obtained by increasing a first moment by the first time offset, where the first moment is a moment of sending sidelink control signaling to the target terminal apparatus by the first cooperation terminal apparatus; and/or if determining that the second data that needs to be sent is data on which the target terminal apparatus is not to perform soft combination, the first cooperation terminal apparatus sends the second data at a third moment obtained by increasing the first moment by the second time offset.

In the foregoing possible design, whether to perform soft combination may be determined based on the first time offset and/or the second time offset. This reduces overheads of receiving control signaling required by a soft combination indication, and a configuration is flexible.

In a possible design, the $i^{th}$ sidelink transmission resource includes a first transmission resource and a second transmission resource. If determining that the second data that needs to be sent is data on which the target terminal apparatus is to perform soft combination, the first cooperation terminal apparatus sends the second data on the first transmission resource; and if determining that the second data that needs to be sent is data on which the target terminal apparatus is not to perform soft combination, the first cooperation terminal apparatus sends the second data on the second transmission resource.

In the foregoing possible design, the first cooperation terminal apparatus sends, on the first transmission resource or the second transmission resource, the data on which the soft combination is to be performed, thereby reducing overheads of control signaling required by a soft combination indication, and resolving a problem that the target terminal apparatus may fail to correctly receive the data on which the soft combination is or is not to be performed, where the problem is caused by a latency and may occur in the design of determining the soft combination indication field by using the first time offset and/or the second time offset.

In a possible design, the first transmission resource includes one or more of the following: a first time-frequency resource and a first code resource; and the second transmission resource includes one or more of the following: a second time-frequency resource and a second code resource.

In the foregoing possible design, whether to perform soft combination is determined based on a time domain resource, a frequency domain resource, a code domain resource, or the like, to reduce resource overheads.

In a possible design, the $i^{th}$ sidelink transmission resource further includes an $i^{th}$ redundancy version set, and the $i^{th}$ redundancy version set includes at least one redundancy version. If determining that third data needs to be sent to the target terminal apparatus, the first cooperation terminal apparatus determines a first redundancy version in the redundancy version set, and determines, based on the first redundancy version, a start location at which the cooperation terminal apparatus is to send the third data, where the third data is data that is generated by the first cooperation terminal apparatus based on the first data received from the network apparatus and on which the target terminal apparatus is to perform soft combination.

In the foregoing possible design, the first cooperation terminal apparatus sends the third data based on the determined redundancy version, where the third data is a part or all of the second data; and further the target terminal apparatus may receive signals of more data, to improve a decoding success rate in the cooperative transmission, and further improve the performance of the cooperative transmission.

In a possible design, the $i^{th}$ sidelink transmission resource further includes an $i^{th}$ redundancy version set, and the $i^{th}$ redundancy version set includes at least one redundancy version. If determining that third data needs to be sent to the target terminal apparatus, the first cooperation terminal apparatus determines a second redundancy version based on an intra-group identifier of the first cooperation terminal apparatus in the cooperative transmission group. The first cooperation terminal apparatus determines, based on the second redundancy version, a start location for sending the third data, where the third data is data that is generated by the first cooperation terminal apparatus based on the first data received from the network apparatus and on which the target terminal apparatus is to perform soft combination.

In the foregoing possible design, the first cooperation terminal apparatus may determine the corresponding redundancy version based on the intra-group identifier, and the $i^{th}$ redundancy version set may be reused in a plurality of times of cooperative transmission. This can reduce resources occupied by transmission resource allocation in the plurality of times of cooperative transmission, reduce resource overheads, and improve spectral efficiency.

According to a fourth aspect, a communication method is provided. A first cooperation terminal apparatus receives an $i^{th}$ sidelink transmission resource from a network apparatus, where the first cooperation terminal apparatus is an $i^{th}$ cooperation terminal apparatus in N cooperation terminals, the $i^{th}$ sidelink transmission resource belongs to the $1^{st}$ sidelink transmission resource to an $N^{th}$ sidelink transmission resource, the $i^{th}$ sidelink transmission resource is a sidelink transmission resource of the N cooperation terminal apparatuses, and the $i^{th}$ sidelink transmission resource is different from a $j^{th}$ sidelink transmission resource, where j is an integer greater than or equal to 1 and less than or equal to N, j is not equal to i, i is an integer greater than or equal to 1 and less than or equal to N, and N is an integer greater than or equal to 1; and the N cooperation terminal apparatuses and a target terminal apparatus belong to a same cooperative transmission group.

The first cooperation terminal apparatus sends second data to the target terminal apparatus on the $i^{th}$ sidelink transmission resource, where the second data is determined by the first cooperation terminal apparatus based on first data received from the network apparatus.

In the foregoing possible design, because the cooperation terminal apparatuses send the same second data to the target terminal apparatus, the N cooperation terminal apparatuses share the same sidelink transmission resource, to reduce resource consumption of the first cooperation terminal apparatus.

In a possible design, the first cooperation terminal apparatus receives a sidelink transmission resource set indication from the network apparatus, where a sidelink transmission resource set includes the $1^{st}$ sidelink transmission resource to the $N^{th}$ sidelink transmission resource, and the $i^{th}$ sidelink transmission resource includes the $i^{th}$ sidelink transmission resource determined by the network apparatus from the sidelink transmission resource set.

In the foregoing possible design, because the cooperation terminal apparatuses send the same second data to the target terminal apparatus, the sidelink transmission resource may be the $i^{th}$ sidelink transmission resource. This can reduce complexity of configuring the sidelink transmission resource, and improve flexibility of configuring the sidelink transmission resource.

According to a fifth aspect, a communication method is provided. A target terminal apparatus receives an $i^{th}$ sidelink transmission resource of an $i^{th}$ cooperation terminal apparatus from a network apparatus, where the $i^{th}$ cooperation terminal apparatus belongs to N cooperation terminal apparatuses, and the $i^{th}$ sidelink transmission resource belongs to the $1^{st}$ sidelink transmission resource to an $N^{th}$ sidelink transmission resource, where i is an integer greater than or equal to 1 and less than or equal to N, and N is an integer greater than or equal to 1; the $i^{th}$ sidelink transmission resource is different from a $j^{th}$ sidelink transmission resource, the $j^{th}$ sidelink transmission resource is a sidelink transmission resource of a $j^{th}$ cooperation terminal apparatus, and the $j^{th}$ cooperation terminal apparatus belongs to the N cooperation terminals, where j is an integer greater than or equal to 1 and less than or equal to N, and j is not equal to i; and the N cooperation terminal apparatuses and the target terminal apparatus belong to a same cooperative transmission group.

The target terminal apparatus receives second data from the $i^{th}$ cooperation terminal apparatus on the $i^{th}$ sidelink transmission resource, where the second data is determined by the $i^{th}$ cooperation terminal apparatus based on first data received from the network apparatus.

According to the method provided in this embodiment of this application, the target terminal apparatus may predetermine the $i^{th}$ sidelink transmission resource, and the $i^{th}$ sidelink transmission resource is different from the $j^{th}$ sidelink transmission resource of the $j^{th}$ cooperation terminal apparatus, so that sidelink transmission of the N cooperation terminal apparatuses can be effectively prevented from interfering with each other, and performance of cooperative transmission can be effectively improved.

In a possible design, the target terminal apparatus receives a sidelink transmission resource set indication from the network apparatus, where a sidelink transmission resource set includes the $1^{st}$ sidelink transmission resource to the $N^{th}$ sidelink transmission resource, and the $i^{th}$ sidelink transmission resource includes the $i^{th}$ sidelink transmission resource determined by the network apparatus from the sidelink transmission resource set.

In the foregoing possible design, the target terminal apparatus may first receive the sidelink transmission resource set predetermined by the network apparatus for the cooperative transmission, and then receive, in a cooperative transmission process, the $i^{th}$ sidelink transmission resource configured by the network apparatus for the target terminal apparatus, to effectively improve flexibility of sidelink transmission resource allocation.

In a possible design, after the target terminal apparatus receives first indication information sent by the first cooperation terminal apparatus, the target terminal apparatus skips receiving the data on the $i^{th}$ sidelink transmission resource, where the first indication information is used to indicate that the first cooperation terminal apparatus does not correctly decode the first data.

In the foregoing possible design, the target terminal apparatus may receive a decoding result from the first cooperation terminal apparatus, to reduce a resource consumed by the target terminal apparatus for receiving the second data sent by the cooperation terminal apparatus, and avoid unnecessary resource overheads.

In a possible design, the target terminal apparatus receives a sidelink control instruction from the first cooperation terminal apparatus, where the sidelink control instruction is used to indicate the $i^{th}$ sidelink transmission resource used by the first cooperation terminal apparatus to send the second data. The target terminal apparatus receives the second data from the first cooperation terminal apparatus on the $i^{th}$ sidelink transmission resource based on the sidelink control instruction.

In the foregoing possible design, the target apparatus receives the $i^{th}$ sidelink transmission resource of the $i^{th}$ cooperation terminal apparatus, to improve flexibility and robustness of the sidelink transmission.

In a possible design, the sidelink control instruction further includes an $i^{th}$ soft combination indication field. The target terminal apparatus determines, based on the $i^{th}$ soft combination indication field, whether soft combination needs to be performed on the received second data.

In the foregoing possible design, the target apparatus receives the $i^{th}$ soft combination indication field of the $i^{th}$ cooperation terminal apparatus, to improve the flexibility and the robustness of the sidelink transmission.

In a possible design, the $i^{th}$ sidelink transmission resource further includes an $i^{th}$ soft combination indication field. The target terminal apparatus determines, based on the $i^{th}$ soft combination indication field, whether soft combination needs to be performed on the received second data.

In a possible design, the $i^{th}$ soft combination indication field includes a first time offset and/or a second time offset. If determining that the second data sent by the first cooperation terminal apparatus is received at a second moment obtained by increasing a first moment by the first time offset, the target terminal apparatus determines that the soft combination needs to be performed on the second data, where the first moment is a moment of sending sidelink control signaling to the target terminal apparatus by the first cooperation terminal apparatus; and/or if determining that the second data sent by the first cooperation terminal apparatus is received at a third moment obtained by increasing the first moment by the second time offset, the target terminal apparatus determines that the soft combination does not need to be performed on the second data.

In a possible design, the $i^{th}$ sidelink transmission resource includes a first transmission resource and a second transmission resource. If receiving the second data on the first transmission resource, the target terminal apparatus determines that the second data is data on which soft combination is to be performed. If receiving the second data on the second transmission resource, the target terminal apparatus determines that the second data is data on which soft combination is not to be performed.

In a possible design, the $i^{th}$ sidelink transmission resource further includes an $i^{th}$ redundancy version set. The target terminal apparatus determines, based on a redundancy version in the $i^{th}$ redundancy version set, a start location for receiving third data, and determines that the to-be-received third data is data on which soft combination is to be performed, where the third data is data that is generated by the cooperation terminal apparatus based on the first data received from the network apparatus and on which the target terminal apparatus is to perform soft combination.

In a possible design, the $i^{th}$ sidelink transmission resource further includes a second redundancy version. If receiving third data at a start location corresponding to the second redundancy version, the target terminal apparatus determines that the third data is data on which soft combination is to be performed, where the second redundancy version is determined based on an intra-group identifier of the $i^{th}$ cooperation terminal apparatus in the cooperative transmission group.

According to a sixth aspect, a communication method is provided. A target terminal apparatus receives an $i^{th}$ sidelink transmission resource from a network apparatus, where the $i^{th}$ sidelink transmission resource belongs to the $1^{st}$ sidelink transmission resource to an $N^{th}$ sidelink transmission resource, the $i^{th}$ sidelink transmission resource is a sidelink transmission resource of N cooperation terminal apparatuses, and the $i^{th}$ sidelink transmission resource is different from a $j^{th}$ sidelink transmission resource, where i is an integer greater than or equal to 1 and less than or equal to N, j is an integer greater than or equal to 1 and less than or equal to N, j is not equal to i, and N is an integer greater than or equal to 1; and the N cooperation terminal apparatuses and the target terminal apparatus belong to a same cooperative transmission group. The target terminal apparatus receives, on the sidelink transmission resource, second data sent by the N cooperation terminal apparatuses, where the second data is determined by the N cooperation terminal apparatuses based on first data received from the network apparatus.

In the foregoing possible design, because the target terminal apparatus receives the same second data from the cooperation terminal apparatuses, the target terminal apparatus may receive the second data on the same sidelink transmission resource, to reduce resource consumption of the target terminal apparatus.

In a possible design, the target terminal apparatus receives a sidelink transmission resource set indication from the network apparatus, where a sidelink transmission resource set includes the $1^{st}$ sidelink transmission resource to the $N^{th}$ sidelink transmission resource, and the $i^{th}$ sidelink transmission resource is the $i^{th}$ sidelink transmission resource determined by the network apparatus from the sidelink transmission resource set.

In the foregoing possible design, because the cooperation terminal apparatuses send the same second data to the target terminal apparatus, the sidelink transmission resource may be the $i^{th}$ sidelink transmission resource. This can reduce complexity of configuring the sidelink transmission resource, and improve flexibility of configuring the sidelink transmission resource.

According to a seventh aspect, a communication method is provided. A network apparatus sends first data to an $i^{th}$ cooperation terminal apparatus, and the network apparatus sends a sidelink transmission resource set indication to N cooperation terminal apparatuses and a target terminal apparatus, where the N cooperation terminal apparatuses include the $i^{th}$ cooperation terminal apparatus, a sidelink transmission resource set is used by the $i^{th}$ cooperation terminal apparatus to select an $i^{th}$ sidelink transmission resource, the $i^{th}$ sidelink transmission resource belongs to the sidelink transmission resource set, the $i^{th}$ sidelink transmission resource is used by the $i^{th}$ cooperation terminal apparatus to send second data to the target terminal apparatus, and the second data is determined based on the first data, where i is an integer greater than or equal to 1 and less than or equal to N, and N is an integer greater than or equal to 1.

According to the method provided in this embodiment of this application, the network apparatus may predetermine the sidelink transmission resource set for cooperative transmission, so that when needing to perform sidelink transmission, the N cooperation terminal apparatuses independently select respective sidelink transmission resources from the sidelink transmission resource set, to avoid interference with other cooperative transmission resources, improve flexibility of sidelink transmission resource allocation, and effectively improve performance of the cooperative transmission.

In a possible design, the sidelink transmission resource set includes the $1^{st}$ time domain resource to an $N^{th}$ time domain resource. The $i^{th}$ sidelink transmission resource includes an $i^{th}$ time domain resource, the $i^{th}$ time domain resource is a time domain resource in the $i^{th}$ sidelink transmission resource, the $i^{th}$ time domain resource is different from a $j^{th}$ time domain resource, and the $j^{th}$ time domain resource is a time domain resource that is in a $j^{th}$ sidelink transmission resource and that is determined by the network apparatus based on time domain resources.

In the foregoing possible design, sidelink transmission of the N cooperation terminal apparatuses can be prevented from interfering with each other, and the performance of the cooperative transmission can be effectively improved. Specifically, the network apparatus may determine the $i^{th}$ time domain resource in the $i^{th}$ sidelink transmission resource in a time domain multiplexing manner, to reduce a latency of the sidelink transmission.

In a possible design, the sidelink transmission resource set includes the $1^{st}$ frequency domain resource to an $N^{th}$ frequency domain resource. The $i^{th}$ sidelink transmission resource includes an $i^{th}$ frequency domain resource, the $i^{th}$ frequency domain resource is different from a $j^{th}$ frequency domain resource, and the $j^{th}$ frequency domain resource is a frequency domain resource that is in a $j^{th}$ sidelink transmission resource and that is determined by the network apparatus based on time domain resources.

In the foregoing possible design, the network apparatus may determine the $i^{th}$ frequency domain resource in the $i^{th}$ sidelink transmission resource in a frequency domain multiplexing manner, to improve an anti-interference capability of the sidelink transmission.

In a possible design, the sidelink transmission resource set includes the $1^{st}$ time-frequency sub-resource to an $(N \times N)^{th}$ time-frequency sub-resource. The $i^{th}$ sidelink transmission resource includes an $i^{th}$ sub-resource group, the $i^{th}$ sub-resource group includes N sub-resources, a time-frequency resource in any one of the N sub-resources in the $i^{th}$ sub-resource group is different from a time-frequency resource in any one of N sub-resources in a $j^{th}$ sub-resource group, the $i^{th}$ sub-resource group is a time-frequency resource in the $i^{th}$ sidelink transmission resource, and the $j^{th}$ sub-resource group is a time-frequency resource that is in a $j^{th}$ sidelink transmission resource and that is determined by the network apparatus.

In the foregoing possible design, the network apparatus may determine an $i^{th}$ time-frequency resource in the $i^{th}$ sidelink transmission resource in a time-frequency domain multiplexing manner, to reduce a latency of the sidelink transmission and improve an anti-interference capability of the sidelink transmission.

In a possible design, the sidelink transmission resource set includes the $1^{st}$ reference signal sequence to an $N^{th}$ reference signal sequence. The $i^{th}$ sidelink transmission resource includes an $i^{th}$ reference signal sequence, the $i^{th}$ reference signal sequence is a code resource that is in the $i^{th}$ sidelink transmission resource and that is determined by the network apparatus, the $i^{th}$ reference signal sequence is different from a $j^{th}$ reference signal sequence, and the $j^{th}$ reference signal sequence is a code resource that is in a $j^{th}$ sidelink transmission resource and that is determined by the network apparatus.

In the foregoing possible design, the network apparatus may determine an $i^{th}$ code resource in the $i^{th}$ sidelink transmission resource in a code division multiplexing manner, to improve utilization of the sidelink transmission resources and improve an interference capability of the sidelink transmission.

In a possible design, the sidelink transmission resource set further includes a soft combination indication field set. The $i^{th}$ sidelink transmission resource further includes an $i^{th}$ soft combination indication field, where the $i^{th}$ soft combination indication field is used to indicate whether the second data sent by the $i^{th}$ cooperation terminal apparatus to the target terminal apparatus is data on which the target terminal apparatus is to perform soft combination.

In a possible design, the $i^{th}$ soft combination indication field includes a first time offset and/or a second time offset, where the first time offset is used to indicate that, if the target terminal apparatus receives the second data from the $i^{th}$ cooperation terminal apparatus at a second moment obtained by increasing a first moment by the time offset, the second data is determined as the data on which the target terminal apparatus is to perform soft combination, where the first moment is a moment of receiving sidelink control signaling sent by the $i^{th}$ cooperation terminal apparatus; and the second time offset is used to indicate that, if the target terminal apparatus receives the second data from the $i^{th}$ cooperation terminal apparatus at a third moment obtained by increasing the first moment by the second time offset, the second data is determined as data on which the target terminal apparatus is not to perform soft combination.

In the foregoing possible design, the network apparatus may set the $i^{th}$ soft combination indication field in the $i^{th}$ sidelink transmission resource, so that the $i^{th}$ cooperation terminal apparatus determines, based on the selected $i^{th}$ soft combination indication field, whether the soft combination needs to be performed on the second data sent to the target terminal apparatus. If it is determined that the soft combination needs to be performed, the cooperation terminal apparatuses send the same second data to the target terminal apparatus. This can improve a decoding success rate of the target terminal apparatus, and further improve the performance of the cooperative transmission.

In a possible design, the $i^{th}$ sidelink transmission resource includes a first transmission resource and a second transmission resource. The first transmission resource is used to indicate that the second data sent by the $i^{th}$ cooperation terminal apparatus to the target terminal apparatus on the first transmission resource is data on which the target terminal apparatus is to perform soft combination. The second transmission resource is used to indicate that the second data sent by the $i^{th}$ cooperation terminal apparatus to the target terminal apparatus on the second transmission resource is data on which the target terminal apparatus is not to perform soft combination.

In the foregoing possible design, the network apparatus may configure the first transmission resource and the second transmission resource, so that the cooperation terminal apparatus independently chooses to send, on the first transmission resource or the second transmission resource, the data on which the soft combination is to be performed, thereby reducing overheads of control signaling required by a soft combination indication.

In a possible design, the first transmission resource includes one or more of the following: a first time-frequency resource and a first code resource; and the second transmission resource includes one or more of the following: a second time-frequency resource and a second code resource.

In a possible design, the sidelink transmission resource set further includes a redundancy version set, where the redundancy version set includes at least one redundancy version, the redundancy version set is used by the $i^{th}$ cooperation terminal apparatus to determine a first redundancy version in the redundancy version set, the first redundancy version is used by the $i^{th}$ cooperation terminal apparatus to determine, based on the first redundancy version, a start location at which the $i^{th}$ cooperation terminal apparatus is to send third data on which soft combination needs to be performed, and the third data is generated by the $i^{th}$ cooperation terminal based on the first data received from the network apparatus.

In the foregoing possible design, the network apparatus may configure the redundancy version set, so that the cooperation terminal apparatus independently selects the redundancy version from the redundancy version set, and sends the third data based on the redundancy version, where the third data is a part or all of the second data; and further the target terminal apparatus may receive signals of more data, to improve a decoding success rate in the cooperative transmission, and further improve the performance of the cooperative transmission.

According to an eighth aspect, a communication method is provided. A first cooperation terminal apparatus receives first data from a network apparatus, where the first cooperation terminal apparatus is an $i^{th}$ cooperation terminal apparatus in N cooperation terminals, and the N cooperation terminal apparatuses and a target terminal apparatus belong to a same cooperative transmission group. The first cooperation terminal receives a sidelink transmission resource set from the network apparatus, where the sidelink transmission resource set includes the $1^{st}$ sidelink transmission resource to an $N^{th}$ sidelink transmission resource, where i is an integer greater than or equal to 1 and less than or equal to N, and N is an integer greater than or equal to 1. The first cooperation terminal apparatus sends second data to the target terminal apparatus on an $i^{th}$ sidelink transmission resource, where the second data is determined based on the first data, and the $i^{th}$ sidelink transmission resource is selected by the first cooperation terminal apparatus from the sidelink transmission resource set.

According to the method provided in this embodiment of this application, the first cooperation terminal apparatus may independently select and determine the $i^{th}$ sidelink transmission resource from the sidelink transmission resource set, and the $i^{th}$ sidelink transmission resource is different from a $j^{th}$ sidelink transmission resource of a $j^{th}$ cooperation terminal apparatus, so that sidelink transmission of the N cooperation terminal apparatuses can be effectively prevented from interfering with each other, and performance of cooperative transmission can be effectively improved.

In a possible design, the first cooperation terminal apparatus sends first indication information to the target terminal apparatus, where the first indication information is used to indicate that the first cooperation terminal apparatus does not correctly decode the first data.

In the foregoing possible design, the first cooperation terminal apparatus may send a decoding result to the target terminal apparatus, to reduce a resource consumed by the target terminal apparatus for receiving the second data sent by the cooperation terminal apparatus, and avoid unnecessary resource overheads.

In a possible design, a time domain resource in the $i^{th}$ sidelink transmission resource is an $i^{th}$ time domain resource, the $i^{th}$ time domain resource is different from a $j^{th}$ time domain resource, and the $j^{th}$ time domain resource is a time domain resource that is in the $j^{th}$ sidelink transmission resource and that is determined by the network apparatus based on time domain resources.

In a possible design, a frequency domain resource in the $i^{th}$ sidelink transmission resource is an $i^{th}$ frequency domain resource, the $i^{th}$ frequency domain resource is different from a $j^{th}$ frequency domain resource, and the $j^{th}$ frequency domain resource is a frequency domain resource that is in the $j^{th}$ sidelink transmission resource and that is determined by the network apparatus based on time domain resources.

In a possible design, a time-frequency resource in the $i^{th}$ sidelink transmission resource is an $i^{th}$ sub-resource group, the $i^{th}$ sub-resource group includes N sub-resources, a time-frequency resource in any one of the N sub-resources in the $i^{th}$ sub-resource group is different from a time-frequency resource in any one of N sub-resources in a $j^{th}$ sub-resource group, the $i^{th}$ sub-resource group is the time-frequency resource in the $i^{th}$ sidelink transmission resource, and the $j^{th}$ sub-resource group is a time-frequency resource that is in the $j^{th}$ sidelink transmission resource and that is determined by the network apparatus.

In a possible design, a code resource in the $i^{th}$ sidelink transmission resource includes an $i^{th}$ reference signal sequence, the $i^{th}$ reference signal sequence is different from a $j^{th}$ reference signal sequence, and the $j^{th}$ reference signal sequence is a code resource in the $j^{th}$ sidelink transmission resource.

In a possible design, the sidelink transmission resource set further includes a soft combination indication field set. The first cooperation terminal selects an $i^{th}$ soft combination indication field from the soft combination indication field set, and determines whether the second data sent to the target terminal apparatus is data on which the target terminal apparatus is to perform soft combination.

In a possible design, the first cooperation terminal apparatus generates sidelink control signaling, where the sidelink control signaling includes an $i^{th}$ soft combination indication field, and the $i^{th}$ soft combination indication field is used to indicate whether the second data sent by the first cooperation terminal apparatus is data on which the target terminal apparatus is to perform soft combination.

In the foregoing possible design, the first cooperation terminal apparatus delivers the $i^{th}$ soft combination indication field to the target terminal apparatus, to improve flexibility and robustness of the sidelink transmission.

In a possible design, the $i^{th}$ soft combination indication field includes a first time offset and/or a second time offset. If determining that the second data that needs to be sent is the data on which the target terminal apparatus is to perform soft combination, the first cooperation terminal apparatus sends the second data at a second moment obtained by increasing a first moment by the first time offset, where the first moment is a moment of sending sidelink control signaling to the target terminal apparatus by the first cooperation terminal apparatus; and/or if determining that the second data that needs to be sent is data on which the target terminal apparatus is not to perform soft combination, the first cooperation terminal apparatus sends the second data at a third moment obtained by increasing the first moment by the second time offset.

In the foregoing possible design, whether to perform soft combination may be determined based on the first time offset and/or the second time offset. This reduces overheads of receiving control signaling required by a soft combination indication, and a configuration is flexible.

In a possible design, the $i^{th}$ sidelink transmission resource includes a first transmission resource and a second transmission resource. If determining that the second data that needs to be sent is data on which the target terminal apparatus is to perform soft combination, the first cooperation terminal apparatus sends the second data on the first transmission resource; and if determining that the second data that needs to be sent is data on which the target terminal apparatus is not to perform soft combination, the first cooperation terminal apparatus sends the second data on the second transmission resource.

In the foregoing possible design, the first cooperation terminal apparatus sends, on the first transmission resource or the second transmission resource, the data on which the soft combination is to be performed, thereby reducing overheads of control signaling required by a soft combination indication, and resolving a problem that the target terminal apparatus may fail to correctly receive the data on which the soft combination is or is not to be performed, where the problem is caused by a latency and may occur in the design of determining the soft combination indication field by using the first time offset and/or the second time offset.

In a possible design, the first transmission resource includes one or more of the following: a first time-frequency resource and a first code resource; and the second transmission resource includes one or more of the following: a second time-frequency resource and a second code resource.

In a possible design, the $i^{th}$ sidelink transmission resource further includes an $i^{th}$ redundancy version set, and the $i^{th}$ redundancy version set includes at least one redundancy version. If determining that third data needs to be sent to the target terminal apparatus, the first cooperation terminal apparatus determines a first redundancy version in the redundancy version set, and determines, based on the first redundancy version, a start location at which the cooperation terminal apparatus is to send the third data, where the third data is data that is generated by the first cooperation terminal apparatus based on the first data received from the network apparatus and on which the target terminal apparatus is to perform soft combination.

In the foregoing possible design, the first cooperation terminal apparatus determines the redundancy version in the $i^{th}$ redundancy version set, and sends the third data based on the determined redundancy version, where the third data is a part or all of the second data; and further the target terminal apparatus may receive signals of more data, to improve a decoding success rate in the cooperative transmission, and further improve the performance of the cooperative transmission.

In a possible design, the $i^{th}$ sidelink transmission resource further includes an $i^{th}$ redundancy version set, and the $i^{th}$ redundancy version set includes at least one redundancy version. If determining that third data needs to be sent to the target terminal apparatus, the first cooperation terminal apparatus determines a second redundancy version based on an intra-group identifier of the first cooperation terminal apparatus in the cooperative transmission group. The first cooperation terminal apparatus determines, based on the second redundancy version, a start location for sending the third data, where the third data is data that is generated by the first cooperation terminal apparatus based on the first data received from the network apparatus and on which the target terminal apparatus is to perform soft combination.

In the foregoing possible design, the first cooperation terminal apparatus may determine the corresponding redundancy version based on the intra-group identifier, and the $i^{th}$ redundancy version set may be reused in a plurality of times of cooperative transmission. This can reduce resources occupied by transmission resource allocation in the plurality of times of cooperative transmission, reduce resource overheads, and improve spectral efficiency.

According to a ninth aspect, a communication method is provided. A target terminal apparatus receives first data from a network apparatus, where N cooperation terminal apparatuses and the target terminal apparatus belong to a same cooperative transmission group. The target terminal receives a sidelink transmission resource set from the network apparatus, where the sidelink transmission resource set includes the $1^{st}$ sidelink transmission resource to an $N^{th}$ sidelink transmission resource, where N is an integer greater than or equal to 1. The target terminal apparatus receives, on a sidelink transmission resource in the sidelink transmission resource set, second data sent by an $i^{th}$ cooperation terminal apparatus, where the second data is determined by the $i^{th}$ cooperation terminal apparatus based on the first data, and the $i^{th}$ cooperation terminal apparatus belongs to the N cooperation terminal apparatuses, where i is an integer greater than or equal to 1 and less than or equal to N.

According to the method provided in this embodiment of this application, the target terminal apparatus may receive, based on the sidelink transmission resource set, second data sent by each cooperation terminal, to reduce signaling consumption required by the network apparatus for configuration, and improve spectral efficiency.

In a possible design, the target terminal apparatus receives a sidelink control instruction from the first cooperation terminal apparatus, where the sidelink control instruction is used to indicate the $i^{th}$ sidelink transmission resource used by the first cooperation terminal apparatus to send the second data. The target terminal apparatus receives the second data from the $i^{th}$ cooperation terminal apparatus on the $i^{th}$ sidelink transmission resource based on the sidelink control instruction.

In the foregoing possible design, the target terminal apparatus may receive the sidelink control instruction sent by the first cooperation terminal apparatus, to determine the $i^{th}$ sidelink transmission resource independently selected by the first cooperation terminal. This reduces a resource consumed by the target terminal apparatus for receiving the second data sent by the cooperation terminal apparatus, and avoids unnecessary resource overheads.

In a possible design, the sidelink control instruction further includes an $i^{th}$ soft combination indication field. The target terminal apparatus determines, based on the $i^{th}$ soft combination indication field, whether soft combination needs to be performed on the received second data.

In the foregoing possible design, the target terminal apparatus may receive the sidelink control instruction sent by the first cooperation terminal apparatus, to determine the $i^{th}$ soft combination indication field independently selected by the first cooperation terminal, and determine whether the soft combination needs to be performed on the second data sent by the cooperation terminal apparatus and received by the target terminal apparatus, thereby improving performance of cooperative transmission.

In a possible design, the $i^{th}$ soft combination indication field includes a first time offset and/or a second time offset. If determining that the second data sent by the first cooperation terminal apparatus is received at a second moment obtained by increasing a first moment by the first time offset, the target terminal apparatus determines that the soft combination needs to be performed on the second data, where the first moment is a moment of sending sidelink control signaling to the target terminal apparatus by the first cooperation terminal apparatus; and/or if determining that the second data sent by the first cooperation terminal apparatus is received at a third moment obtained by increasing the first moment by the second time offset, the target terminal apparatus determines that the soft combination does not need to be performed on the second data.

In the foregoing possible design, the target terminal apparatus determines, based on the first time offset and/or the second time offset, whether the soft combination needs to be performed on the second data sent by the cooperation terminal apparatus and received by the target terminal apparatus, to reduce signaling overheads of the soft combination indication field, and improve the performance of the cooperative transmission.

In a possible design, the $i^{th}$ sidelink transmission resource includes a first transmission resource and a second transmission resource. If receiving the second data on the first transmission resource, the target terminal apparatus determines that the second data is data on which soft combination is to be performed. If receiving the second data on the second transmission resource, the target terminal apparatus determines that the second data is data on which soft combination is not to be performed.

In the foregoing possible design, the target terminal apparatus receives the second data on the first transmission resource and the second transmission resource, to determine whether the soft combination needs to be performed on the second data sent by the cooperation terminal apparatus and received by the target terminal apparatus, thereby reducing signaling overheads of a soft combination indication field, and improving performance of cooperative transmission.

In a possible design, the sidelink transmission resource set further includes a redundancy version set. The target terminal apparatus determines, based on a redundancy version in the redundancy version set, a start location for receiving third data, and determines that the to-be-received third data is data on which soft combination is to be performed, where the third data is data that is generated by the cooperation terminal apparatus based on the first data received from the network apparatus and on which the target terminal apparatus is to perform soft combination.

In the foregoing possible design, the target terminal apparatus receives the third data based on the redundancy version set, to improve performance of cooperative transmission.

In a possible design, the sidelink transmission resource set further includes a redundancy version set. If receiving third data of the $i^{th}$ cooperation terminal apparatus at a start location corresponding to a second redundancy version, the target terminal apparatus determines that the third data is data on which soft combination is to be performed, where the second redundancy version is determined in the redundancy version set based on an intra-group identifier of the $i^{th}$ cooperation terminal apparatus in the cooperative transmission group.

In the foregoing possible design, the target terminal apparatus receives third data of each cooperation terminal apparatus based on the redundancy version set and an intra-group identifier of each cooperation terminal apparatus, to improve performance of cooperative transmission.

According to a tenth aspect, an embodiment of this application further provides a communication apparatus. The communication apparatus has a function of implementing the first cooperation terminal device according to any one of the third aspect, the fourth aspect, the eighth aspect, or the possible designs of the second aspect, the fourth aspect, and the eighth aspect: or has a function of implementing the target terminal device according to any one of the fifth aspect, the sixth aspect, the ninth aspect, or the possible designs of the fifth aspect, the sixth aspect, and the ninth aspect. The communication apparatus may be a terminal device, for example, a handheld terminal device or a vehicle-mounted terminal device: or may be an apparatus, for example, a chip, included in the terminal device: or may be an apparatus including the terminal device. A function of the terminal device may be implemented by hardware, or may be implemented by hardware by executing corresponding software. The hardware or the software includes one or more modules corresponding to the foregoing function.

The communication apparatus may alternatively have a function of implementing the network device according to any one of the first aspect, the second aspect, and the seventh aspect, or the possible designs of the first aspect, the second aspect, and the seventh aspect. The communication apparatus may be a network device, for example, a base station; or may be an apparatus, for example, a chip, included in the network device. A function of the network device may be implemented by hardware, or may be implemented by hardware by executing corresponding software. The hardware or the software includes one or more modules corresponding to the foregoing function.

In a possible design, a structure of the communication apparatus includes a processing module and a transceiver module. The processing module is configured to support the communication apparatus to perform a corresponding function according to any one of the first aspect to the ninth aspect or the designs of the first aspect to the ninth aspect. The transceiver module is configured to support communication between the communication apparatus and another communication device. For example, when the communication apparatus is the network device, the transceiver module may send an $i^{th}$ sidelink transmission resource to an $i^{th}$ cooperation terminal apparatus and a target terminal apparatus. The communication apparatus may further include a storage module. The storage module is coupled to the processing module, and stores program instructions and data that are necessary for the communication apparatus. In an example, the processing module may be a processor, a communication module may be a transceiver, and the storage module may be a memory. The memory may be integrated with the processor, or may be separate from the processor. This is not limited in this application.

In another possible design, an embodiment of this application further provides a communication apparatus. A structure of the communication apparatus includes a processor, and may further include a memory. The processor is coupled to the memory, and may be configured to execute computer program instructions stored in the memory, to enable the communication apparatus to perform the method according to any one of the first aspect to the ninth aspect or the possible designs of the first aspect to the ninth aspect. Optionally, the communication apparatus further includes a communication interface, and the processor is coupled to the communication interface. When the communication apparatus is a terminal device, the communication interface may be a transceiver or an input/output interface. When the communication apparatus is a chip included in the terminal device, the communication interface may be an input/output interface of the chip. Optionally, the transceiver may be a transceiver circuit, and the input/output interface may be an input/output circuit.

According to an eleventh aspect, an embodiment of this application further provides a computer-readable storage medium, including instructions. When the instructions are run on a computer, the computer is enabled to perform the method according to any possible design of any one of the first aspect to the ninth aspect.

According to a twelfth aspect, an embodiment of this application further provides a chip system. The chip system includes a processor, and may further include a memory. The chip system is configured to implement the method according to any one of the first aspect to the ninth aspect. The chip system may include a chip, or may include a chip and another discrete component.

According to a thirteenth aspect, an embodiment of this application further provides a computer program product, including instructions. When the instructions are run on a computer, the computer is enabled to perform the method according to any one of the first aspect to the ninth aspect.

According to a fourteenth aspect, an embodiment of this application provides a system. The system includes the network apparatus configured to perform the methods according to the first aspect, the second aspect, and the seventh aspect, at least one cooperation terminal apparatus configured to perform the methods according to the third aspect, the fourth aspect, and the eighth aspect, and the target terminal apparatus configured to perform the methods according to the fifth aspect, the sixth aspect, and the ninth aspect. A cooperative transmission system may include the network apparatus, the at least one cooperation terminal apparatus, and the target terminal apparatus.

DESCRIPTION OF EMBODIMENTS

Figure 1A:
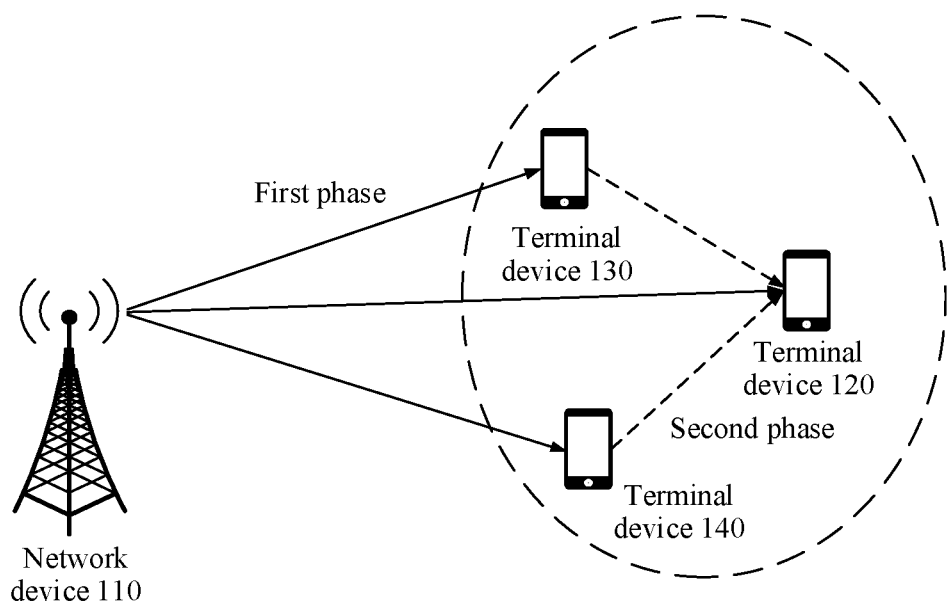
FIG. 1a to FIG. 1c each are a schematic diagram of a communication system according to an embodiment of this application.

The following explains and describes some terms in embodiments of this application, to help a person skilled in the art have a better understanding.

Downlink (DL)

The downlink is used for communication between a network apparatus and a terminal apparatus, where the communication includes one-to-one downlink communication and one-to-many downlink communication. The oneto-one downlink communication may include unicast, and the one-to-many downlink communication includes broadcast, multicast, and the like. For example, the broadcast may refer to communication between a network apparatus and all terminal apparatuses in a cell, and the multicast may refer to communication between a network apparatus and a terminal in a communication group, where the communication group includes one or more terminal apparatuses. The downlink communication may include direct communication between the network apparatus and the terminal apparatus, and may further include downlink communication with forwarding performed by a relay node.

A physical channel for the downlink communication may include at least one of the following:

Physical downlink control channel (PDCCH): used to carry downlink control information (DCI), to allocate a resource for a data channel to the terminal apparatus. The DCI includes related information of scheduled downlink transmission, and UE receives the downlink transmission based on the related information. For example, the control information may indicate a symbol and/or a resource block (RB) to which the data channel is mapped, and the network apparatus and the terminal apparatus perform data transmission on the allocated time-frequency resource through the data channel.

Physical downlink shared channel (PDSCH): used to carry data delivered by the network apparatus.

2. Sidelink (SL)

The sidelink may also be referred to as a sidelink, a sidelink, or the like. The sidelink is used for communication between terminal apparatuses, where the communication includes one-to-one sidelink communication and one-to-many sidelink communication. The one-to-one sidelink communication may include unicast, and the one-to-many sidelink communication includes broadcast, multicast, and the like. For example, the broadcast may refer to communication between all terminal apparatuses in a cell, and the multicast may refer to communication between terminals in a communication group, where the communication group includes one or more terminal apparatuses. The sidelink communication may include direct communication between two terminal apparatuses, and may further include sidelink communication with forwarding performed by a relay node.

A physical channel for the sidelink communication may include at least one of the following:

Physical sidelink shared channel (PSSCH): used to carry sidelink data (SL data).

Physical sidelink control channel (PSCCH): used to carry sidelink scheduling assignment (SL SA), where the SL SA may also be referred to as sidelink control information (SCI).

Physical sidelink feedback channel (PSFCH): used to carry sidelink feedback control information. For example, the sidelink feedback information may include at least one of channel state information (CSI) and hybrid automatic repeat request (HARQ) information. The HARQ information may include an acknowledgement (ACK), a negative acknowledgement (NACK), or the like.

Physical sidelink broadcast channel (PSBCH): used to carry system information and synchronization-related information.

Physical sidelink discovery channel (PSDCH): used to carry a sidelink discovery message.

3. Resource configuration mode, also referred to as a resource allocation mode: One terminal apparatus may use one or two resource configuration modes. In a first resource configuration mode, a resource used by the terminal apparatus to perform data transmission on a sidelink each time is scheduled and allocated by a network apparatus. For example, the mode is a resource configuration mode defined in an LTE V2X system, namely, a mode 3, and a resource configuration mode defined in an NR V2X system, namely, a mode 1. In this transmission mode, a same resource is not allocated to adjacent terminal apparatuses, and better transmission reliability can be ensured.

In a second resource configuration mode, a resource used by the terminal apparatus to perform data transmission on a sidelink each time is dynamically selected by the terminal apparatus from a configured resource pool. For example, the mode is a resource configuration mode defined in the LTE V2X system, namely, a mode 4, and a resource configuration mode defined in the NR V2X system, namely, a mode 2. The resource pool may be configured by a network apparatus by using a system broadcast message or an RRC message. When sending data, the terminal apparatus may independently obtain at least a part of resources from the resource pool through random selection or according to a sensing based reservation mechanism or a partial sensing based reservation mechanism, to send the data. Because the terminal apparatus independently selects the resource, different terminal apparatuses may select a same resource to send data. Consequently, a transmission collision may occur.

4. Downlink Control Information (DCI)

The DCI is control information sent by a network apparatus to a terminal apparatus. For example, the network apparatus may send the DCI through a physical downlink control channel PDCCH. The DCI may be used to schedule uplink data transmission, downlink data transmission, or sidelink resource allocation. For example, a communication interface between the network apparatus and the terminal apparatus is a Uu interface, and uplink/downlink data transmission may be performed over the Uu interface, where the uplink data transmission is data transmission from the terminal apparatus to the network apparatus, and the downlink data transmission is data transmission from the network apparatus to the terminal apparatus. A communication interface between terminal apparatuses is a PC5 interface, and sidelink transmission may be performed between the terminal apparatuses over the PC5 interface. The sidelink resource allocation may be performed to allocate a sidelink resource and/or a sidelink receiving resource. For example, the network apparatus may send DCI to a transmit-side terminal apparatus, where the DCI is used to allocate a sidelink resource to the transmit-side terminal apparatus.

(1) Function of the DCI: DCI with different functions may occupy different resources. The DCI in embodiments of this application may include scheduling information allocated by the network apparatus to the terminal apparatus on different transmission links, for example, scheduling information used for downlink data scheduling and scheduling information used for sidelink data scheduling. Specific scheduling information may include a modulation and coding scheme MCS, a time-frequency resource, a multiple-input multiple-output MIMO mode, an automatic repeat request HARQ parameter, priority information, and the like.

(2) Format of the DCI: DCI in different formats includes different information fields. For example, DCI used for downlink data scheduling may be in a DCI format 1_0) (format 1_0) and/or a DCI format 1_1 (format 1_1), and DCI corresponding to sidelink data scheduling may be in a DCI format 5 (format 5), a DCI format 5A (format 5A), and/or the like.

(3) Search space SS: The network apparatus configures the terminal apparatus to monitor DCI in different SSs. For example, the terminal apparatus may be configured to monitor the DCI in a common search space (common search space, CSS), or the terminal apparatus may be configured to monitor the DCI in a UE-specific search space (USS). Optionally, the USS may also be referred to as a UESS.

(4) Radio network temporary identifier (RNTI): Different RNTIs may be used to perform cyclic redundancy check (cyclic redundancy check, CRC) scrambling on scheduling information. For example, for a DCI format with a general function, because the DCI format can be further classified into different scheduling types, different RNTIs are used to perform CRC scrambling for the DCI format. For example, based on different scheduling types, scheduling information used for downlink data scheduling may be classified into scheduling information used for downlink system information scheduling, scheduling information used for downlink paging message scheduling, scheduling information used for downlink dynamic data scheduling, and scheduling information used for semi-persistent scheduling. The scheduling information used for the downlink system information scheduling may be scrambled by using a system information RNTI (SI-RNTI), and the scheduling information used for the downlink paging message scheduling may be scrambled by using a paging RNTI (P-RNTI). The scheduling information used for the downlink dynamic data scheduling may be scrambled by using a cell RNTI (C-RNTI), and the scheduling information used for the semi-persistent data scheduling may be scrambled by using a configured scheduling RNTI (CS-RNTI). Other cases are not enumerated herein.

In embodiments of this application, the network apparatus may configure DCI in different formats. In embodiments of this application, the network apparatus or a CUE may use the following manner. For example, functions of first DCI in different formats may be different. For example, DCI in a first format may be referred to as fallback DCI, and the fallback DCI may be used for data scheduling before or after RRC connection establishment. First DCI in a second format may be referred to as non-fallback DCI, and the non-fallback DCI may be used for data scheduling and the like after the RRC connection establishment.

TABLE 1

DCI format description

| DCI format | Function | Search space |
|---|---|---|
| Format 1_0 | Downlink data scheduling | CSS and/or USS |
| Format 1_1 | Downlink data scheduling | USS |
| Format X | SL resource scheduling | |

For example, if the network apparatus configures the CUE to monitor DCI in the first format, the CUE may set SCI to be in the first format, where for example, the DCI in the first format may be DCI in the format 1_0 (format 1_0).

For example, if the network apparatus configures the CUE to monitor DCI in the second format, the CUE may set SCI to be in the second format, where for example, the DCI in the second format may be DCI in the format 1_1 (format 1_1).

In embodiments of this application, cyclic redundancy check (CRC) scrambling may be performed on the DCI by using different radio network temporary identifiers (RNTI). In addition, different RNTIs may be used to identify different CUEs.

5. RRC Signaling

Network transmission signaling includes connection establishment signaling and handover signaling at an RRC layer, resource request signaling at a media access control layer, measurement feedback signaling at a bottom layer, and the like. The RRC signaling may be scheduling information periodically or aperiodically configured by the network apparatus for the terminal apparatus.

6. RRC connection state: The terminal apparatus may have three RRC connection states: an RRC connected state (RRC_CONNECTED), an RRC idle state (RRC_IDLE), and an RRC inactive state (RRC_INACTIVE). The RRC connected state can be mutually transitioned with each of the RRC idle state and the RRC inactive state. However, for the RRC idle state and the RRC inactive state, only the RRC inactive state can be transitioned to the RRC idle state. A terminal apparatus in the RRC connected state may use the first resource configuration mode or the second resource configuration mode, or may even simultaneously use the two resource configuration modes. A specific resource configuration mode to be used may be determined by a network apparatus.

In addition, terminal apparatuses may be further classified into an in-coverage (IC) terminal apparatus and an out-of-coverage (OOC) terminal apparatus depending on whether the terminal apparatuses are located within coverage of the network apparatus. Only the terminal apparatus within the coverage of the network apparatus has various RRC connection states, and the terminal apparatus outside the coverage of the network apparatus cannot directly interact with the network apparatus.

7. Redundancy Version

To improve reliability of data transmission, redundancy version transmission for initial transmission or retransmission is performed. During the redundancy version transmission, a start location of transmitting data is determined based on a redundancy version (RV). Currently, service data may be transmitted in a unit of transport blocks (TB). After channel coding, one TB includes redundant data. In addition, to improve the reliability of the data transmission, one TB may be repeatedly transmitted for a plurality of times, and data in the plurality of times of repeat transmission may be the same or different. All data in a TB is stored in a ring buffer. During each time of transmission, a start location of reading data is determined in the ring buffer based on the redundancy version. The ring buffer is a special buffer. In the ring buffer, a start location and an end location of the data are adjacent. The ring buffer may also be referred to as a virtual circular buffer (virtual circular buffer). Downlink data transmission starts from the TB. After CRC (a check bit) is added to the TB and then the TB added with the CRC check bit is segmented, an uncoded code block is input to a channel coding module. An output obtained through channel coding includes a system bit sequence and several check bit sequences. After bit interleaving is performed on the system bit sequence and the check bit sequences, the system bit sequence and the check bit sequences are input to the circular buffer. The circular buffer has four anchors corresponding to four RV versions (an RV 0, an RV 1, an RV 2, and an RV 3). A transmit end selects an RV as a start data location for sending data after the channel coding, and performs subsequent operations such as bit scrambling and modulation.

Manner 1: First transmission includes one time of initial transmission and n times of redundancy version transmission for the initial transmission, and next transmission includes one time of retransmission and n times of redundancy version transmission for the retransmission, where n is an integer greater than 0. In this case, redundancy version transmission is performed for a large quantity of times. This is applicable to a service application scenario in which interference is severe and a reliability requirement is high.

Manner 2: First transmission includes one time of initial transmission, and next transmission includes one time of retransmission and n times of redundancy version transmission for the retransmission. In this case, the initial transmission only needs to be performed once. This is applicable to a service application scenario in which a data packet is large and a latency requirement is low:

Manner 3: First transmission includes one time of initial transmission and n times of redundancy version transmission for the initial transmission, and next transmission includes one time of retransmission, where n is an integer greater than or equal to 0.

Certainly, the foregoing is merely examples, and there may be another implementation of a correspondence between a service application scenario and a transmission mode. Examples are not enumerated herein one by one. Similarly, the transmission mode may alternatively be implemented in another manner. Examples are not enumerated herein one by one.

Figure 1B:
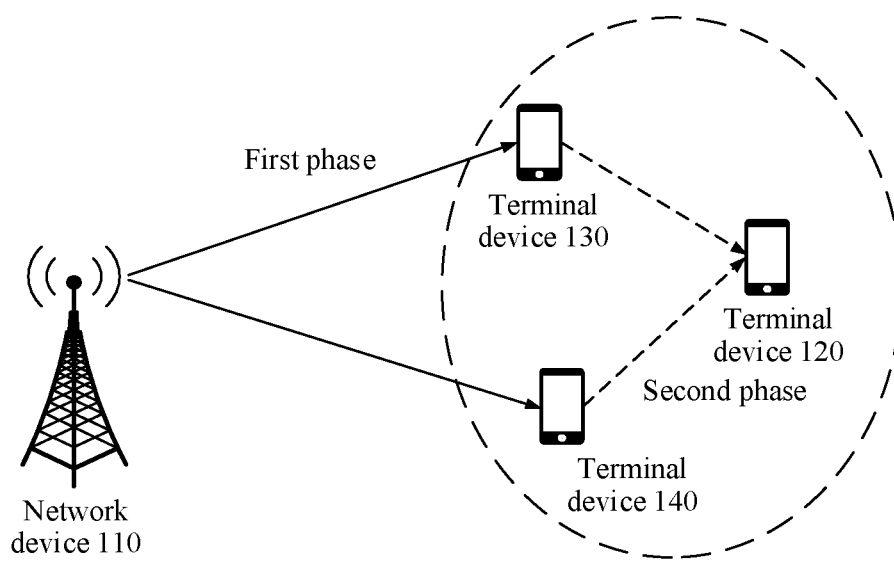
Figure 1C:
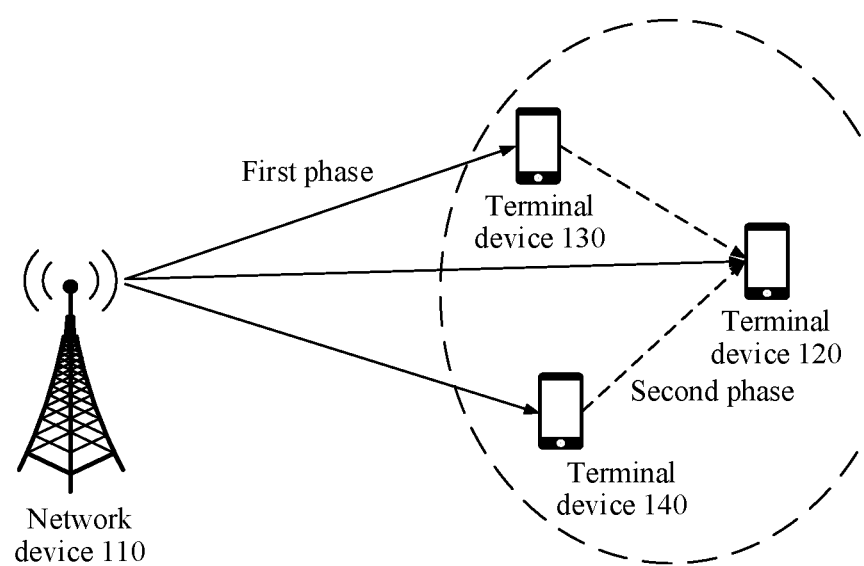
Figure 1D:
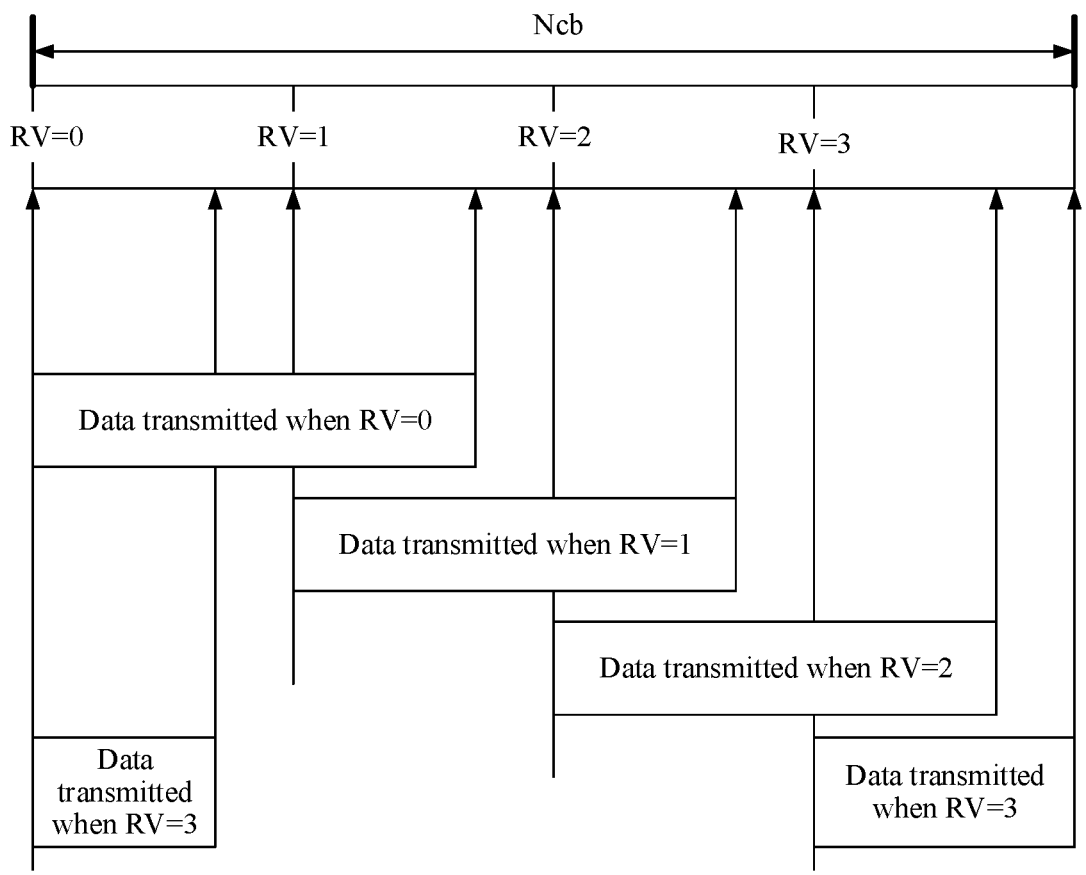
FIG. 1d is a schematic diagram of a redundancy version according to an embodiment of this application.

For example, FIG. 1d is a schematic diagram of a redundancy version according to an embodiment of this application. A length of data that is obtained by encoding a TB in FIG. 1d is Ncb. If the TB includes four redundancy versions, start locations are respectively a start location, a 1/4 location, a 2/4 location, and a 3/4 location of the data obtained by encoding the TB, and corresponding redundancy versions are respectively 0, 1, 2, and 3. When the redundancy version 0 is used for transmission, data with a preset length starts to be transmitted from the start location. Correspondingly, when the redundancy version 1 is used for transmission, the data with the preset length starts to be transmitted from the 1/4 location. Other cases are not described.

With reference to the foregoing description, in the manner 1 to the manner 3, the redundancy version transmission may be hybrid automatic repeat request (Hybrid Automatic Repeat reQuest-less, HARQ-less) transmission, or may be hybrid automatic repeat request (Hybrid Automatic Repeat reQuest, HARQ) transmission.

If the HARQ transmission is performed, for a same TB, before each time of repeat transmission, whether to perform transmission is determined based on an acknowledgement (ACK) or a negative acknowledgement (NACK) of the last transmission fed back by a terminal side apparatus.

If the HARQ-less transmission is performed, for a same TB, before each time of repeat transmission, there is no need to wait for an ACK/NACK fed back by a terminal side apparatus, and the transmission may be directly performed. In the HARQ-less transmission, for the same TB, the first time of transmission may be referred to as initial transmission, and the repeat transmission may be referred to as retransmission.

With reference to the foregoing description, a first transmission mode may include redundancy version transmission for initial transmission and redundancy version transmission for retransmission. A network side apparatus may indicate, to the terminal side apparatus in a plurality of manners, a redundancy version used for the redundancy version transmission for the initial transmission and a redundancy version used for the redundancy version transmission for the retransmission. For example, the network side apparatus may indicate the redundancy version used for the redundancy version transmission for the initial transmission and/or the redundancy version used for the redundancy version transmission for the retransmission, and the terminal side apparatus and the network side apparatus may transmit the corresponding redundancy version based on the indicated redundancy version. Alternatively, the network side apparatus does not directly indicate the redundancy version used for the redundancy version transmission for the initial transmission and/or the redundancy version used for the redundancy version transmission for the retransmission, and the terminal side apparatus and the network side apparatus may determine the redundancy version in a redundancy version set in a same manner, and transmit the corresponding redundancy version.

The foregoing is merely examples of this application, and is not intended to limit embodiments of this application. In embodiments of this application, other factors may affect content of the DCI, and are not enumerated herein one by one.

In embodiments of this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between associated objects. "At least one of the following items (pieces)" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

FIG. 1a and FIG. 1b each show a communication system 100 to which an embodiment of this application is applied. Technical solutions of embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, or a new radio (NR) system, or may be applied to a future communication system, another similar communication system, or the like. Further, embodiments of this application may be further applied to an evolved universal mobile telecommunications system terrestrial radio access network (E-UTRAN) system or a next generation (NG)-RAN system, or may be applied to a next generation communication system or a similar communication system. Embodiments of this application may also be applied to a V2X network, where V2X communication is communication between a vehicle and anything outside, and includes V2V communication, V2P communication. V2I communication, V2N communication, and the like. Embodiments of this application may also be applied to another Internet of Vehicles, a device-to-device (D2D) network, or the like. V2X specifically further includes several application requirements such as vehicle-to-vehicle (V2V), vehicle-to-infrastructure (V2I), and vehicle-to-pedestrian (V2P) direct communication, and vehicle-to-network (V2N) communication interaction. The V2V refers to communication between vehicles. The V2P refers to communication between a vehicle and a person (including a pedestrian, a bicycle rider, a driver, or a passenger). The V2I refers to communication between a vehicle and a network apparatus, for example, an RSU. In addition, the V2N may be further included in the V2I, where the V2N refers to communication between a vehicle and a base station/network.

The communication system 100 may include at least one network apparatus 110. The network apparatus 110 may be an apparatus that communicates with a terminal apparatus, for example, may be a base station or a base station controller. Each network apparatus 110 may provide communication coverage for a specific geographical area, and may communicate with a terminal apparatus located in this coverage area.

The network apparatus 110 includes, for example, an access network (AN) apparatus such as a base station (for example, an access point), and may be an apparatus that communicates with a wireless terminal apparatus over an air interface by using one or more cells in an access network. For example, a network apparatus in a V2X technology is a road side unit (RSU). The base station may be configured to mutually convert a received over-the-air frame and an internet protocol (IP) packet and serve as a router between the terminal apparatus and a remaining part of the access network, where the remaining part of the access network may include an IP network. The RSU may be a fixed infrastructure entity that supports a vehicle-to-everything (V2X) application, and may exchange a message with another entity that supports the V2X application. The access network apparatus may further coordinate attribute management of an air interface. For example, the access network apparatus may include an evolved NodeB (NodeB, eNB, or e-NodeB, evolutional Node B) in an LTE system or a long term evolution-advanced (LTE-A) system, or may include a next generation NodeB (next generation node B, gNB) or a transmission reception point (transmission receiving point/ transmission reception point, TRP) in a 5th generation mobile communication technology (5th generation, 5G) new radio (NR) system, an access node in a Wi-Fi system, a wireless relay node, or a wireless backhaul node. The base station may be a macro base station, a micro base station, a picocell base station, a small cell, a relay station, a balloon station, or the like. A plurality of base stations may support the aforementioned networks using a same technology, or may support the aforementioned networks using different technologies. The base station may include one or more co-site or non-co-site TRPs. The network apparatus 110 may alternatively be a wireless controller, a centralized unit (CU), and/or a distributed unit (DU) in a cloud radio access network (CRAN) scenario. This is not limited in this embodiment of this application. The network apparatus 110 may alternatively be a server, a wearable apparatus, an in-vehicle apparatus, or the like. An example in which the network apparatus is a base station is used for description below. The plurality of network apparatuses may be base stations of a same type or base stations of different types. The base station may communicate with the terminal apparatus, or may communicate with the terminal apparatus through a relay station.

Certainly, the network apparatus may further include a core network apparatus. However, the technical solutions provided in embodiments of this application mainly relate to the access network apparatus. Therefore, unless otherwise specified. "network apparatus" described below is the access network apparatus.

The communication system 100 further includes one or more terminal apparatuses 120, 130, and 140 within coverage of the network apparatus 110. The terminal is an apparatus having a wireless transceiver function. The terminal may be deployed on land, and includes an indoor or outdoor apparatus, a handheld apparatus, a wearable apparatus, or an in-vehicle apparatus; may be deployed on a water surface (for example, on a ship); or may be deployed in the air (for example, on an airplane, a balloon, or a satellite). The terminal apparatus includes an apparatus that provides a user with voice and/or data connectivity, for example, may include a handheld apparatus with a wireless connection function, or a processing apparatus connected to a wireless modem. The terminal apparatus may communicate with a core network through a radio access network (RAN), and exchange a voice and/or data with the RAN. The terminal apparatus may communicate with a plurality of base stations using different technologies. For example, the terminal apparatus may communicate with a base station supporting an LTE network, may communicate with a base station supporting a 5G network, and may further support dual connectivity to a base station in an LTE network and a base station in a 5G network.

The foregoing network architecture includes two communication interfaces: a PC5 interface and a Uu interface. The PC5 interface is a direct communication interface between terminal apparatuses. A direct communication link between the terminal apparatuses is a sidelink, and is used for communication between the terminal apparatuses. At least one of the following channels may be used for sidelink-based communication: a physical sidelink shared channel (PSSCH), used to carry data (data); and a physical sidelink control channel (PSCCH), used to carry sidelink control information (SCI), where the SCI is also referred to as scheduling assignment (SA). The Uu interface is a communication interface between a terminal apparatus and a network apparatus, and a communication link between the terminal apparatus and the network apparatus includes an uplink link (UL) and a downlink link (DL). Uu interface-based communication may be that the network apparatus sends data to the terminal apparatus through the Uu interface.

The terminal apparatus may include user equipment (UE), a wireless terminal device, a mobile terminal device, a subscriber unit, a subscriber station, a mobile station, a mobile station (mobile), a remote station, an access point (AP), a remote terminal device, an access terminal device, a user terminal device, a user agent, a user device, or the like. The terminal may be a mobile phone, a tablet computer (Pad), a computer having a wireless transceiver function, a virtual reality (VR) terminal device, an augmented reality (AR) terminal device, a wireless terminal in industrial control, a vehicle-mounted terminal device, a wireless terminal in self driving, a wireless terminal in telemedicine (remote medical), a wireless terminal in a smart grid, a wireless terminal in transportation safety, a wireless terminal in a smart city, a wireless terminal in a smart home, a wearable terminal device, or the like. An application scenario is not limited in embodiments of this application. The terminal apparatus may also be sometimes referred to as a terminal device, user equipment (UE), an access terminal device, a vehicle-mounted terminal, an industrial control terminal, a UE unit, a UE station, a mobile station, a mobile station, a remote station, a remote terminal device, a mobile device, a UE terminal device, a terminal device, a wireless communication device, a UE agent, a UE device, or the like. The terminal may be fixed or movable. The relay may be the foregoing network apparatus, or may be the foregoing terminal apparatus. For example, the terminal apparatus may include a mobile phone (or referred to as a "cellular" phone), a computer with a mobile terminal apparatus, a portable, pocket-sized, handheld, computer built-in, or vehicle-mounted mobile device, and an intelligent wearable device. For example, the terminal apparatus is a device such as a personal communications service (PCS) phone, a cordless telephone set, a session initiation protocol (SIP) phone, a wireless local loop (WLL) station, or a personal digital assistant (PDA). The terminal apparatus further includes a limited device, for example, a device with low power consumption, a device with a limited storage capability, or a device with a limited computing capability. For example, the terminal apparatus includes an information sensing device such as a barcode, radio frequency identification (RFID), a sensor, a global positioning system (GPS), or a laser scanner. The terminal apparatus in embodiments of this application may alternatively be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement a method in embodiments of this application. As an example instead of a limitation, the terminal apparatus in embodiments of this application may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn on the body or integrated into clothes or an accessory of a user. The wearable device is more than a hardware device, and implements powerful functions through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

Data transmission may be performed between the network apparatus 110 and the terminal apparatuses 120 to 140 on an air interface resource. The air interface resource may include at least one of a time domain resource, a frequency domain resource, and a code domain resource. Specifically, when the network apparatus 110 and the terminal apparatuses 120 to 140 perform data transmission, the network apparatus 110 may send control information to the terminal apparatuses 120 to 140 through a control channel, for example, a physical downlink control channel (PDCCH), to allocate a resource for a data channel, for example, a physical downlink shared channel (physical downlink shared channel. PDSCH) or a physical uplink shared channel (PUSCH), to the terminal apparatuses 120 to 140. For example, the control information may indicate a symbol and/or a resource block (RB) to which the data channel is mapped, and the network apparatus 110 and the terminal apparatuses 120 to 140 perform data transmission on the allocated time-frequency resource through the data channel. The data transmission may include downlink data transmission and/or uplink data transmission. The downlink data (for example, data carried on the PDSCH) transmission may be that the network apparatus 110 sends data to the terminal apparatuses 120 to 140. The uplink data (for example, data carried on the PUSCH) transmission may be that the terminal apparatuses 120 to 140 send data to the network apparatus 110. The data may be data in a broad sense, for example, may be user data, or may be system information, broadcast information, or other information.

In the communication systems shown in FIG. 1a to FIG. 1c, data transmission may be further performed between the terminal apparatuses 120 to 140 on a sidelink resource. Similar to the foregoing air interface resource, the sidelink resource may also include at least one of a time domain resource, a frequency domain resource, and a code domain resource. Specifically, a physical channel used by the terminal apparatuses 120 to 140 to perform data transmission may include at least one of a physical sidelink shared channel (PSSCH), a physical sidelink control channel (PSCCH), a physical sidelink feedback channel (PSFCH), or the like. The PSSCH is used to transmit data, the PSCCH is used to transmit control information such as scheduling assignment (SA) information, and the PSFCH is used to transmit feedback information. For example, the feedback information may include channel state information (CSI), an acknowledgement (ACK), or a negative acknowledgement (negative acknowledgement, NACK).

FIG. 1a to FIG. 1c each show an example including one network apparatus and three terminal apparatuses 120 to 140. Optionally, the communication system 100 may include a plurality of network apparatuses, and coverage of one network apparatus may include another quantity of terminal apparatuses. This is not limited in embodiments of this application. In addition, it may be understood that the sidelink communication in embodiments of this application may be communication (for example, unicast) between one terminal apparatus and another terminal apparatus, or the sidelink communication may be communication (for example, multicast and broadcast) between one terminal apparatus and a plurality of terminal apparatuses. This is not limited in embodiments of this application. For ease of description, in embodiments of this application. "the sidelink communication is communication between one terminal apparatus and another terminal apparatus" is used as an example for description.

To further improve a capacity of a 5G system and coverage of a network, the 5G system provides a communication manner through user cooperation, and user apparatus cooperation is one of features mainly supported in the 5th generation mobile communication technology system. In communication through user apparatus cooperation, a cooperative transmission group includes a target terminal apparatus (TUE) and several cooperation terminal apparatuses (Cooperation User Equipment, CUE) serving the target terminal apparatus. For example, a cooperative transmission group includes the terminal apparatus 120, the terminal apparatus 130, and the terminal apparatus 140 in FIG. 1a to FIG. 1c. For example, the target terminal apparatus is the terminal apparatus 120, and the terminal apparatuses 130 and 140 are the cooperation terminal apparatuses. It should be noted that any terminal apparatus may be a target terminal apparatus in a cooperative transmission group using the terminal apparatus as a center, and may also be a cooperation terminal apparatus in one or more other cooperative transmission groups. A neighboring terminal apparatus (neighboring user equipment, NUE) adjacent to the target terminal apparatus may be determined as a cooperation terminal apparatus of the target terminal apparatus through random access. There may be a plurality of different cooperative transmission groups in a same cell. The cooperation terminal apparatus in this application may be a CUE, may be a sidelink user apparatus (side UE, SUE), or may be a relay user apparatus (relay UE). This is not limited herein. For ease of description, the CUE is used as an example for description in embodiments of this application.

A current sidelink data transmission solution supports only end-to-end single-hop data transmission. In this solution, sidelink data transmission requires a transmit end of data to initiate a transmission resource obtaining request to a network apparatus, and then the network apparatus configures a corresponding sidelink transmission resource for the transmit end. In a cooperative transmission scenario, second data transmitted on a sidelink is generated based on first data sent by the network apparatus to a cooperation terminal apparatus in a first phase. In addition, to implement cooperative transmission and improve performance of the cooperative transmission, the second data sent by the cooperation terminal apparatus to a target terminal apparatus on the sidelink is also related to a cooperative transmission process, so that after receiving a signal including second data from at least one cooperation terminal apparatus, the target terminal apparatus can better obtain the first data sent by the network apparatus to the target terminal apparatus. Therefore, a data initiator on the sidelink cannot serve as a separate data initiator. As a result, in the cooperative transmission scenario, at least two hops of data transmission are involved. A conventional resource allocation solution for sidelink data transmission cannot be directly used during resource allocation.

The present invention provides a downlink transmission solution through user cooperation with a plurality of cooperation UEs, to implement control signaling exchange and data transmission between a plurality of cooperation terminal apparatuses in a cooperative transmission scenario. SL resource allocation of the plurality of cooperation terminal apparatuses, and preconfiguration of some or all scheduling information on an SL. When a CUE correctly decodes data, the CUE performs data transmission on the SL based on a signaling indication. Through the signaling exchange and the data transmission, a transmission solution through user cooperation with a plurality of cooperation terminal apparatuses is enabled, data transmission reliability of a TUE is improved, and a system throughput is improved. Further, signaling is used to indicate a decoding manner of the TUE, to implement a soft combination indication and RV control. When the TUE receives signals from a plurality of CUEs, the TUE may learn that the signals transmitted by the plurality of CUEs on sidelinks can be combined.

In LTE V2X, there are two transmission modes: a base station allocation mode, which is defined as a mode 3 in an LTE standard; and a user autonomous-selection mode, which is defined as a mode 4 in the LTE standard.

The following uses the base station allocation mode as an example for description. The base station allocation mode is mainly applied to V2X communication in a network coverage case. A base station centrally performs resource allocation based on a reporting status of a buffer status report (BSR) of a terminal apparatus. The base station may perform resource allocation in a semi-persistent scheduling (SPS) mode or a dynamic mode. It should be noted that a sidelink transmission resource (for example, an MCS or an RB) may be partially or completely configured by a network apparatus.

Figure 2:
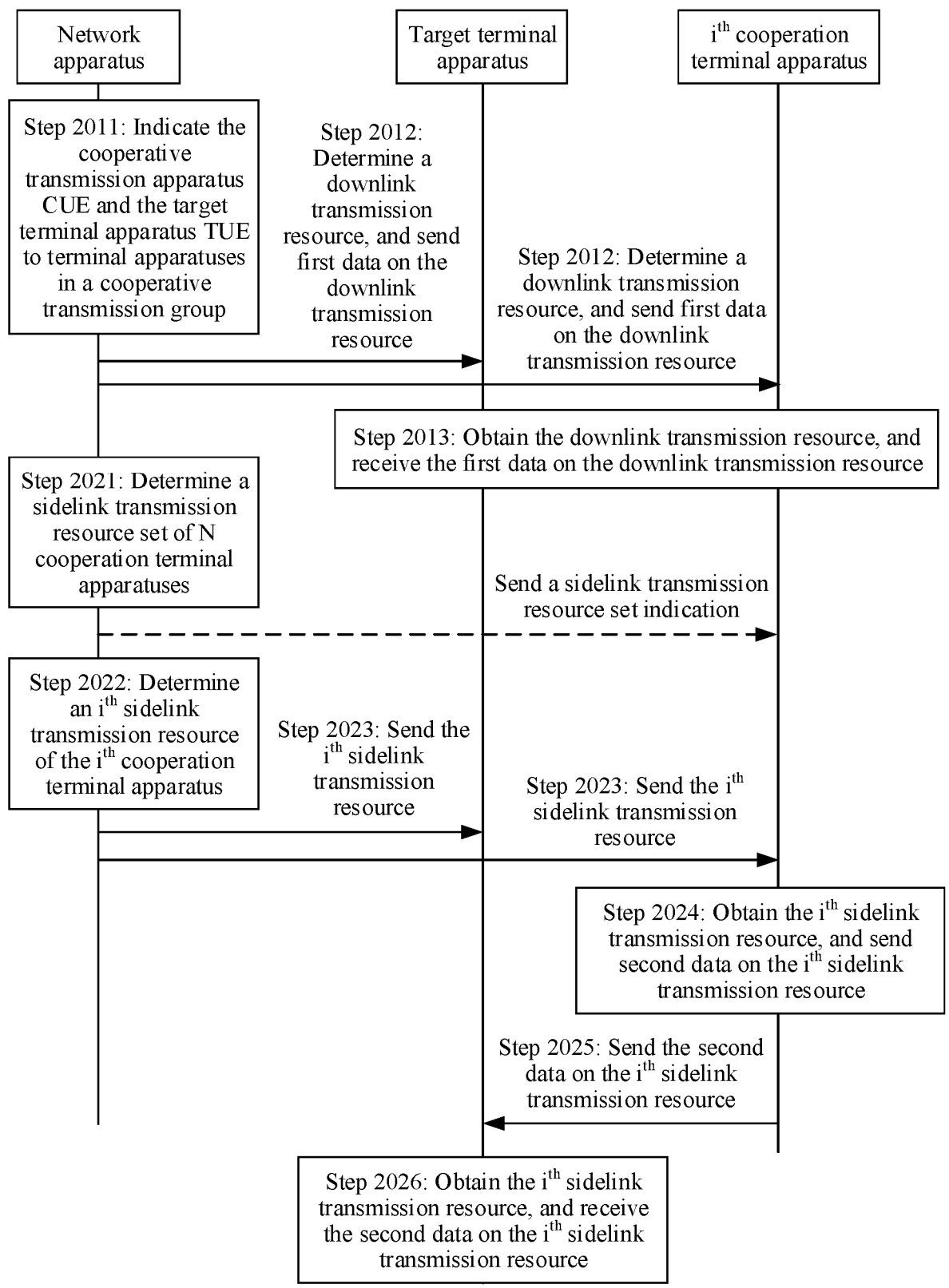
FIG. 2 is a schematic flowchart of a communication method according to an embodiment of this application.

In a possible scenario, a CUE and a TUE are in-coverage (in-coverage, IC) terminal apparatuses of the network apparatus. Based on the communication system 100 shown in FIG. 1a, a communication procedure through user cooperation is provided. A network apparatus in the procedure may be specifically the network apparatus 110 in FIG. 1a, a target terminal apparatus may be the terminal apparatus 120 in FIG. 1a, and cooperation terminal apparatuses may be the terminal apparatuses 130 and 140 in FIG. 1a. As shown in FIG. 2, the procedure includes the following steps.

Transmission based on user apparatus cooperation mainly includes two phases.

First Phase: Downlink Transmission Phase

Step 2011: The network apparatus indicates the cooperative transmission apparatus CUE and the target terminal apparatus TUE to terminal apparatuses in a cooperative transmission group.

For example, there are 10 cooperation terminal apparatuses in the cooperative transmission group. The network apparatus may select two cooperation terminal apparatuses from the cooperative transmission group as cooperation terminal apparatuses for current cooperative transmission, or a cooperation terminal apparatus may report that the cooperation terminal apparatus may be used for current cooperative transmission. This is not limited herein. As shown in FIG. 1a, two CUEs are used as an example. The network apparatus indicates to a UE 1 that the UE 1 is a CUE 1 and is configured to cooperate with the TUE on transmission. The network apparatus indicates to a UE 2 that the UE 2 is a CUE 2 and is configured to cooperate with the TUE on transmission. The network apparatus indicates to the TUE that the CUE 1 and the CUE 2 are cooperation users of the TUE and are configured to cooperate with the TUE on transmission. The network apparatus may send indications to the CUE and the TUE in a plurality of manners. For example, the network apparatus may determine a uniform identifier for the cooperation terminal apparatuses, and determine a target terminal apparatus identifier for the target terminal apparatus, to distinguish the CUE and the TUE. In a possible implementation, the CUE and the TUE may be distinguished by using a field through an RRC configuration. In another possible implementation, the CUE and the TUE may be indicated by using one bit through a dynamic DCI configuration. Alternatively, the network apparatus may configure different cooperation terminal apparatus identifiers for the cooperation terminal apparatuses, and determine a target terminal apparatus identifier for the target terminal apparatus, to distinguish the CUE and the TUE. In a possible implementation, the CUEs and the TUE may be distinguished by using a field through an RRC configuration. In another possible implementation, the CUEs and the TUE may be indicated by using a plurality of bits through a dynamic DCI configuration. For ease of description, the following cooperation terminal apparatus is the cooperation terminal apparatus used for the current cooperative transmission.

Step 2012: The network apparatus determines, for the CUE and the TUE, downlink transmission resources used by the network apparatus to transmit first data to the CUE and the TUE, and sends the first data to the CUE and the TUE on the downlink transmission resources.

In a possible implementation, the network apparatus may send the first data to N cooperation terminal apparatuses and the target terminal apparatus in a unicast manner. In this case, the downlink transmission resources occupied by the first data may be separately configured by the network apparatus for the N cooperation terminal apparatuses and the target terminal apparatus, and DCI may be separately sent to the N cooperation terminal apparatuses and the target terminal apparatus to configure the downlink transmission resources. That is, the network apparatus may send, to an $i^{th}$ cooperation terminal apparatus, first DCI that carries an $i^{th}$ downlink transmission resource. Correspondingly, the network apparatus sends, to the target terminal apparatus, first DCI that carries an $(N+1)^{th}$ downlink transmission resource. For example, the network apparatus may send the first data to the $i^{th}$ cooperation terminal on the $i^{th}$ downlink transmission resource. Correspondingly, the $i^{th}$ cooperation terminal apparatus receives the first data on the $i^{th}$ downlink transmission resource occupied by the first data, and sends an automatic repeat request feedback message based on a decoding result of the received first data and an automatic repeat request parameter in the $i^{th}$ downlink transmission resource, so that the network apparatus sends to-be-retransmitted data to the $i^{th}$ cooperation terminal apparatus. The target terminal apparatus may receive the first DCI sent by the network apparatus, to obtain the $(N+1)^{th}$ downlink transmission resource, and further receive the first data of the network apparatus on the $(N+1)^{th}$ downlink transmission resource.

In another possible implementation, the downlink transmission resource may be scheduled in a semi-persistent mode. For example, N cooperation terminal apparatuses and the target terminal apparatus belong to the same cooperative transmission group. The network apparatus may determine an $i^{th}$ downlink transmission resource of an $i^{th}$ cooperation terminal apparatus in a downlink transmission resource set. The $i^{th}$ cooperation terminal apparatus belongs to the N cooperation terminals, and the $i^{th}$ downlink transmission resource belongs to the $1^{st}$ downlink transmission resource to an $(N+1)^{th}$ downlink transmission resource, where i is an integer greater than or equal to 1 and less than or equal to N, and N is an integer greater than or equal to 1. The $i^{th}$ downlink transmission resource is used by the network apparatus to send the first data to the $i^{th}$ cooperation terminal apparatus, and the network apparatus sends the $i^{th}$ downlink transmission resource to the $i^{th}$ cooperation terminal apparatus. The $i^{th}$ downlink transmission resource may be different from or may be the same as a $j^{th}$ downlink transmission resource. This is not limited herein. The $j^{th}$ downlink transmission resource is a downlink transmission resource that is of a $j^{th}$ cooperation terminal apparatus and that is determined by the network apparatus, and the $j^{th}$ cooperation terminal apparatus belongs to the N cooperation terminals. In this case, the network apparatus may configure the determined $1^{st}$ downlink transmission resource of the $1^{st}$ cooperation terminal apparatus to the determined $(N+1)^{th}$ downlink transmission resource of the target terminal apparatus for the N cooperation terminal apparatuses and the target terminal apparatus by using RRC signaling. Further, the network apparatus may send the first data to the $i^{th}$ cooperation terminal apparatus on the $i^{th}$ downlink transmission resource.

Certainly, the network apparatus may alternatively send the first data in a multicast or broadcast manner. The network apparatus may configure the downlink transmission resources for the N cooperation terminal apparatuses and the target terminal apparatus through dynamic scheduling using DCI. For example, first DCI separately sent by the network apparatus to the N cooperation terminal apparatuses and the target terminal apparatus may include the downlink transmission resource of each of the N cooperation terminal apparatuses and the downlink transmission resource of the target terminal apparatus. Further, the first data is sent to the N cooperation terminal apparatuses and the target terminal apparatus on the configured downlink transmission resources. Two CUEs are used as an example. The downlink transmission resource set may include the $1^{st}$ downlink transmission resource, the $2^{nd}$ downlink transmission resource, and the $3^{rd}$ downlink transmission resource. The network apparatus may allocate a same downlink transmission resource to the TUE, the CUE 1, and the CUE 2, where the downlink transmission resource may be the $1^{st}$ downlink transmission resource in the downlink transmission resource set. In this case, the first DCI sent by the network apparatus to the N cooperation terminal apparatuses and the target terminal apparatus may include the $1^{st}$ downlink transmission resource. Further, the network apparatus may send the first data to the TUE, the CUE 1, and the CUE 2 on the $1^{st}$ downlink transmission resource in the multicast or broadcast manner. Correspondingly, after receiving the first DCI, the TUE, the CUE 1, and the CUE 2 receive the first data on the $1^{st}$ downlink transmission resource occupied by the first data.

In the semi-persistent mode of scheduling the downlink transmission resource, the network apparatus may configure a same downlink transmission resource for the N cooperation terminal apparatuses and the target terminal apparatus by using the RRC signaling. Further, the network apparatus may send the first data on the configured downlink transmission resource in the multicast or broadcast manner.

Step 2013: The CUE and the TUE obtain the downlink transmission resources, and receive the first data from the network apparatus on the downlink transmission resources.

In a unicast-based dynamic scheduling manner, the $i^{th}$ cooperation terminal apparatus may receive the first DCI from the network apparatus. In this case, the first DCI includes the $i^{th}$ downlink transmission resource determined for the $i^{th}$ cooperation terminal apparatus. Further, the $i^{th}$ cooperation terminal apparatus receives the first data from the network apparatus on the $i^{th}$ downlink transmission resource. For example, the CUE i blindly detects the first DCI in a candidate search space. If parsing succeeds, the CUE i may determine the $i^{th}$ downlink transmission resource that is carried in the first DCI and that is used to transmit the first data.

Correspondingly, the target terminal apparatus may receive the first DCI from the network apparatus. In this case, the first DCI includes the $(N+1)^{th}$ downlink transmission resource determined for the target terminal apparatus. For example, the TUE blindly detects the first DCI in a candidate search space. If parsing succeeds, the TUE may determine the $(N+1)^{th}$ downlink transmission resource that is carried in the first DCI and that is used to transmit the first data. Further, the target terminal apparatus receives the first data from the network apparatus on the $(N+1)^{th}$ downlink transmission resource.

In a unicast-based semi-persistent scheduling manner, the $i^{th}$ cooperation terminal apparatus may determine, based on the RRC signaling from the network apparatus, the $i^{th}$ downlink transmission resource determined by the network apparatus for the $i^{th}$ cooperation terminal apparatus. Further, the $i^{th}$ cooperation terminal apparatus receives the first data from the network apparatus on the $i^{th}$ downlink transmission resource. Correspondingly, the target terminal apparatus may determine, based on the RRC signaling from the network apparatus, the $(N+1)^{th}$ downlink transmission resource determined by the network apparatus for the target terminal apparatus. Further, the target terminal apparatus receives the first data from the network apparatus on the $(N+1)^{th}$ downlink transmission resource.

In a multicast-based or broadcast-based dynamic scheduling manner, the N cooperation terminal apparatuses and the target terminal apparatus receive the first DCI from the network apparatus. In this case, the first DCI includes the downlink transmission resource determined for the N cooperation terminal apparatuses and the target terminal apparatus. For example, the CUE and the TUE blindly detect the first DCI in a candidate search space. If parsing succeeds, the CUE and the TUE may determine the downlink transmission resource that is carried in the first DCI and that is used to transmit the first data. Further, the N cooperation terminal apparatuses and the target terminal apparatus receive the first data from the network apparatus on the downlink transmission resource.

In a multicast-based or broadcast-based semi-persistent scheduling manner, the N cooperation terminal apparatuses and the target terminal apparatus determine, based on the RRC signaling from the network apparatus, the downlink transmission resource determined by the network apparatus for the N cooperation terminal apparatuses and the target terminal apparatus. Further, the N cooperation terminal apparatuses and the target terminal apparatus receive the first data from the network apparatus on the downlink transmission resource.

Second Phase: Sidelink Transmission Phase

Each cooperation terminal apparatus may establish a sidelink with the target terminal apparatus. This may be applied to a process in which the network apparatus actively allocates a sidelink transmission resource to the terminal apparatus, or may be applied to a process in which the network apparatus passively allocates a sidelink transmission resource to the terminal apparatus. The process in which the network apparatus passively allocates the sidelink transmission resource to the terminal apparatus may include: The terminal apparatus sends a sidelink resource request to the network apparatus. After receiving the sidelink resource request, the network apparatus allocates the sidelink transmission resource to the terminal apparatus. That is, the procedure shown in FIG. 1a may further include: The CUE sends an SL resource request to the network apparatus.

A specific sidelink transmission process may include the following steps.

Step 2021: The network apparatus determines a sidelink transmission resource set of the N cooperation terminal apparatuses.

The N cooperation terminal apparatuses and the target terminal apparatus belong to the same cooperative transmission group. The sidelink transmission resource set includes the $1^{st}$ sidelink transmission resource to an $N^{th}$ sidelink transmission resource. The $1^{st}$ sidelink transmission resource to the $N^{th}$ sidelink transmission resource may be used by the N cooperation terminal apparatuses to send second data to the target terminal apparatus. The second data is determined by the $i^{th}$ cooperation terminal apparatus based on the first data sent by the network apparatus to the $i^{th}$ cooperation terminal apparatus.

Sidelink transmission resources of the $1^{st}$ sidelink transmission resource to the $N^{th}$ sidelink transmission resource may be the same or may be different. This is not limited herein.

In this case, the network apparatus may send a sidelink transmission resource set indication to the N cooperation terminal apparatuses and/or the target terminal apparatus. For example, second DCI may be sent to send the sidelink transmission resource set indication to the N cooperation terminal apparatuses and the target terminal apparatus. The second DCI is used to indicate a sidelink transmission resource set allocated by the network apparatus to a first CUE to transmit the second data. For example, the network apparatus determines a sidelink transmission resource set for the CUE 1 and the CUE 2, where the sidelink transmission resource set includes the $1^{st}$ sidelink transmission resource and the $2^{nd}$ sidelink transmission resource. The network apparatus generates second DCI that carries the sidelink transmission resource set, and then sends the second DCI to the CUE 1 and the CUE 2. Certainly, the sidelink transmission resource set may alternatively be configured by using RRC signaling, to be notified to the N cooperation terminal apparatuses and the target terminal apparatus. This is not limited herein.

Step 2022: The network apparatus determines an $i^{th}$ sidelink transmission resource of the $i^{th}$ cooperation terminal apparatus.

The $i^{th}$ cooperation terminal apparatus belongs to the N cooperation terminals, and the $i^{th}$ sidelink transmission resource belongs to the sidelink transmission resource set. The $i^{th}$ sidelink transmission resource is used by the $i^{th}$ cooperation terminal apparatus to send the second data to the target terminal apparatus, i is an integer greater than or equal to 1 and less than or equal to N, and N is an integer greater than or equal to 1.

Further, to reduce resource collision and therefore avoid affecting performance of sidelink transmission, the $i^{th}$ sidelink transmission resource in the sidelink transmission resource set may be different from a $j^{th}$ sidelink transmission resource, the $j^{th}$ sidelink transmission resource may be a sidelink transmission resource that is of the $j^{th}$ cooperation terminal apparatus and that is determined by the network apparatus, and the $j^{th}$ cooperation terminal apparatus belongs to the N cooperation terminals, where j is an integer greater than or equal to 1 and less than or equal to N, and j is not equal to i.

In another possible implementation, if the network apparatus determines that second data sent by the $i^{th}$ cooperation terminal apparatus and the $j^{th}$ cooperation terminal apparatus to the target terminal apparatus is the same, the network apparatus may determine that the $i^{th}$ sidelink transmission resource of the $i^{th}$ cooperation terminal apparatus and the $j^{th}$ sidelink transmission resource of the $j^{th}$ cooperation terminal apparatus are the same sidelink transmission resource.

In another possible design, for a scenario in which a same sidelink transmission resource is configured for all the N cooperation terminals, the network apparatus may determine that a sidelink transmission resource of each cooperation terminal apparatus is the $i^{th}$ sidelink transmission resource in the sidelink transmission resource set. In other words, the network apparatus may determine the $i^{th}$ sidelink transmission resource of the N cooperation terminal apparatuses. The $i^{th}$ sidelink transmission resource belongs to the $1^{st}$ sidelink transmission resource to the $N^{th}$ sidelink transmission resource. The $i^{th}$ sidelink transmission resource may be different from a $j^{th}$ sidelink transmission resource in the sidelink transmission resource set, where j is an integer greater than or equal to 1 and less than or equal to N, and j is not equal to i. Alternatively, the $i^{th}$ sidelink transmission resource may be the same as a $j^{th}$ sidelink transmission resource in the sidelink transmission resource set. This is not limited herein. Further, the network apparatus may send the sidelink transmission resource to the N cooperation terminal apparatuses and the target terminal apparatus.

For a Dynamic Scheduling Scenario:

The network apparatus sends the sidelink transmission resource set indication to the CUE and the TUE, and sends third DCI to the CUE and the TUE in a dynamic scheduling mode when determining that the CUE needs to send the second data to the TUE.

In a possible implementation, the third DCI is used to indicate the sidelink transmission resource determined by the network apparatus for the CUE to transmit the second data. There may be a plurality of pieces of third DCI. That is, the network apparatus may determine different time-frequency resources or code resources for the CUEs, and each CUE corresponds to one piece of third DCI. The network apparatus sends each piece of third DCI to the corresponding CUE in the unicast manner, and sends all the third DCI to the TUE.

In another possible implementation, there may be one piece of third DCI. For example, the network apparatus determines, for the CUEs, a same sidelink transmission resource used to transmit the second data, and the network apparatus may send the third DCI to the CUEs and the TUE in the broadcast manner. In another possible implementation, the network apparatus may alternatively include, in one piece of third DCI, different sidelink transmission resources that are separately determined for the CUEs to transmit the second data, and the network apparatus may send the third DCI to the CUEs and the TUE in the multicast manner.

For a semi-persistent scheduling scenario:

In a possible implementation, the network apparatus may notify, by using RRC signaling, the CUE and the TUE of the sidelink transmission resource used to transmit the second data. The RRC is used to indicate the sidelink transmission resource determined by the network apparatus for the CUE to transmit the second data.

Step 2023: The network apparatus sends the $i^{th}$ sidelink transmission resource to the $i^{th}$ cooperation terminal apparatus and the target terminal apparatus.

For the dynamic scheduling scenario:

In a possible implementation, the network apparatus sends the sidelink transmission resource set indication to the N cooperation terminal apparatuses and the target terminal apparatus. The sidelink transmission resource set indication may be specifically sent by using the second DCI. In this case, the second DCI is used to indicate the sidelink transmission resource set allocated by the network apparatus to the first CUE to transmit the second data. For example, the network apparatus determines the sidelink transmission resource set for the CUE 1 and the CUE 2, where the sidelink transmission resource set includes the $1^{st}$ sidelink transmission resource and the $2^{nd}$ sidelink transmission resource. The network apparatus generates the second DCI that carries the sidelink transmission resource set, and then sends the second DCI to the CUE 1 and the CUE 2. Certainly, the sidelink transmission resource set may alternatively be configured by using the RRC signaling. In this case, the $i^{th}$ cooperation terminal apparatus may receive, based on the second DCI or the RRC signaling, the sidelink transmission resource set sent by the network apparatus.

In a possible implementation, it is assumed that the network apparatus may send the third DCI for the $i^{th}$ cooperation terminal apparatus to the $i^{th}$ cooperation terminal apparatus and the target terminal apparatus in the unicast manner. In this case, the $i^{th}$ cooperation terminal apparatus determines, based on the third DCI from the network apparatus, the $i^{th}$ sidelink transmission resource allocated by the network apparatus to the $i^{th}$ cooperation terminal apparatus to transmit the second data.

In another possible implementation, the network apparatus includes, in one piece of third DCI, the different sidelink transmission resources that are separately configured for the cooperation terminal apparatuses to transmit the second data, and sends the third DCI to the N cooperation terminal apparatuses and the target terminal apparatus. In this case, the $i^{th}$ cooperation terminal apparatus may parse only a field corresponding to the $i^{th}$ cooperation terminal apparatus in the third DCI, to determine the $i^{th}$ sidelink transmission resource used by the $i^{th}$ cooperation terminal apparatus to transmit the second data.

For the semi-persistent scheduling scenario:

The network apparatus may notify, by using the RRC signaling, the $i^{th}$ cooperation terminal apparatus and the target terminal apparatus of the $i^{th}$ sidelink transmission resource determined by the network apparatus.

For example, if the network apparatus determines the $1^{st}$ sidelink transmission resource of the $1^{st}$ cooperation terminal apparatus and the $2^{nd}$ sidelink transmission resource of the $2^{nd}$ cooperation terminal apparatus, the network apparatus may notify, by using the RRC signaling, that a sidelink transmission resource of the $1^{st}$ cooperation terminal apparatus is the $1^{st}$ sidelink transmission resource and that a sidelink transmission resource of the $2^{nd}$ cooperation terminal apparatus is the $2^{nd}$ sidelink transmission resource.

Further, to improve efficiency of the cooperative transmission, the network apparatus may indicate whether the second data sent by the cooperation terminal apparatus to the target terminal apparatus is data on which the target terminal apparatus is to perform soft combination, so that the cooperation terminal apparatus generates the second data based on a soft combination indication. It should be noted that the data on which the soft combination is to be performed means that the second data of the $i^{th}$ cooperation terminal apparatus and the second data of the $j^{th}$ cooperation terminal apparatus that are received by the target terminal apparatus are same data obtained through decoding, and therefore may be combined for decoding, to improve a success rate of decoding the second data by the target terminal apparatus.

In a specific implementation process, the network apparatus may determine an $i^{th}$ soft combination indication field of the $i^{th}$ cooperation terminal apparatus, where the $i^{th}$ soft combination indication field is used to indicate whether the second data sent by the $i^{th}$ cooperation terminal apparatus to the target terminal apparatus is the data on which the target terminal apparatus is to perform soft combination.

In this case, the network apparatus may send, to the $i^{th}$ cooperation terminal apparatus in a dynamic scheduling manner, fourth DCI that carries the $i^{th}$ soft combination indication field. In addition, the network apparatus may alternatively determine a soft combination indication field set for the N cooperation terminal apparatuses, where the soft combination indication field set includes the $1^{st}$ soft combination indication field to an $N^{th}$ soft combination indication field. The network apparatus may determine the $i^{th}$ soft combination indication field for the $i^{th}$ cooperation terminal apparatus when required, and send the $i^{th}$ soft combination indication field to the $i^{th}$ cooperation terminal apparatus and the target terminal apparatus after determining the $i^{th}$ soft combination indication field. It should be noted that the fourth DCI and the third DCI may be combined into one piece of DCI to be sent, or may be sent separately. This is not limited herein. In another possible implementation, the network apparatus may alternatively configure the $i^{th}$ soft combination indication field for the $i^{th}$ cooperation terminal apparatus in a semi-persistent scheduling manner. In another possible implementation, after receiving a soft combination indication field set and when determining that the second data needs to be forwarded to the target terminal apparatus, the $i^{th}$ cooperation terminal apparatus may independently select a soft combination indication field from the soft combination indication field set, and forward, to the target terminal apparatus based on an indication manner in the selected soft combination indication field, the second data on which the soft combination needs or does not need to be performed.

In a possible design, if a soft combination indication in the $i^{th}$ soft combination indication field is 0, it indicates that the soft combination does not need to be performed on the second data sent by the $i^{th}$ cooperation terminal apparatus to the target terminal apparatus. If a soft combination indication in the $i^{th}$ soft combination indication field is 1, it indicates that the second data sent by the $i^{th}$ cooperation terminal apparatus to the target terminal apparatus may be combined with second data sent by another cooperation terminal apparatus to the target terminal apparatus.

For example, if a soft combination indication in the $1^{st}$ soft combination indication field of the $i^{th}$ cooperation terminal apparatus is 0, the $i^{th}$ cooperation terminal apparatus determines that the soft combination does not need to be performed on second data sent to the target terminal apparatus. If a soft combination indication in the $2^{nd}$ soft combination indication field of the $2^{nd}$ cooperation terminal apparatus is 1, the $2^{nd}$ cooperation terminal apparatus determines that the soft combination needs to be performed on second data sent to the target terminal apparatus.

In another possible design, the $i^{th}$ soft combination indication field may include a first time offset and/or a second time offset.

The first time offset is used to indicate that, if the target terminal apparatus receives the second data from the $i^{th}$ cooperation terminal apparatus at a second moment obtained by increasing a first moment by the time offset, the second data is determined as the data on which the target terminal apparatus is to perform soft combination, where the first moment is a moment of receiving sidelink control signaling sent by the $i^{th}$ cooperation terminal apparatus. The second time offset is used to indicate that, if the target terminal apparatus receives the second data from the $i^{th}$ cooperation terminal apparatus at a third moment obtained by increasing the first moment by the second time offset, the second data is determined as data on which the target terminal apparatus is not to perform soft combination.

It should be noted that the first time offset and/or the second time offset in the $i^{th}$ soft combination indication field determined by the network apparatus for the $i^{th}$ cooperation terminal apparatus may be the same as or different from a first time offset and/or a second time offset in a $j^{th}$ soft combination indication field determined by the network apparatus for the $j^{th}$ cooperation terminal apparatus. This is not limited herein.

If determining that first time offsets and/or second time offsets in the $1^{st}$ soft combination indication field to the $N^{th}$ soft combination indication field determined for the N cooperation terminal apparatuses are the same, the network apparatus may send one soft combination indication field to the N cooperation terminal apparatuses and the target terminal apparatus, to reduce signaling consumption.

If determining that first time offsets and/or second time offsets in the $1^{st}$ soft combination indication field to the $N^{th}$ soft combination indication field determined for the N cooperation terminal apparatuses are different, the network apparatus may send one soft combination indication field set to the N cooperation terminal apparatuses and the target terminal apparatus, where the soft combination indication field set includes the $1^{st}$ soft combination indication field to the $N^{th}$ soft combination indication field. Further, the N cooperation terminal apparatuses and the target terminal apparatus may determine, based on the received soft combination indication field set, a soft combination indication field corresponding to each cooperation terminal apparatus, so that the cooperation terminal apparatus may generate the second data based on the corresponding soft combination indication field, and send the second data to the target terminal. Correspondingly, the target terminal apparatus may determine, based on the soft combination indication field set, whether the second data sent by the N cooperation terminal apparatuses is data on which the soft combination may be performed.

In another possible design, the $i^{th}$ soft combination indication field may be set in the $i^{th}$ sidelink transmission resource. For example, the $i^{th}$ soft combination indication field may be determined by configuring different transmission resources. Specifically, the $i^{th}$ sidelink transmission resource may include a first transmission resource and a second transmission resource.

In a possible implementation, the first transmission resource is used to indicate that the second data sent by the $i^{th}$ cooperation terminal apparatus to the target terminal apparatus on the first transmission resource is data on which the target terminal apparatus is to perform soft combination, and the second transmission resource is used to indicate that the second data sent by the $i^{th}$ cooperation terminal apparatus to the target terminal apparatus on the second transmission resource is data on which the target terminal apparatus is not to perform soft combination.

In still another possible design, the $i^{th}$ soft combination indication field may be determined based on a time-frequency resource, that is, an $i^{th}$ time-frequency resource in the $i^{th}$ sidelink transmission resource includes a first time-frequency resource and a second time-frequency resource. The $i^{th}$ sidelink transmission resource further includes an $i^{th}$ sidelink transmission parameter. The first time-frequency resource is used to indicate that the second data sent by the $i^{th}$ cooperation terminal apparatus to the target terminal apparatus on the first time-frequency resource by using the $i^{th}$ sidelink transmission parameter is data on which the target terminal apparatus is to perform soft combination, and the second time-frequency resource is used to indicate that the second data sent by the $i^{th}$ cooperation terminal apparatus to the target terminal apparatus on the second time-frequency resource by using the $i^{th}$ sidelink transmission parameter is data on which the target terminal apparatus is not to perform soft combination.

In still another possible design, the $i^{th}$ soft combination indication field may be determined based on a code resource, that is, an $i^{th}$ code resource in the $i^{th}$ sidelink transmission resource includes a first code resource and a second code resource. The $i^{th}$ sidelink transmission resource further includes an $i^{th}$ time-frequency resource. The first code resource is used to indicate that the second data sent by the $i^{th}$ cooperation terminal apparatus to the target terminal apparatus on the $i^{th}$ time-frequency resource and the first code resource is data on which the target terminal apparatus is to perform soft combination, and the second code resource is used to indicate that the second data sent by the $i^{th}$ cooperation terminal apparatus to the target terminal apparatus on the $i^{th}$ time-frequency resource and the second code resource is data on which the target terminal apparatus is not to perform soft combination.

Certainly, the first transmission resource in the $i^{th}$ soft combination indication field includes one or more of the following: the first time-frequency resource and the first code resource; and the second transmission resource includes one or more of the following: the second time-frequency resource and the second code resource. This is not limited herein.

To further improve performance of the cooperative transmission and increase the decoding success rate of the target terminal apparatus, the cooperation terminal apparatus may further send third data to the target terminal apparatus, where the cooperation terminal apparatus may send the third data at a start location of a redundancy version while sending the second data. The third data may be a part of the first data determined by the cooperation terminal apparatus; or may be a part of the second data generated by the cooperation terminal apparatus. This is not limited herein. That is, the third data is data that is generated by the $i^{th}$ cooperation terminal apparatus based on the first data received from the network apparatus and on which the target terminal apparatus is to perform soft combination. Specifically, the start location at which the $i^{th}$ cooperation terminal apparatus is to send the third data may be determined by the network apparatus for the $i^{th}$ cooperation terminal apparatus, or may be independently selected by the $i^{th}$ cooperation terminal apparatus. This is not limited herein.

In a possible design, the $i^{th}$ sidelink transmission resource further includes an $i^{th}$ redundancy version set, where the $i^{th}$ redundancy version set includes at least one redundancy version, and the redundancy version set is used by the $i^{th}$ cooperation terminal apparatus to determine a first redundancy version in the redundancy version set.

In a possible implementation, the first redundancy version is used by the $i^{th}$ cooperation terminal apparatus to determine, based on the first redundancy version, the start location at which the $i^{th}$ cooperation terminal apparatus is to send the third data on which the soft combination needs to be performed, where the third data is generated by the $i^{th}$ cooperation terminal based on the first data received from the network apparatus.

In still another possible design, the redundancy version may alternatively be determined in another manner. For example, the $i^{th}$ sidelink transmission resource further includes an $i^{th}$ redundancy version set, the $i^{th}$ redundancy version set includes at least one redundancy version, and the redundancy version is used by the $i^{th}$ cooperation terminal apparatus to determine a second redundancy version based on an intra-group identifier of the $i^{th}$ cooperation terminal apparatus in the cooperative transmission group. The second redundancy version is used by the $i^{th}$ cooperation terminal apparatus to determine, based on the second redundancy version, the start location at which the $i^{th}$ cooperation terminal apparatus is to send the third data on which the soft combination needs to be performed.

Step 2024: The $i^{th}$ cooperation terminal apparatus receives, from the network apparatus, the $i^{th}$ sidelink transmission resource used to transmit the second data.

In a possible implementation, before sending the $i^{th}$ sidelink transmission resource, the network apparatus may further send the sidelink transmission resource set indication to the first CUE. The sidelink transmission resource set indication may be specifically sent by using the second DCI. In other words, the second DCI is used to indicate the sidelink transmission resource set allocated by the network apparatus to the first CUE to transmit the second data. For example, the network apparatus determines the sidelink transmission resource set for the CUE 1 and the CUE 2, where the sidelink transmission resource set includes the $1^{st}$ sidelink transmission resource and the $2^{nd}$ sidelink transmission resource. The network apparatus generates the second DCI that carries the sidelink transmission resource set, and then sends the second DCI to the CUE 1 and the CUE 2. Certainly, the sidelink transmission resource set may alternatively be configured by using the RRC signaling. In this case, the $i^{th}$ cooperation terminal apparatus may receive, based on the second DCI or the RRC signaling, the sidelink transmission resource set indication sent by the network apparatus.

For the dynamic scheduling scenario:

In a possible implementation, assuming that the network apparatus sends the third DCI for the $i^{th}$ cooperation terminal apparatus to the $i^{th}$ cooperation terminal apparatus and the target terminal apparatus in the unicast manner, the $i^{th}$ cooperation terminal apparatus may determine, based on the third DCI from the network apparatus, the $i^{th}$ sidelink transmission resource allocated by the network apparatus to the $i^{th}$ cooperation terminal apparatus to transmit the second data.

In another possible implementation, if the network apparatus includes, in one piece of third DCI, the different sidelink transmission resources that are separately determined for the cooperation terminal apparatuses to transmit the second data, the $i^{th}$ cooperation terminal apparatus may receive the $i^{th}$ sidelink transmission resource by using the third DCI. Specifically, the $i^{th}$ cooperation terminal apparatus may parse only the field corresponding to the $i^{th}$ cooperation terminal apparatus in the third DCI, to determine the $i^{th}$ sidelink transmission resource used by the $i^{th}$ cooperation terminal apparatus to transmit the second data.

For the semi-persistent scheduling scenario:

The network apparatus may notify, by using the RRC signaling, the $i^{th}$ cooperation terminal apparatus of the $i^{th}$ sidelink transmission resource determined by the network apparatus. In this case, the $i^{th}$ cooperation terminal apparatus may receive the $i^{th}$ sidelink transmission resource by using the RRC signaling.

With reference to the example in step 2023, if the network apparatus determines the $1^{st}$ sidelink transmission resource of the $1^{st}$ cooperation terminal apparatus and the $2^{nd}$ sidelink transmission resource of the $2^{nd}$ cooperation terminal apparatus, the $1^{st}$ cooperation terminal apparatus may determine, based on the RRC signaling, that the sidelink transmission resource of the $1^{st}$ cooperation terminal apparatus is the $1^{st}$ sidelink transmission resource. The $2^{nd}$ cooperation terminal apparatus determines, based on the RRC signaling, that the sidelink transmission resource of the $2^{nd}$ cooperation terminal apparatus is the $2^{nd}$ sidelink transmission resource.

It should be noted that, for the scenario in which the same sidelink transmission resource is configured for all the N cooperation terminals, a first cooperation terminal apparatus may receive the $i^{th}$ sidelink transmission resource from the network apparatus, where the first cooperation terminal apparatus is the $i^{th}$ cooperation terminal apparatus in the N cooperation terminals, the $i^{th}$ sidelink transmission resource belongs to the $1^{st}$ sidelink transmission resource to the $N^{th}$ sidelink transmission resource, the $i^{th}$ sidelink transmission resource is a sidelink transmission resource of the N cooperation terminal apparatuses, and the $i^{th}$ sidelink transmission resource is different from the $j^{th}$ sidelink transmission resource.

Further, the $i^{th}$ cooperation terminal apparatus may generate the second data based on the first data.

For example, if both the CUE 1 and the CUE 2 correctly receive the sidelink transmission resource and the first data, the CUE 1 and the CUE 2 may forward the correctly received sidelink transmission resource and/or the second data to the TUE.

After receiving the first data, the CUE 1 may generate the second data in a plurality of manners. In a possible implementation, the downlink control information may further include a manner configured by the network apparatus for the CUE 1 to generate the second data. For example, the second data is a part of the first data, all the first data, or data in a signal that includes the first data and that is correctly received by the CUE 1 and sent by the network apparatus. This is not limited herein. In another possible implementation, a manner in which the CUE 1 generates the second data may be preconfigured by the network apparatus for the CUE 1, or may be a second data generation manner selected by the CUE 1 based on a requirement from a plurality of generation manners set in a standard.

After generating the second data, the CUE 1 may send the second data to the TUE on the $1^{st}$ sidelink transmission resource.

Before sending the second data, the CUE 1 may further send SCI to the TUE, where the SCI carries the $1^{st}$ sidelink transmission resource.

Further, the CUE 1 may determine, based on a HARQ-acknowledgement message or a HARQ-negative acknowledgement message sent by the TUE, whether the TUE has received the $1^{st}$ sidelink transmission resource. If determining that the TUE has received the $1^{st}$ sidelink transmission resource, the CUE 1 may cancel sending the SCI, to reduce signaling consumption.

A specific forwarding manner may be amply-and-forward, decode-and-transcode, compress-and-forward, or the like. The forwarded second data may be a part of the first data, or may be all the first data. The CUE 1 and the CUE 2 may forward a same part of the first data, or may forward different parts of the first data. The specific forwarding manner may be determined by the network apparatus for the cooperative transmission group, or may be determined by the cooperative transmission group through negotiation. This is not limited herein. Certainly, the second data may further include a decoding result obtained by decoding the first data by the CUE, so that the TUE obtains the decoding result of the CUE, to improve data receiving performance.

Further, to improve the efficiency of the cooperative transmission, the network apparatus may indicate whether the second data sent by the cooperation terminal apparatus to the target terminal apparatus is the data on which the target terminal apparatus is to perform soft combination, so that the cooperation terminal apparatus generates the second data based on the soft combination indication.

In a specific implementation process, for a manner in which the network apparatus determines the $i^{th}$ soft combination indication field of the $i^{th}$ cooperation terminal apparatus, the $i^{th}$ cooperation terminal apparatus receives the $i^{th}$ soft combination indication field. In this case, the $i^{th}$ cooperation terminal apparatus receives the fourth DCI that carries the $i^{th}$ soft combination indication field; or the $i^{th}$ cooperation terminal apparatus receives the fourth DCI that carries the $i^{th}$ soft combination indication field, and further determines the $i^{th}$ soft combination indication field. In another possible manner, the $i^{th}$ cooperation terminal apparatus determines the $i^{th}$ soft combination indication field based on RRC signaling.

For example, if the soft combination indication in the $1^{st}$ soft combination indication field of the $i^{th}$ cooperation terminal apparatus is 0, the $i^{th}$ cooperation terminal apparatus determines that the soft combination does not need to be performed on the second data sent to the target terminal apparatus, and the $1^{st}$ cooperation terminal apparatus may further generate the second data different from that of another cooperation terminal apparatus, or may generate the second data the same as that of another cooperation terminal apparatus. Certainly, the $1^{st}$ cooperation terminal apparatus may use, as the second data based on a result of decoding the first data, a part that is of the first data and whose accuracy rate is higher than a first threshold, or may use a result of decoding the first data as a part of the second data.

If the soft combination indication in the $1^{st}$ soft combination indication field of the $1^{st}$ cooperation terminal apparatus is 1, the $1^{st}$ cooperation terminal apparatus determines that the soft combination needs to be performed on the second data sent to the target terminal apparatus. In this case, the $1^{st}$ cooperation terminal apparatus needs to generate the second data the same as that of another cooperation terminal apparatus. A specific way to determine content of the same second data generated may be set by the network apparatus, or may be determined by the cooperation terminal apparatuses through negotiation. This is not limited herein.

In another possible design, the $i^{th}$ sidelink transmission resource received by the $i^{th}$ cooperation terminal apparatus may further include the $i^{th}$ soft combination indication field. Correspondingly, the $i^{th}$ cooperation terminal determines, based on the $i^{th}$ soft combination indication field, whether the second data sent to the target terminal apparatus is the data on which the target terminal apparatus is to perform soft combination.

In another possible design, the $i^{th}$ soft combination indication field may include the first time offset and/or the second time offset.

In this case, if determining that the $i^{th}$ soft combination indication field includes the first time offset, the $i^{th}$ cooperation terminal apparatus determines that the second data that needs to be sent is the data on which the target terminal apparatus is to perform soft combination. If determining that the $i^{th}$ soft combination indication field includes the second time offset, the $i^{th}$ cooperation terminal apparatus determines that the second data that needs to be sent is the data on which the target terminal apparatus is not to perform soft combination.

In another possible design, the $i^{th}$ soft combination indication field may be set in the $i^{th}$ sidelink transmission resource. For example, the $i^{th}$ soft combination indication field may be determined by configuring different transmission resources. In a scenario in which the $i^{th}$ sidelink transmission resource includes the first transmission resource and the second transmission resource, if determining that the second data is the data on which the target terminal apparatus needs to perform soft combination, the $i^{th}$ cooperation terminal apparatus may select the first transmission resource to send the second data. If determining that the second data is the data on which the target terminal apparatus does not need to perform soft combination, the $i^{th}$ cooperation terminal apparatus may select the second transmission resource to send the second data.

For a scenario in which the $i^{th}$ sidelink transmission resource further includes the $i^{th}$ redundancy version set, the $i^{th}$ redundancy version set includes the at least one redundancy version, and the redundancy version set is used by the $i^{th}$ cooperation terminal apparatus to determine the first redundancy version in the redundancy version set.

In a possible implementation, if determining that the third data is the data on which the target terminal apparatus needs to perform soft combination, the $i^{th}$ cooperation terminal apparatus may select the first redundancy version as the start location at which the $i^{th}$ cooperation terminal apparatus is to send the third data on which the soft combination needs to be performed. In another possible implementation, after determining the first redundancy version in the redundancy version set, the $i^{th}$ cooperation terminal apparatus may send the first redundancy version to the target terminal apparatus by using SCI. Further, the target terminal apparatus may start receiving the third data at the start location for the third data based on the first redundancy version, and use the third data as the data on which the soft combination is to be performed.

Two CUEs are used as an example. The $1^{st}$ redundancy version set determined by the network apparatus for the $1^{st}$ cooperation terminal apparatus CUE 1 by using RRC is {an RV 0, an RV 1}, and the $2^{nd}$ redundancy version set determined by the network apparatus for the $2^{nd}$ cooperation terminal apparatus CUE 2 is {an RV 3, an RV 4}. When sending third data to the TUE, the CUE 1 may select a first redundancy version from the $1^{st}$ redundancy version set. For example, the $1^{st}$ cooperation terminal apparatus may select the RV 1 as a redundancy version for sending the third data by the $1^{st}$ cooperation terminal apparatus. The $2^{nd}$ cooperation terminal apparatus may also select a first redundancy version from the $2^{nd}$ redundancy version set. For example, the $2^{nd}$ cooperation terminal apparatus may select the RV 3 as a redundancy version for sending the third data by the $1^{st}$ cooperation terminal apparatus.

Certainly: when determining that the $i^{th}$ cooperation terminal apparatus needs to send the third data, the network apparatus may alternatively indicate the first redundancy version of the $i^{th}$ cooperation terminal apparatus by sending DCI. Specifically, the $i^{th}$ cooperation terminal apparatus receives the DCI sent by the network apparatus, where the DCI carries the first redundancy version, and the first redundancy version is used to indicate that the $i^{th}$ cooperation terminal apparatus needs to send, to the target terminal apparatus, the third data on which the soft combination is to be performed. For example, when determining that the $1^{st}$ cooperation terminal apparatus needs to send the third data, the network apparatus sends DCI carrying the RV 1, to indicate that the first redundancy version of the $i^{th}$ cooperation terminal apparatus is the RV 1. In this case, the network apparatus may send the DCI to the target terminal apparatus, so that the terminal apparatus receives the third data at the start location corresponding to the first redundancy version, and determines that the to-be-received third data is the data on which the soft combination is to be performed.

In still another possible design, the redundancy version may alternatively be determined in another manner. For example, the $i^{th}$ sidelink transmission resource may further include the $i^{th}$ redundancy version set, and the $i^{th}$ redundancy version set includes the at least one redundancy version. Specifically, the network apparatus may preconfigure the $i^{th}$ redundancy version set of the $i^{th}$ cooperative transmission apparatus by using RRC or DCI. In this case, redundancy version sets corresponding to the cooperative transmission apparatuses may be the same. This is not limited herein. Correspondingly, the $i^{th}$ cooperation terminal apparatus may independently select the second redundancy version used to transmit the third data. The second redundancy version is used by the $i^{th}$ cooperation terminal apparatus to determine, based on the second redundancy version, the start location at which the $i^{th}$ cooperation terminal apparatus is to send the third data on which the soft combination needs to be performed.

In this case, if determining that the third data needs to be sent to the target terminal apparatus, the $i^{th}$ cooperation terminal apparatus may determine the second redundancy version based on the intra-group identifier of the $i^{th}$ cooperation terminal apparatus in the cooperative transmission group. The $i^{th}$ cooperation terminal apparatus determines, based on the second redundancy version, the start location for sending the third data. Further, the $i^{th}$ cooperation terminal apparatus starts sending the third data at the start location that is determined for the third data based on the second redundancy version.

In a possible design, the redundancy version is used by the $i^{th}$ cooperation terminal apparatus to determine the second redundancy version based on the intra-group identifier of the $i^{th}$ cooperation terminal apparatus in the cooperative transmission group. Correspondingly, the $i^{th}$ cooperation terminal apparatus may select, based on the intra-group identifier of the $i^{th}$ cooperation terminal apparatus, a version number of the second redundancy version used to transmit the third data.

Two CUEs are used as an example. It is assumed that the $1^{st}$ redundancy version set and the $2^{nd}$ redundancy version set that are respectively configured by the network apparatus for the $1^{st}$ cooperation terminal apparatus CUE 1 and the $2^{nd}$ cooperation terminal apparatus CUE 2 are the same, where the $1^{st}$ redundancy version set may be {the RV 0, the RV 1, the RV 2, the RV 3}, an intra-group identifier ID of the $1^{st}$ cooperation terminal apparatus CUE 1 is 0, and an intra-group identifier ID of the $2^{nd}$ cooperation terminal apparatus CUE 2 is 1. Therefore, the $1^{st}$ cooperation terminal apparatus CUE 1 may determine, based on the intra-group identifier 0, that a first redundancy version of the $1^{st}$ cooperation terminal apparatus is the RV 0; the $2^{nd}$ cooperation terminal apparatus CUE 2 may determine, based on the intra-group identifier 1, that a first redundancy version of the $1^{st}$ cooperation terminal apparatus is the RV 1.

Step 2025: The $i^{th}$ cooperation terminal apparatus sends the second data to the target terminal apparatus on the $i^{th}$ sidelink transmission resource, where the second data is determined by the $i^{th}$ cooperation terminal apparatus based on the first data received from the network apparatus.

Further, the $i^{th}$ cooperation terminal apparatus may send first indication information to the target terminal apparatus.

In a possible design, the first indication information is used to indicate that the $i^{th}$ cooperation terminal apparatus does not correctly decode the first data. Specifically, the first indication information may be a specific symbol sequence, or may be a bit sequence. Using one bit as an example, 0 or 1 is used to indicate that the CUE does not correctly decode data 1.

For example, if the $i^{th}$ cooperation terminal apparatus correctly decodes the first data, the $i^{th}$ cooperation terminal apparatus may send the second data on a first sidelink transmission resource. If the $i^{th}$ cooperation terminal apparatus does not correctly decode the first data, the $i^{th}$ cooperation terminal apparatus chooses not to send the second data on the first sidelink transmission resource. If the $i^{th}$ cooperation terminal apparatus decodes a part of the first data, the second data sent by the $i^{th}$ cooperation terminal apparatus on the first sidelink transmission resource may be the part, of the first data, that is decoded.

Further, the $i^{th}$ cooperation terminal apparatus may generate sidelink control information SCI based on the received $i^{th}$ sidelink transmission resource, and send the SCI to the TUE.

The sidelink control information indicates scheduling information of a sidelink resource. For example, the SCI generated by the CUE 1 may indicate scheduling information of a sidelink resource between the CUE 1 and the TUE. The scheduling information of a sidelink may include a sidelink transmission resource that is correctly received by the CUE from the network apparatus and that is used to transmit the second data, include a sidelink transmission resource determined by the CUE in the sidelink transmission resource set preconfigured by the network apparatus, or include the sidelink transmission resource set preconfigured by the CUE based on the network apparatus. Specifically, the CUE may send the SCI on a PSCCH, to send the scheduling information of the sidelink resource to the TUE. Certainly, the SCI may alternatively be scheduling assignment (scheduling assignment, SA) information. This is not limited herein.

Further, to improve the efficiency of the cooperative transmission, the cooperation terminal apparatus sends the second data based on the soft combination indication.

In a possible design, the $i^{th}$ soft combination indication field may include the first time offset and/or the second time offset.

In this case, if determining, based on the $i^{th}$ soft combination indication field, that the second data that needs to be sent is the data on which the target terminal apparatus is to perform soft combination, the $i^{th}$ cooperation terminal apparatus may send the second data at the second moment obtained by increasing the first moment by the first time offset, where the first moment is the moment of sending the sidelink control signaling to the target terminal apparatus by the $i^{th}$ cooperation terminal apparatus. Certainly, the second data may alternatively be sent at a fourth moment obtained by decreasing the first moment by the first time offset.

Alternatively, if determining, based on the $i^{th}$ soft combination indication field, that the second data that needs to be sent is the data on which the target terminal apparatus is not to perform soft combination, the $i^{th}$ cooperation terminal apparatus sends the second data at the third moment obtained by increasing the first moment by the second time offset.

In another possible design, the $i^{th}$ soft combination indication field may be set in the $i^{th}$ sidelink transmission resource. For example, the $i^{th}$ soft combination indication field may be determined by configuring different transmission resources. In the scenario in which the $i^{th}$ sidelink transmission resource includes the first transmission resource and the second transmission resource, if determining, based on the $i^{th}$ soft combination indication field, that the second data that needs to be sent is the data on which the target terminal apparatus is to perform soft combination, the $i^{th}$ cooperation terminal apparatus may send the second data on the first transmission resource.

Alternatively, if determining, based on the $i^{th}$ soft combination indication field, that the second data that needs to be sent is the data on which the target terminal apparatus is not to perform soft combination, the $i^{th}$ cooperation terminal apparatus may send the second data on the second transmission resource. Correspondingly, if receiving the second data on the second transmission resource, the target terminal apparatus may determine, based on the $i^{th}$ soft combination indication field, that the second data is the data on which the soft combination is not to be performed.

For example, the $i^{th}$ soft combination indication field may be determined based on the time-frequency resource, that is, the $i^{th}$ time-frequency resource in the $i^{th}$ sidelink transmission resource includes the first time-frequency resource and the second time-frequency resource. The $i^{th}$ sidelink transmission resource further includes the $i^{th}$ sidelink transmission parameter. If determining, based on the $i^{th}$ soft combination indication field, that the second data that needs to be sent is the data on which the target terminal apparatus is to perform soft combination, the $i^{th}$ cooperation terminal apparatus may send the second data on the first time-frequency resource by using the $i^{th}$ sidelink transmission parameter. Alternatively, if determining, based on the $i^{th}$ soft combination indication field, that the second data that needs to be sent is not the data on which the target terminal apparatus is to perform soft combination, the $i^{th}$ cooperation terminal apparatus may send the second data on the second time-frequency resource by using the $i^{th}$ sidelink transmission parameter.

In still another possible design, the $i^{th}$ soft combination indication field may be determined based on the code resource, that is, the $i^{th}$ code resource in the $i^{th}$ sidelink transmission resource includes the first code resource and the second code resource. The $i^{th}$ sidelink transmission resource further includes the $i^{th}$ time-frequency resource. In this case, the $i^{th}$ cooperation terminal apparatus sends, to the target terminal apparatus on the $i^{th}$ time-frequency resource and the first code resource, the second data on which the soft combination is to be performed. Alternatively, the $i^{th}$ cooperation terminal apparatus sends, to the target terminal apparatus on the $i^{th}$ time-frequency resource and the second code resource, the second data on which the soft combination is not to be performed.

Certainly, the first transmission resource in the $i^{th}$ soft combination indication field may include one or more of the following: the first time-frequency resource and the first code resource; and the second transmission resource includes one or more of the following: the second time-frequency resource and the second code resource. This is not limited herein.

In still another possible design, the $i^{th}$ sidelink transmission resource further includes the $i^{th}$ redundancy version set, where the $i^{th}$ redundancy version set includes the at least one redundancy version, and the redundancy version set is used by the $i^{th}$ cooperation terminal apparatus to determine the first redundancy version in the redundancy version set.

In a possible implementation, the $i^{th}$ cooperation terminal generates the third data based on the first data received from the network apparatus, where the third data is data that is determined by the $i^{th}$ cooperation terminal apparatus and on which the soft combination needs to be performed. In this case, if determining, based on the $i^{th}$ redundancy version set, that the third data on which the soft combination is to be performed needs to be sent to the target terminal apparatus, the $i^{th}$ cooperation terminal apparatus determines the first redundancy version in the redundancy version set, determines, based on the first redundancy version, the start location at which the cooperation terminal apparatus is to send the third data, and sends the third data. In another possible implementation, after determining the first redundancy version in the redundancy version set, the $i^{th}$ cooperation terminal apparatus may send the first redundancy version to the target terminal apparatus by using the SCI, and send the third data at the start location determined based on the first redundancy version.

In still another possible design, the $i^{th}$ cooperation terminal apparatus may alternatively determine the redundancy version in another manner, and then send the third data to the target terminal apparatus. For example, the $i^{th}$ sidelink transmission resource further includes the $i^{th}$ redundancy version set, and the $i^{th}$ redundancy version set includes the at least one redundancy version. In this case, the $i^{th}$ cooperation terminal apparatus determines the second redundancy version based on the intra-group identifier of the $i^{th}$ cooperation terminal apparatus in the cooperative transmission group, and further sends, at the start location determined based on the second redundancy version, the third data on which the soft combination needs to be performed.

In this case, if determining that the third data on which the soft combination needs to be performed needs to be sent to the target terminal apparatus, the $i^{th}$ cooperation terminal apparatus may determine the second redundancy version based on the intra-group identifier of the $i^{th}$ cooperation terminal apparatus in the cooperative transmission group. Further, the $i^{th}$ cooperation terminal apparatus determines, based on the second redundancy version, the start location for sending the third data, and then starts sending the third data at the start location that is determined for the third data based on the second redundancy version.

Step 2026: The TUE obtains the sidelink transmission resource from the network apparatus, and receives the second data on the sidelink transmission resource.

In a possible implementation, the network apparatus sends the sidelink transmission resource set indication to the N cooperation terminal apparatuses and the target terminal apparatus. The sidelink transmission resource set indication may be specifically sent by using the second DCI. In this case, the second DCI is used to indicate the sidelink transmission resource set allocated by the network apparatus to the first CUE to transmit the second data. For example, the network apparatus determines the sidelink transmission resource set for the CUE 1 and the CUE 2, where the sidelink transmission resource set includes the $1^{st}$ sidelink transmission resource and the $2^{nd}$ sidelink transmission resource. The network apparatus generates the second DCI that carries the $1^{st}$ sidelink transmission resource and the $2^{nd}$ sidelink transmission resource, and then sends the second DCI to the CUE 1 and the CUE 2. Certainly, the sidelink transmission resource set may alternatively be configured by using the RRC signaling. In this case, the target terminal apparatus may receive, based on the second DCI or the RRC signaling, the sidelink transmission resource set indication sent by the network apparatus.

For the dynamic scheduling scenario:

In a possible implementation, assuming that the network apparatus may send the third DCI for the $i^{th}$ cooperation terminal apparatus to the $i^{th}$ cooperation terminal apparatus and the target terminal apparatus in the unicast manner, the target terminal apparatus may determine, based on the third DCI from the network apparatus, the $i^{th}$ sidelink transmission resource allocated by the network apparatus to the $i^{th}$ cooperation terminal apparatus to transmit the second data.

In another possible implementation, if the network apparatus includes, in one piece of third DCI, the different sidelink transmission resources that are separately configured for the cooperation terminal apparatuses to transmit the second data, the target terminal apparatus may parse the field corresponding to the $i^{th}$ cooperation terminal apparatus in the third DCI, to determine the $i^{th}$ sidelink transmission resource used by the $i^{th}$ cooperation terminal apparatus to transmit the second data. The target terminal apparatus may obtain all the $1^{st}$ sidelink transmission resource to the $N^{th}$ sidelink transmission resource through parsing, and then receive, on the $1^{st}$ sidelink transmission resource to the $N^{th}$ sidelink transmission resource, the second data sent by the N cooperation terminal apparatuses. Certainly, parsing may alternatively be performed in another manner. For example, if it is determined that the first indication information sent by the $i^{th}$ cooperation terminal apparatus is received, the $i^{th}$ sidelink transmission resource of the $i^{th}$ cooperation terminal apparatus may not be obtained through parsing.

Assuming that the network apparatus sends, to the TUE, third DCI_CUE1 corresponding to the CUE 1 and third DCI_CUE2 corresponding to the CUE 2, the TUE receives, based on the third DCI_CUE1 corresponding to the CUE 1 and on a sidelink transmission resource indicated by the third DCI_CUE1, the second data sent by the CUE 1, and receives, based on the third DCI_CUE2 corresponding to the CUE 2 and on a sidelink transmission resource indicated by the third DCI_CUE2, the second data sent by the CUE 2. For another example, assuming that the third DCI generated by the network apparatus carries a sidelink transmission resource of the CUE 1 and a sidelink transmission resource of the CUE 2, the TUE determines the sidelink transmission resource of the CUE 1 and the sidelink transmission resource of the CUE 2 based on the parsed third DCI: the TUE receives, on the sidelink transmission resource corresponding to the CUE 1, the second data sent by the CUE 1; and the TUE receives, based on the third DCI corresponding to the CUE 2 and on the sidelink transmission resource corresponding to the CUE 2, the second data sent by the CUE 2.

In another possible design, for the scenario in which the sidelink transmission resources determined by the network apparatus for the N cooperation terminal apparatuses are the same, the target terminal apparatus may receive the $i^{th}$ sidelink transmission resource from the network apparatus, where the $i^{th}$ sidelink transmission resource belongs to the $1^{st}$ sidelink transmission resource to the $N^{th}$ sidelink transmission resource, and the $i^{th}$ sidelink transmission resource is the sidelink transmission resource of the N cooperation terminal apparatuses. Further, the target terminal apparatus may receive, on the sidelink transmission resource, the second data sent by the N cooperation terminal apparatuses.

In a possible design, after the TUE obtains the first indication information sent by the $i^{th}$ cooperation terminal apparatus, the target terminal apparatus skips receiving the data on the $i^{th}$ sidelink transmission resource, where the first indication information is used to indicate that the first cooperation terminal apparatus does not correctly decode the first data.

In a possible design, the target terminal apparatus receives a sidelink control instruction from the first cooperation terminal apparatus, where the sidelink control instruction is used to indicate the $i^{th}$ sidelink transmission resource used by the first cooperation terminal apparatus to send the second data. Further, the target terminal apparatus receives the second data from the first cooperation terminal apparatus on the $i^{th}$ sidelink transmission resource based on the sidelink control instruction.

For example, the TUE obtains the SCI from the CUE, and receives, on the corresponding sidelink transmission resource, the second data sent by the CUE. For example, the TUE obtains SCI 1 from the CUE 1, and receives, on a sidelink transmission resource indicated by the SCI 1, the second data sent by the CUE 1. The TUE obtains SCI 2 from the CUE 2, and receives, on a sidelink transmission resource indicated by the SCI 2, the second data sent by the CUE 2.

For the semi-persistent scheduling scenario, the target terminal apparatus may determine the sidelink transmission resource of the CUE based on the RRC signaling preconfigured by the network apparatus.

Further, the TUE may combine, for decoding, the signal that includes the first data and that is received from the network apparatus in the first phase, and a signal including the second data of the CUE 1 and a signal including the second data of the CUE 2 that are received in the second phase, to obtain the first data sent by the network apparatus.

Through user apparatus cooperation, performance of receiving, by the target terminal apparatus, the first data sent by the network apparatus can be improved, and reliability of receiving the first data by the target terminal apparatus can be significantly enhanced.

Further, for a scenario in which the $i^{th}$ sidelink transmission resource includes the $i^{th}$ soft combination indication field, the network apparatus sends, to the target terminal apparatus, the $i^{th}$ soft combination indication field determined by the network apparatus for the $i^{th}$ cooperation terminal apparatus, the target terminal apparatus receives, by using the SCI, the $i^{th}$ soft combination indication field determined by the $i^{th}$ cooperation terminal apparatus, the target terminal apparatus receives, by using the SCI, the soft combination indication field set sent by the $i^{th}$ cooperation terminal apparatus, or the target terminal apparatus receives the soft combination indication field set sent by the network apparatus, the second data or the third data sent by the $i^{th}$ cooperation terminal apparatus is determined based on the soft combination indication field in the soft combination indication field set. The target terminal apparatus may receive, based on the received $i^{th}$ soft combination indication field or the soft combination indication field in the received soft combination indication field set, the second data or the third data sent by the $i^{th}$ cooperation terminal apparatus.

In a possible design, the $i^{th}$ soft combination indication field may include the first time offset and/or the second time offset.

In this case, if the target terminal apparatus receives, based on the $i^{th}$ soft combination indication field, the second data from the $i^{th}$ cooperation terminal apparatus at the second moment obtained by increasing the first moment by the time offset, the target terminal apparatus may determine that the second data is the data on which the target terminal apparatus is to perform soft combination, where the first moment is the moment of receiving the sidelink control signaling sent by the $i^{th}$ cooperation terminal apparatus.

Alternatively, if receiving the second data from the $i^{th}$ cooperation terminal apparatus at the third moment obtained by increasing the first moment by the second time offset, the target terminal apparatus determines, based on the $i^{th}$ soft combination indication field, that the second data is the data on which the target terminal apparatus is not to perform soft combination.

In another possible design, the $i^{th}$ soft combination indication field may be set in the $i^{th}$ sidelink transmission resource. For example, the $i^{th}$ soft combination indication field may be determined by configuring different transmission resources. In the scenario in which the $i^{th}$ sidelink transmission resource includes the first transmission resource and the second transmission resource, if receiving the second data on the first transmission resource, the target terminal apparatus may determine, based on the $i^{th}$ soft combination indication field, that the second data is the data on which the soft combination is to be performed. Alternatively, if receiving the second data on the second transmission resource, the target terminal apparatus may determine, based on the $i^{th}$ soft combination indication field, that the second data is the data on which the soft combination is not to be performed.

For another example, the $i^{th}$ soft combination indication field may be determined based on the time-frequency resource, that is, the $i^{th}$ time-frequency resource in the $i^{th}$ sidelink transmission resource includes the first time-frequency resource and the second time-frequency resource. The $i^{th}$ sidelink transmission resource may further include the $i^{th}$ sidelink transmission parameter. If receiving, on the first time-frequency resource by using the $i^{th}$ sidelink transmission parameter, the second data sent by the $i^{th}$ cooperation terminal apparatus, the target terminal apparatus may determine, based on the $i^{th}$ soft combination indication field, that the second data is the data on which the soft combination is to be performed. Alternatively, if receiving, on the second time-frequency resource by using the $i^{th}$ sidelink transmission parameter, the second data sent by the $i^{th}$ cooperation terminal apparatus, the target terminal apparatus may determine, based on the $i^{th}$ soft combination indication field, that the second data is the data on which the soft combination is not to be performed.

In still another possible design, the $i^{th}$ soft combination indication field may be determined based on the code resource, that is, the $i^{th}$ code resource in the $i^{th}$ sidelink transmission resource includes the first code resource and the second code resource. The $i^{th}$ sidelink transmission resource may further include the $i^{th}$ time-frequency resource.

In this case, if receiving, on the $i^{th}$ time-frequency resource and the first code resource, the second data sent by the $i^{th}$ cooperation terminal apparatus, the target terminal apparatus may determine that the second data is the data on which the soft combination is to be performed. If receiving, on the $i^{th}$ time-frequency resource and the second code resource, the second data sent by the $i^{th}$ cooperation terminal apparatus, the target terminal apparatus may determine that the second data is the data on which the soft combination is not to be performed.

Certainly, the first transmission resource in the $i^{th}$ soft combination indication field may include one or more of the following: the first time-frequency resource and the first code resource; and the second transmission resource includes one or more of the following: the second time-frequency resource and the second code resource. This is not limited herein.

In still another possible design, the $i^{th}$ sidelink transmission resource may further include the $i^{th}$ redundancy version set, and the $i^{th}$ redundancy version set includes the at least one redundancy version.

In a possible implementation, if receiving, at a start location determined based on any redundancy version in the $i^{th}$ redundancy version set, the third data sent by the $i^{th}$ cooperation terminal apparatus, the target terminal apparatus determines that the third data is the data on which the soft combination needs to be performed. In another possible implementation, the target terminal apparatus may determine, based on the first redundancy version carried in the SCI sent by the $i^{th}$ cooperation terminal apparatus, to start receiving the third data at the start location corresponding to the first redundancy version, and use the third data as the data on which the soft combination is to be performed.

In still another possible design, the target terminal apparatus may alternatively determine, in another manner, the redundancy version used by the $i^{th}$ cooperation terminal apparatus to send the third data. For example, the $i^{th}$ sidelink transmission resource further includes the $i^{th}$ redundancy version set, the $i^{th}$ redundancy version set includes the at least one redundancy version, and the target terminal apparatus may determine the second redundancy version in the $i^{th}$ redundancy version set based on the intra-group identifier of the $i^{th}$ cooperation terminal apparatus in the cooperative transmission group. If receiving the third data at the start location corresponding to the second redundancy version, the target terminal apparatus determines that the third data is the data on which the soft combination is to be performed.

According to the foregoing embodiment, the target terminal apparatus can simultaneously decode the received first data, second data, and third data, to improve a success rate of decoding the received first data sent by the network apparatus, thereby improving receiving reliability of the TUE and the performance of the cooperative transmission, and improving transmission efficiency in a system.

Figure 3:
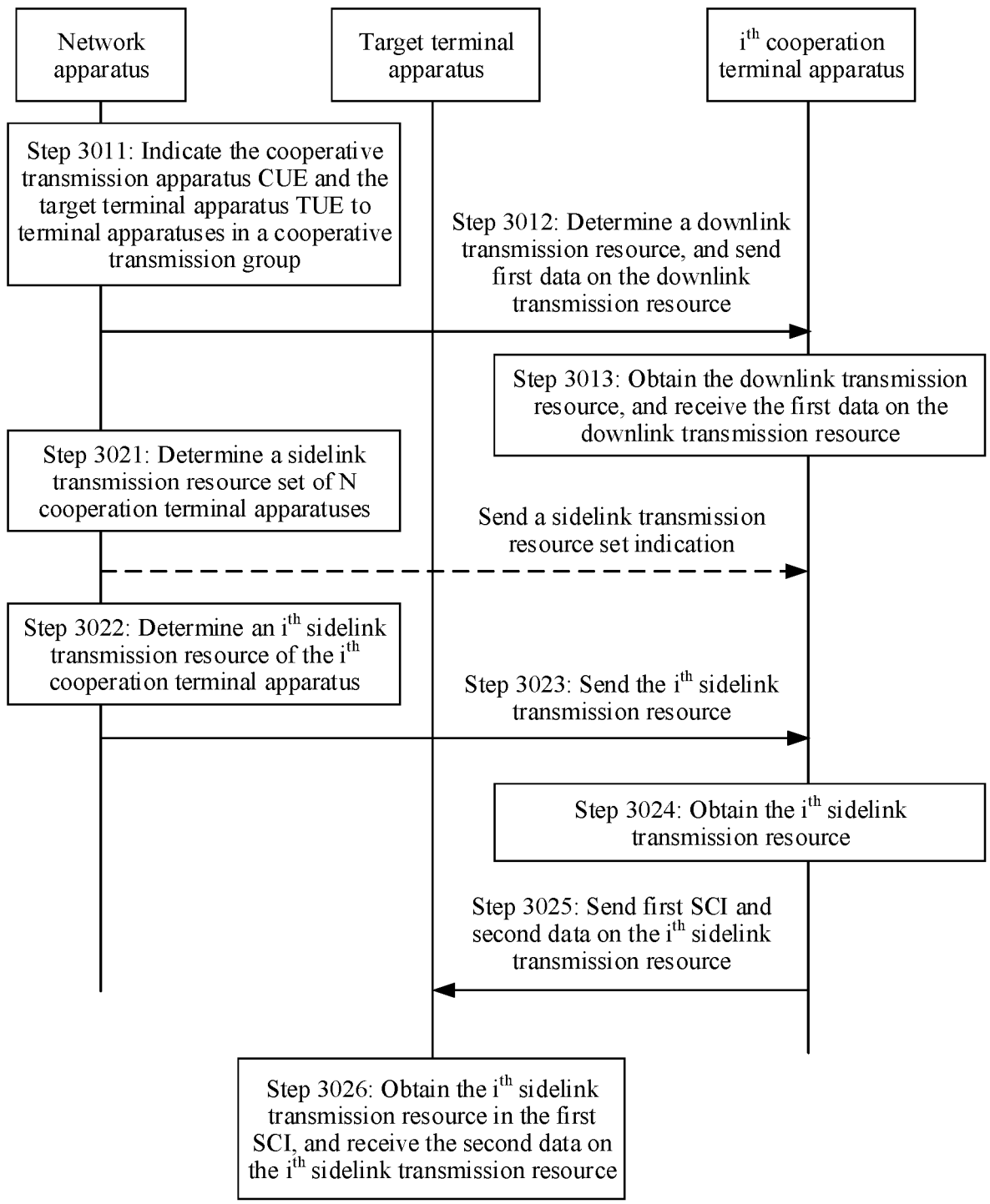
FIG. 3 is a schematic flowchart of a communication method according to an embodiment of this application.

In another possible scenario shown in FIG. 1b, for example, a TUE is outside coverage of a cell, or channel quality of a TUE is quite poor. Consequently, the TUE cannot receive, in the first phase, first data sent by a network apparatus, but completely depends on a CUE to forward, in the second phase, the first data sent by the network apparatus. Based on the communication system 100 shown in FIG. 1*b*, a communication procedure through user cooperation is provided. A network apparatus in the procedure may be specifically the network apparatus 110 in FIG. 1*b*, a target terminal apparatus may be the terminal apparatus 120 in FIG. 1*b*, and cooperation terminal apparatuses may be the terminal apparatuses 130 and 140 in FIG. 1*b*. As shown in FIG. 3, the procedure includes the following steps.

Specifically, the procedure includes the following steps.
First Phase: Downlink Transmission Phase Step 3011: The network apparatus determines the cooperation terminal apparatus and the target terminal apparatus for current cooperative transmission.

For a specific manner of determining the cooperation terminal apparatus and the target terminal apparatus, refer to the implementation in the foregoing embodiment. Details are not described herein again.

Step 3012: The network apparatus determines, for the CUE, a downlink transmission resource used by the network apparatus to transmit first data to the CUE, and sends the first data to the CUE on the downlink transmission resource.

In a possible implementation, the network apparatus may send the first data to N cooperation terminal apparatuses in a unicast manner. In this case, downlink transmission resources occupied by the first data may be separately configured by the network apparatus for the N cooperation terminal apparatuses, and DCI may be separately sent to the N cooperation terminal apparatuses to configure the downlink transmission resources. That is, the network apparatus may send, to an $i^{th}$ cooperation terminal apparatus, first DCI that carries an $i^{th}$ downlink transmission resource. The first DCI indicates the $i^{th}$ downlink transmission resource used by the $i^{th}$ cooperation terminal apparatus and the TUE to receive the first data sent by the network apparatus. For example, the network apparatus may send the first data to the $i^{th}$ cooperation terminal on the $i^{th}$ downlink transmission resource. Correspondingly, the $i^{th}$ cooperation terminal apparatus receives the first data on the $i^{th}$ downlink transmission resource occupied by the first data, and sends an automatic repeat request feedback message based on a decoding result of the received first data and an automatic repeat request parameter in the $i^{th}$ downlink transmission resource, so that the network apparatus sends to-be-retransmitted data to the $i^{th}$ cooperation terminal apparatus.

In another possible implementation, the downlink transmission resource may be scheduled in a semi-persistent mode. For example, N cooperation terminal apparatuses and the target terminal apparatus belong to a same cooperative transmission group. The network apparatus may determine an $i^{th}$ downlink transmission resource of an $i^{th}$ cooperation terminal apparatus in a downlink transmission resource set. The $i^{th}$ cooperation terminal apparatus belongs to the N cooperation terminals, and the $i^{th}$ downlink transmission resource belongs to the $1^{st}$ downlink transmission resource to an $N^{th}$ downlink transmission resource, where i is an integer greater than or equal to 1 and less than or equal to N, and N is an integer greater than or equal to 1. The $i^{th}$ downlink transmission resource is used by the network apparatus to send the first data to the $i^{th}$ cooperation terminal apparatus, and the network apparatus sends the $i^{th}$ downlink transmission resource to the $i^{th}$ cooperation terminal apparatus. The $i^{th}$ downlink transmission resource may be different from or may be the same as a $j^{th}$ downlink transmission resource. This is not limited herein. The $j^{th}$ downlink transmission resource is a downlink transmission resource that is of a $j^{th}$ cooperation terminal apparatus and that is determined by the network apparatus, and the $j^{th}$ cooperation terminal apparatus belongs to the N cooperation terminals. In this case, the network apparatus may configure the determined $1^{st}$ downlink transmission resource of the $1^{st}$ cooperation terminal apparatus to the determined $N^{th}$ downlink transmission resource of the target terminal apparatus for the N cooperation terminal apparatuses by using RRC signaling. Further, the network apparatus may send the first data to the $i^{th}$ cooperation terminal apparatus on the $i^{th}$ downlink transmission resource.

Certainly, the network apparatus may alternatively send the first data in a multicast or broadcast manner. The network apparatus may configure downlink transmission resources for the N cooperation terminal apparatuses through dynamic scheduling using DCI. For example, the first DCI sent by the network apparatus to the N cooperation terminal apparatuses may include the downlink transmission resource of each of the N cooperation terminal apparatuses. Further, the first data is sent to the N cooperation terminal apparatuses on the configured downlink transmission resources. Two CUEs are used as an example. The downlink transmission resource set may include the $1^{st}$ downlink transmission resource, the $2^{nd}$ downlink transmission resource, and the $3^{rd}$ downlink transmission resource. The network apparatus may allocate a same downlink transmission resource to a CUE 1 and a CUE 2, where the downlink transmission resource may be the $1^{st}$ downlink transmission resource in the downlink transmission resource set. In this case, the first DCI sent by the network apparatus to the N cooperation terminal apparatuses may include the $1^{st}$ downlink transmission resource. Further, the network apparatus may send the first data to the CUE 1 and the CUE 2 on the $1^{st}$ downlink transmission resource in the multicast or broadcast manner. Correspondingly, after receiving the first DCI, the CUE 1 and the CUE 2 receive the first data on the $1^{st}$ downlink transmission resource occupied by the first data.

In the semi-persistent mode of scheduling the downlink transmission resource, the network apparatus may configure a same downlink transmission resource for the N cooperation terminal apparatuses by using the RRC signaling. Further, the network apparatus may send the first data on the configured downlink transmission resource in the multicast or broadcast manner.

Step 3013: The CUE obtains the downlink transmission resource, and receives the first data from the network apparatus on the downlink transmission resource.

In a unicast-based dynamic scheduling manner, the $i^{th}$ cooperation terminal apparatus may receive the first DCI from the network apparatus. In this case, the first DCI includes the $i^{th}$ downlink transmission resource determined for the $i^{th}$ cooperation terminal apparatus. Further, the $i^{th}$ cooperation terminal apparatus receives the first data from the network apparatus on the $i^{th}$ downlink transmission resource. For example, the CUE i blindly detects the first DCI in a candidate search space. If parsing succeeds, the CUE i may determine the $i^{th}$ downlink transmission resource that is carried in the first DCI and that is used to transmit the first data.

For a unicast-based semi-persistent scheduling manner, the $i^{th}$ cooperation terminal apparatus may determine, based on RRC signaling from the network apparatus, the $i^{th}$ downlink transmission resource determined by the network apparatus for the $i^{th}$ cooperation terminal apparatus. Further, the $i^{th}$ cooperation terminal apparatus receives the first data from the network apparatus on the $i^{th}$ downlink transmission resource.

In a multicast-based or broadcast-based dynamic scheduling manner, the N cooperation terminal apparatuses receive the first DCI from the network apparatus. In this case, the first DCI includes the downlink transmission resource determined for the N cooperation terminal apparatuses. For example, the CUE and the TUE blindly detect the first DCI in a candidate search space. If parsing succeeds, the CUE and the TUE may determine the downlink transmission resource that is carried in the first DCI and that is used to transmit the first data. Further, the N cooperation terminal apparatuses receive the first data from the network apparatus on the downlink transmission resource.

In a multicast-based or broadcast-based semi-persistent scheduling manner, the N cooperation terminal apparatuses determine, based on the RRC signaling from the network apparatus, the downlink transmission resource determined by the network apparatus for the N cooperation terminal apparatuses. Further, the N cooperation terminal apparatuses receive the first data from the network apparatus on the downlink transmission resource.

Second Phase: Sidelink Transmission Phase

Each cooperation terminal apparatus may establish a sidelink with the target terminal apparatus. This may be applied to a process in which the network apparatus actively allocates a sidelink transmission resource to the cooperation terminal apparatus, or may be applied to a process in which the network apparatus passively allocates a sidelink transmission resource to the cooperation terminal apparatus. The process in which the network apparatus passively allocates the sidelink transmission resource to the terminal apparatus may include: The cooperation terminal apparatus sends a sidelink resource request to the network apparatus. After receiving the sidelink resource request, the network apparatus allocates the sidelink transmission resource to the cooperation terminal apparatus. That is, the procedure shown in FIG. 1b may further include: The cooperation terminal apparatus sends an SL resource request to the network apparatus.

A specific sidelink transmission process may include the following steps.

Step 3021: The network apparatus determines a sidelink transmission resource set of the N cooperation terminal apparatuses.

The N cooperation terminal apparatuses and the target terminal apparatus belong to the same cooperative transmission group. The sidelink transmission resource set includes the $1^{st}$ sidelink transmission resource to an $N^{th}$ sidelink transmission resource. The $1^{st}$ sidelink transmission resource to the $N^{th}$ sidelink transmission resource may be used by the N cooperation terminal apparatuses to send second data to the target terminal apparatus. The second data is determined by the $i^{th}$ cooperation terminal apparatus based on the first data sent by the network apparatus to the $i^{th}$ cooperation terminal apparatus.

Sidelink transmission resources of the $1^{st}$ sidelink transmission resource to the $N^{th}$ sidelink transmission resource may be the same or may be different. This is not limited herein.

In this case, the network apparatus may send a sidelink transmission resource set indication to the N cooperation terminal apparatuses CUEs. For example, second DCI may be sent to send the sidelink transmission resource set indication to the N cooperation terminal apparatuses. The second DCI is used to indicate a sidelink transmission resource set allocated by the network apparatus to a first CUE to transmit the second data. For example, the network apparatus determines a sidelink transmission resource set for the CUE 1 and the CUE 2, where the sidelink transmission resource set includes the $1^{st}$ sidelink transmission resource and the $2^{nd}$ sidelink transmission resource. The network apparatus generates second DCI that carries the $1^{st}$ sidelink transmission resource and the $2^{nd}$ sidelink transmission resource, and then sends the second DCI to the CUE 1 and the CUE 2. Certainly, the sidelink transmission resource set may alternatively be configured by using RRC signaling, to be notified to the N cooperation terminal apparatuses. This is not limited herein.

Step 3022: The network apparatus determines an $i^{th}$ sidelink transmission resource of the $i^{th}$ cooperation terminal apparatus.

The $i^{th}$ cooperation terminal apparatus belongs to the N cooperation terminals, and the $i^{th}$ sidelink transmission resource belongs to the sidelink transmission resource set. The $i^{th}$ sidelink transmission resource is used by the $i^{th}$ cooperation terminal apparatus to send the second data to the target terminal apparatus, i is an integer greater than or equal to 1 and less than or equal to N, and N is an integer greater than or equal to 1.

Further, to reduce resource collision and therefore avoid affecting performance of sidelink transmission, the $i^{th}$ sidelink transmission resource in the sidelink transmission resource set may be different from a $j^{th}$ sidelink transmission resource, the $j^{th}$ sidelink transmission resource may be a sidelink transmission resource that is of the $j^{th}$ cooperation terminal apparatus and that is determined by the network apparatus, and the $j^{th}$ cooperation terminal apparatus belongs to the N cooperation terminals, where j is an integer greater than or equal to 1 and less than or equal to N, and j is not equal to i.

In another possible implementation, if the network apparatus determines that second data sent by the $i^{th}$ cooperation terminal apparatus and the $j^{th}$ cooperation terminal apparatus to the target terminal apparatus is the same, the network apparatus may determine that the $i^{th}$ sidelink transmission resource of the $i^{th}$ cooperation terminal apparatus and the $j^{th}$ sidelink transmission resource of the $j^{th}$ cooperation terminal apparatus are the same sidelink transmission resource.

For a scenario in which a same sidelink transmission resource is configured for all the N cooperation terminals, the network apparatus determines the $i^{th}$ sidelink transmission resource of the N cooperation terminal apparatuses. The $i^{th}$ sidelink transmission resource belongs to the $1^{st}$ sidelink transmission resource to the $N^{th}$ sidelink transmission resource, where i is an integer greater than or equal to 1 and less than or equal to N, and N is an integer greater than or equal to 1: the $i^{th}$ sidelink transmission resource is different from the $j^{th}$ sidelink transmission resource, where j is an integer greater than or equal to 1 and less than or equal to N, and j is not equal to i; and the $i^{th}$ sidelink transmission resource is a sidelink transmission resource of the N cooperation terminal apparatuses that is determined by the network apparatus, and the $i^{th}$ sidelink transmission resource is used by the N cooperation terminal apparatuses to send the second data to the target terminal apparatus.

Step 3023: The network apparatus sends the $i^{th}$ sidelink transmission resource to the $i^{th}$ cooperation terminal apparatus.

After the sidelink transmission resource set for the cooperation terminal apparatuses is determined, the sidelink transmission resource may be sent to the cooperation terminal apparatus in a plurality of manners. For a dynamic scheduling scenario, the network apparatus sends the sidelink transmission resource set indication to the CUE, and sends third DCI to the CUE in a dynamic scheduling mode when determining that the CUE needs to send the second data to the TUE.

In a possible implementation, the third DCI is used to indicate the sidelink transmission resource determined by the network apparatus for the CUE to transmit the second data. There may be a plurality of pieces of third DCI. That is, the network apparatus may determine different time-frequency resources or code resources for the CUEs, and each CUE corresponds to one piece of third DCI. The network apparatus sends each piece of third DCI to the corresponding CUE in the unicast manner.

In another possible implementation, there may be one piece of third DCI. For example, the network apparatus determines, for the CUEs, a same sidelink transmission resource used to transmit the second data, and the network apparatus may send the third DCI to the CUEs in the broadcast manner. In another possible implementation, the network apparatus may alternatively include, in one piece of third DCI, different sidelink transmission resources that are separately determined for the CUEs to transmit the second data, and the network apparatus may send the third DCI to the CUEs in the multicast manner.

For a semi-persistent scheduling scenario, the network apparatus may notify, by using RRC signaling, the CUE of the sidelink transmission resource used to transmit the second data. The RRC is used to indicate the sidelink transmission resource determined by the network apparatus for the CUE to transmit the second data.

For example, if the network apparatus determines the $1^{st}$ sidelink transmission resource of the $1^{st}$ cooperation terminal apparatus and the $2^{nd}$ sidelink transmission resource of the $2^{nd}$ cooperation terminal apparatus, the network apparatus may notify, by using the RRC signaling, that a sidelink transmission resource of the $1^{st}$ cooperation terminal apparatus is the $1^{st}$ sidelink transmission resource and that a sidelink transmission resource of the $2^{nd}$ cooperation terminal apparatus is the $2^{nd}$ sidelink transmission resource.

Further, to improve efficiency of the cooperative transmission, the network apparatus may indicate whether the second data sent by the cooperation terminal apparatus to the target terminal apparatus is data on which the target terminal apparatus is to perform soft combination, so that the cooperation terminal apparatus generates the second data based on a soft combination indication. It should be noted that the data on which the soft combination is to be performed means that the second data of the $i^{th}$ cooperation terminal apparatus and the second data of the $j^{th}$ cooperation terminal apparatus that are received by the target terminal apparatus are same data obtained through decoding, and therefore may be combined for decoding, to improve a success rate of decoding the second data by the target terminal apparatus.

In a specific implementation process, the network apparatus may determine an $i^{th}$ soft combination indication field of the $i^{th}$ cooperation terminal apparatus, where the $i^{th}$ soft combination indication field is used to indicate whether the second data sent by the $i^{th}$ cooperation terminal apparatus to the target terminal apparatus is the data on which the target terminal apparatus is to perform soft combination.

In this case, the network apparatus may send, to the $i^{th}$ cooperation terminal apparatus in a dynamic scheduling manner, fourth DCI that carries the $i^{th}$ soft combination indication field. In addition, the network apparatus may alternatively determine a soft combination indication field set for the N cooperation terminal apparatuses, where the soft combination indication field set includes the $1^{st}$ soft combination indication field to an $N^{th}$ soft combination indication field. The $i^{th}$ soft combination indication field determined for the $i^{th}$ cooperation terminal apparatus may be determined by the network apparatus for the $i^{th}$ cooperation terminal apparatus when required and then sent to the $i^{th}$ cooperation terminal apparatus and the target terminal apparatus. It should be noted that the fourth DCI and the third DCI may be combined into one piece of DCI to be sent, or may be sent separately. This is not limited herein. In another possible implementation, the network apparatus may alternatively configure the $i^{th}$ soft combination indication field for the $i^{th}$ cooperation terminal apparatus in a semi-persistent scheduling manner. In another possible implementation, after receiving the soft combination indication field set and when determining that the second data needs to be forwarded to the target terminal apparatus, the $i^{th}$ cooperation terminal apparatus may independently select a soft combination indication field from the soft combination indication field set, and forward, to the target terminal apparatus based on an indication manner in the selected soft combination indication field, the second data on which the soft combination needs or does not need to be performed.

In a possible design, if a soft combination indication in the $i^{th}$ soft combination indication field is 0, it indicates that the soft combination does not need to be performed on the second data sent by the $i^{th}$ cooperation terminal apparatus to the target terminal apparatus. If a soft combination indication in the $i^{th}$ soft combination indication field is 1, it indicates that the second data sent by the $i^{th}$ cooperation terminal apparatus to the target terminal apparatus may be combined with second data sent by another cooperation terminal apparatus to the target terminal apparatus.

For example, if a soft combination indication in the $1^{st}$ soft combination indication field of the $i^{th}$ cooperation terminal apparatus is 0, the $i^{th}$ cooperation terminal apparatus determines that the soft combination does not need to be performed on the second data sent to the target terminal apparatus. If a soft combination indication in the $2^{nd}$ soft combination indication field of the $2^{nd}$ cooperation terminal apparatus is 1, the $2^{nd}$ cooperation terminal apparatus determines that the soft combination needs to be performed on the second data sent to the target terminal apparatus.

In another possible design, the $i^{th}$ soft combination indication field may include a first time offset and/or a second time offset.

The first time offset is used to indicate that, if the target terminal apparatus receives the second data from the $i^{th}$ cooperation terminal apparatus at a second moment obtained by increasing a first moment by the time offset, the second data is determined as the data on which the target terminal apparatus is to perform soft combination, where the first moment is a moment of receiving sidelink control signaling sent by the $i^{th}$ cooperation terminal apparatus. The second time offset is used to indicate that, if the target terminal apparatus receives the second data from the $i^{th}$ cooperation terminal apparatus at a third moment obtained by increasing the first moment by the second time offset, the second data is determined as data on which the target terminal apparatus is not to perform soft combination.

It should be noted that the first time offset and/or the second time offset in the $i^{th}$ soft combination indication field determined by the network apparatus for the $i^{th}$ cooperation terminal apparatus may be the same as or different from a first time offset and/or a second time offset in a $j^{th}$ soft combination indication field determined by the network apparatus for the $j^{th}$ cooperation terminal apparatus. This is not limited herein.

If determining that first time offsets and/or second time offsets in the $1^{st}$ soft combination indication field to the $N^{th}$ soft combination indication field determined for the N cooperation terminal apparatuses are the same, the network apparatus may send one soft combination indication field to the N cooperation terminal apparatuses, to reduce signaling consumption.

If determining that first time offsets and/or second time offsets in the $1^{st}$ soft combination indication field to the $N^{th}$ soft combination indication field determined for the N cooperation terminal apparatuses are different, the network apparatus may send one soft combination indication field set to the N cooperation terminal apparatuses, where the soft combination indication field set includes the $1^{st}$ soft combination indication field to the $N^{th}$ soft combination indication field. Further, the N cooperation terminal apparatuses may determine, based on the received soft combination indication field set, a soft combination indication field corresponding to each cooperation terminal apparatus, so that the cooperation terminal apparatus may generate the second data based on the corresponding soft combination indication field, and send the second data to the target terminal. Correspondingly, the target terminal apparatus may determine, based on the soft combination indication field set, whether the second data sent by the N cooperation terminal apparatuses is data on which the soft combination may be performed.

In another possible design, the $i^{th}$ soft combination indication field may be set in the $i^{th}$ sidelink transmission resource. For example, the $i^{th}$ soft combination indication field may be determined by configuring different transmission resources. Specifically, the $i^{th}$ sidelink transmission resource may include a first transmission resource and a second transmission resource.

In a possible implementation, the first transmission resource is used to indicate that the second data sent by the $i^{th}$ cooperation terminal apparatus to the target terminal apparatus on the first transmission resource is data on which the target terminal apparatus is to perform soft combination, and the second transmission resource is used to indicate that the second data sent by the $i^{th}$ cooperation terminal apparatus to the target terminal apparatus on the second transmission resource is data on which the target terminal apparatus is not to perform soft combination.

In still another possible design, the $i^{th}$ soft combination indication field may be determined based on a time-frequency resource, that is, an $i^{th}$ time-frequency resource in the $i^{th}$ sidelink transmission resource includes a first time-frequency resource and a second time-frequency resource. The $i^{th}$ sidelink transmission resource further includes an $i^{th}$ sidelink transmission parameter. The first time-frequency resource is used to indicate that the second data sent by the $i^{th}$ cooperation terminal apparatus to the target terminal apparatus on the first time-frequency resource by using the $i^{th}$ sidelink transmission parameter is data on which the target terminal apparatus is to perform soft combination, and the second time-frequency resource is used to indicate that the second data sent by the $i^{th}$ cooperation terminal apparatus to the target terminal apparatus on the second time-frequency resource by using the $i^{th}$ sidelink transmission parameter is data on which the target terminal apparatus is not to perform soft combination.

In still another possible design, the $i^{th}$ soft combination indication field may be determined based on a code resource, that is, an $i^{th}$ code resource in the $i^{th}$ sidelink transmission resource includes a first code resource and a second code resource. The $i^{th}$ sidelink transmission resource further includes an $i^{th}$ time-frequency resource. The first code resource is used to indicate that the second data sent by the $i^{th}$ cooperation terminal apparatus to the target terminal apparatus on the $i^{th}$ time-frequency resource and the first code resource is data on which the target terminal apparatus is to perform soft combination, and the second code resource is used to indicate that the second data sent by the $i^{th}$ cooperation terminal apparatus to the target terminal apparatus on the $i^{th}$ time-frequency resource and the second code resource is data on which the target terminal apparatus is not to perform soft combination.

Certainly, the first transmission resource in the $i^{th}$ soft combination indication field includes one or more of the following: a first time-frequency resource and a first code resource; and the second transmission resource includes one or more of the following: a second time-frequency resource and a second code resource. This is not limited herein.

To further improve performance of the cooperative transmission and increase the decoding success rate of the target terminal apparatus, the cooperation terminal apparatus may further send third data to the target terminal apparatus, where the cooperation terminal apparatus may send the third data at a start location of a redundancy version while sending the second data. The third data may be a part of the first data determined by the cooperation terminal apparatus, or may be a part of the second data generated by the cooperation terminal apparatus. This is not limited herein. That is, the third data is data that is generated by the $i^{th}$ cooperation terminal apparatus based on the first data received from the network apparatus and on which the target terminal apparatus is to perform soft combination. Specifically, the start location at which the $i^{th}$ cooperation terminal apparatus is to send the third data may be determined by the network apparatus for the $i^{th}$ cooperation terminal apparatus, or may be independently selected by the $i^{th}$ cooperation terminal apparatus. This is not limited herein.

In a possible design, the $i^{th}$ sidelink transmission resource further includes an $i^{th}$ redundancy version set, where the $i^{th}$ redundancy version set includes at least one redundancy version, and the redundancy version set is used by the $i^{th}$ cooperation terminal apparatus to determine a first redundancy version in the redundancy version set.

In a possible implementation, the first redundancy version is used by the $i^{th}$ cooperation terminal apparatus to determine, based on the first redundancy version, the start location at which the $i^{th}$ cooperation terminal apparatus is to send the third data on which the soft combination needs to be performed, where the third data is generated by the $i^{th}$ cooperation terminal based on the first data received from the network apparatus.

In still another possible design, the redundancy version may alternatively be determined in another manner. For example, the $i^{th}$ sidelink transmission resource further includes an $i^{th}$ redundancy version set, the $i^{th}$ redundancy version set includes at least one redundancy version, and the redundancy version is used by the $i^{th}$ cooperation terminal apparatus to determine a second redundancy version based on an intra-group identifier of the $i^{th}$ cooperation terminal apparatus in the cooperative transmission group. The second redundancy version is used by the $i^{th}$ cooperation terminal apparatus to determine, based on the second redundancy version, the start location at which the $i^{th}$ cooperation terminal apparatus is to send the third data on which the soft combination needs to be performed.

Step 3024: The $i^{th}$ cooperation terminal apparatus receives, from the network apparatus, the $i^{th}$ sidelink transmission resource used to transmit the second data.

For the dynamic scheduling scenario:

In a possible implementation, the network apparatus sends the sidelink transmission resource set indication to the N cooperation terminal apparatuses. The sidelink transmission resource set indication may be specifically sent by using the second DCI. In this case, the second DCI is used to indicate the sidelink transmission resource set allocated by the network apparatus to the first CUE to transmit the second data. For example, the network apparatus determines the sidelink transmission resource set for the CUE 1 and the CUE 2, where the sidelink transmission resource set includes the $1^{st}$ sidelink transmission resource and the $2^{nd}$ sidelink transmission resource. The network apparatus generates the second DCI that carries the $1^{st}$ sidelink transmission resource and the $2^{nd}$ sidelink transmission resource, and then sends the second DCI to the CUE 1 and the CUE 2. Certainly, the sidelink transmission resource set may alternatively be configured by using the RRC signaling. In this case, the $i^{th}$ cooperation terminal apparatus may receive, based on the second DCI or the RRC signaling, the sidelink transmission resource set indication sent by the network apparatus.

In a possible implementation, assuming that the network apparatus sends the third DCI for the $i^{th}$ cooperation terminal apparatus to the $i^{th}$ cooperation terminal apparatus in the unicast manner, the $i^{th}$ cooperation terminal apparatus may determine, based on the third DCI from the network apparatus, the $i^{th}$ sidelink transmission resource allocated by the network apparatus to the $i^{th}$ cooperation terminal apparatus to transmit the second data.

In another possible implementation, if the network apparatus includes, in one piece of third DCI, the different sidelink transmission resources that are separately determined for the cooperation terminal apparatuses to transmit the second data, the $i^{th}$ cooperation terminal apparatus may parse only a field corresponding to the $i^{th}$ cooperation terminal apparatus in the third DCI, to determine the $i^{th}$ sidelink transmission resource used by the $i^{th}$ cooperation terminal apparatus to transmit the second data.

For the semi-persistent scheduling scenario:

The network apparatus may notify, by using the RRC signaling, the $i^{th}$ cooperation terminal apparatus of the $i^{th}$ sidelink transmission resource determined by the network apparatus.

With reference to the example in step 3023, if the network apparatus determines the $1^{st}$ sidelink transmission resource of the $1^{st}$ cooperation terminal apparatus and the $2^{nd}$ sidelink transmission resource of the $2^{nd}$ cooperation terminal apparatus, the $1^{st}$ cooperation terminal apparatus may determine, based on the RRC signaling, that the sidelink transmission resource of the $1^{st}$ cooperation terminal apparatus is the $1^{st}$ sidelink transmission resource. The $2^{nd}$ cooperation terminal apparatus determines, based on the RRC signaling, that the sidelink transmission resource of the $2^{nd}$ cooperation terminal apparatus is the $2^{nd}$ sidelink transmission resource.

Further, the $i^{th}$ cooperation terminal apparatus may generate the second data based on the first data.

For example, if both the CUE 1 and the CUE 2 correctly receive the sidelink transmission resource and the first data, the CUE 1 and the CUE 2 may forward the correctly received sidelink transmission resource and/or the second data to the TUE.

A specific forwarding manner may be amply-and-forward, decode-and-transcode, compress-and-forward, or the like. The forwarded second data may be a part of the first data, or may be all the first data. The CUE 1 and the CUE 2 may forward a same part of the first data, or may forward different parts of the first data. The specific forwarding manner may be determined by the network apparatus for the cooperative transmission group, or may be determined by the cooperative transmission group through negotiation. This is not limited herein. Certainly, the second data may further include a decoding result obtained by decoding the first data by the CUE, so that the TUE obtains the decoding result of the CUE, to improve data receiving performance.

Further, to improve the efficiency of the cooperative transmission, the network apparatus may indicate whether the second data sent by the cooperation terminal apparatus to the target terminal apparatus is the data on which the target terminal apparatus is to perform soft combination, so that the cooperation terminal apparatus generates the second data based on the soft combination indication. For a specific implementation process, refer to the foregoing embodiment. Details are not described herein again.

Step 3025: The $i^{th}$ cooperation terminal apparatus generates first SCI based on the $i^{th}$ sidelink transmission resource, sends the first SCI to the TUE, and sends the second data to the target terminal apparatus on the $i^{th}$ sidelink transmission resource, where the second data is determined by the $i^{th}$ cooperation terminal apparatus based on the first data received from the network apparatus.

The sidelink control information indicates scheduling information of a sidelink resource. For example, SCI generated by the CUE 1 may indicate scheduling information of a sidelink resource between the CUE 1 and the TUE. The scheduling information of a sidelink may include a sidelink transmission resource that is correctly received by the CUE from the network apparatus and that is used to transmit the second data, or include a sidelink transmission resource determined by the CUE in a resource pool preconfigured by the network apparatus. Specifically, the CUE may send the SCI on a PSCCH, to send the scheduling information of the sidelink resource to the TUE. Certainly, the SCI may alternatively be scheduling assignment (scheduling assignment. SA) information. This is not limited herein.

Using dynamic scheduling as an example, the $1^{st}$ cooperation terminal apparatus CUE 1 generates, based on third DCI_CUE1 from the network apparatus. SCI 1 that carries the $1^{st}$ sidelink transmission resource, and sends the SCI I to the TUE. The CUE 1 sends the second data to the TUE on the $1^{st}$ sidelink transmission resource. Similarly, the CUE 2 may generate, based on third DCI_CUE2 from the network apparatus. SCI 2 that carries the $2^{nd}$ sidelink transmission resource, send the SCI 2 to the TUE, and send the second data to the TUE on the $2^{nd}$ sidelink transmission resource.

Further, the $i^{th}$ cooperation terminal apparatus may send first indication information to the target terminal apparatus.

In a possible design, the first indication information is used to indicate that the $i^{th}$ cooperation terminal apparatus does not correctly decode the first data. Specifically, the first indication information may be a specific symbol sequence, or may be a bit sequence. Using one bit as an example, 0 or 1 is used to indicate that the CUE does not correctly decode data 1. For a specific implementation process, refer to the foregoing embodiment. Details are not described herein again.

Further, to improve the efficiency of the cooperative transmission, the cooperation terminal apparatus sends the second data based on the soft combination indication. For a specific implementation process, refer to the foregoing embodiment. Details are not described herein again.

Step 3026: The TUE obtains the $i^{th}$ sidelink transmission resource from the $i^{th}$ cooperation terminal apparatus, and receives, on the $i^{th}$ sidelink transmission resource, the second data sent by the $i^{th}$ cooperative transmission apparatus CUE i.

For the dynamic scheduling scenario, the TUE obtains the SCI from the $i^{th}$ cooperation terminal apparatus CUE i.

In a possible implementation, the SCI carries the sidelink transmission resource set. If the TUE does not receive the $i^{th}$ sidelink transmission resource sent by the $i^{th}$ cooperation terminal apparatus, the target terminal apparatus may receive, on all the sidelink transmission resources in the sidelink transmission resource set, the second data sent by the $i^{th}$ cooperation terminal apparatus.

In another possible implementation, the SCI carries only the $i^{th}$ sidelink transmission resource. Further, the target terminal apparatus may receive, on the $i^{th}$ sidelink transmission resource, the second data sent by the $i^{th}$ cooperation terminal apparatus CUE i. For example, the TUE obtains the SCI 1 from the CUE 1, and receives, on the $1^{st}$ sidelink transmission resource indicated by the SCI 1, the second data sent by the CUE 1. The TUE obtains the SCI 2 from the CUE 2, and receives, on the $2^{nd}$ sidelink transmission resource indicated by the SCI 2, the second data sent by the CUE 2.

For the semi-persistent scheduling scenario, the target terminal apparatus may determine the sidelink transmission resource of the CUE based on the RRC signaling preconfigured by the network apparatus.

Further, the TUE may decode signals including the second data that are received from the CUE 1 and the CUE 2 in the second phase, to obtain the first data sent by the network apparatus.

For example, the TUE obtains the SCI 1, and receives, on the $1^{st}$ sidelink transmission resource, the second data sent by the CUE 1. The TUE obtains the SCI 2, and receives, on the $2^{nd}$ sidelink transmission resource, the second data sent by the CUE 2.

If the TUE receives second data sent by a plurality of CUEs, the TUE may combine forwarded signals received from the plurality of CUEs in the second phase, to perform decoding. For example, if the TUE receives a signal 1 that includes the second data and that is sent by the CUE I and a signal 2 that includes the second data and that is sent by the CUE 2, the TUE may combine the signal 1 and the signal 2 to perform decoding, to improve accuracy of decoding the second data, and further improve the performance of the cooperative transmission. Transmission through user cooperation is performed, so that performance or reliability of the TUE, a system capacity, and network coverage can be significantly improved, and load of the network apparatus can be reduced.

Further, for a scenario in which the target terminal apparatus receives, by using the SCI, the $i^{th}$ soft combination indication field determined by the $i^{th}$ cooperation terminal apparatus, or a scenario in which the target terminal apparatus receives, by using the SCI, the soft combination indication field set sent by the $i^{th}$ cooperation terminal apparatus, the target terminal apparatus may receive, based on the received $i^{th}$ soft combination indication field or the soft combination indication field in the received soft combination indication field set, the second data or the third data sent by the $i^{th}$ cooperation terminal apparatus. For a specific embodiment of the $i^{th}$ soft combination indication field, refer to the foregoing embodiment, and details are not described herein again.

According to the foregoing embodiment, the target terminal apparatus can simultaneously decode the received second data and third data, to improve a success rate of decoding the first data received by the target terminal apparatus from the network apparatus, thereby improving receiving reliability of the TUE and the performance of the cooperative transmission, and improving transmission efficiency in the system.

The following uses a user autonomous-selection mode as an example for description.

The user autonomous-selection mode is mainly applied to V2X communication in a case with no network coverage. With a lack of unified resource management by a network apparatus, a V2X terminal apparatus can only independently select a resource from a resource pool configured by the network apparatus, to perform V2X communication. For example, for a cell, if the network apparatus configures one resource pool, a plurality of V2X terminal apparatuses in the cell select resources from the resource pool. The user autonomous-selection mode can avoid problems that due to scheduling performed by the base station, signaling overheads of a base station increase and work efficiency of the base station decreases. In the user autonomous-selection mode, a cooperation terminal apparatus can independently select a resource from the resource pool without scheduling by the base station, to send data. For example, the user selection mode includes a resource configuration mode defined in an LTE V2X system, namely, a mode 4, and a resource configuration mode defined in an NR V2X system, namely, a mode 2. The resource pool may be configured by the network apparatus by using a system broadcast message or an RRC message. When sending data, the terminal apparatus may independently obtain at least a part of resources from the resource pool through random selection or according to a sensing based reservation mechanism or a partial sensing based reservation mechanism, to send the data. Because the terminal apparatus independently selects the resource, different terminal apparatuses may select a same resource to send data. Consequently, a transmission collision may occur.

Figure 4:
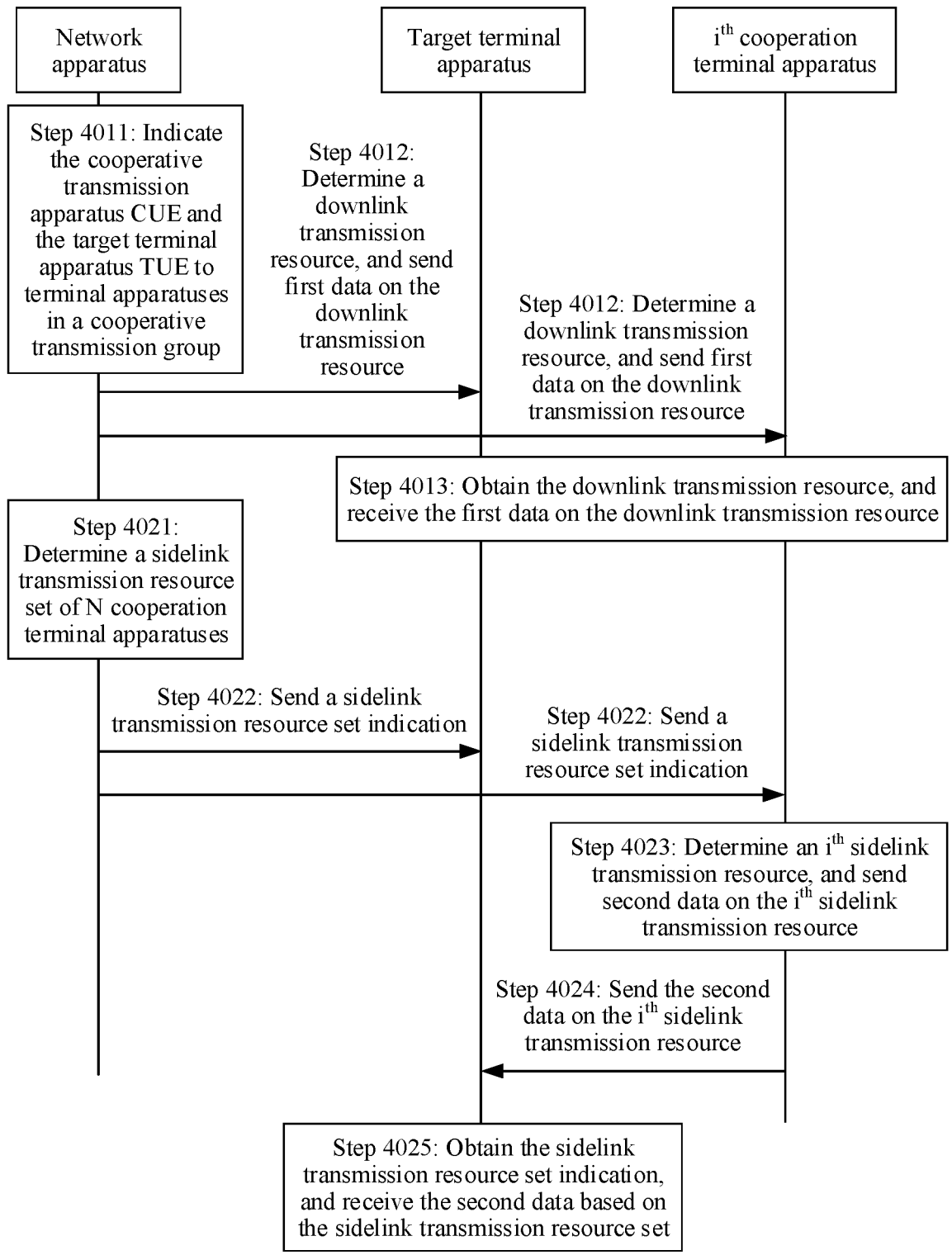
FIG. 4 is a schematic flowchart of a communication method according to an embodiment of this application.

Based on the communication system 100 shown in FIG. 1c, a communication procedure through user cooperation is provided. A network apparatus in the procedure may be specifically the network apparatus 110 in FIG. 1c, a target terminal apparatus may be the terminal apparatus 120 in FIG. 1c, and cooperation terminal apparatuses may be the terminal apparatuses 130 and 140 in FIG. 1c. As shown in FIG. 4, the procedure includes the following steps.

First Phase: Downlink Transmission Phase

Step 4011: The network apparatus determines the target terminal apparatus and the cooperation terminal apparatus in a cooperative transmission group.

For a specific determining manner, refer to the foregoing embodiment. Details are not described herein again.

Step 4012: The network apparatus determines, for the cooperative transmission group, downlink transmission resources used to transmit first data.

In a possible implementation, the network apparatus may send the first data to N cooperation terminal apparatuses and the target terminal apparatus in a unicast manner. In this case, the downlink transmission resources occupied by the first data may be separately configured by the network apparatus for the N cooperation terminal apparatuses and the target terminal apparatus, and DCI may be separately sent to the N cooperation terminal apparatuses and the target terminal apparatus to configure the downlink transmission resources. The network apparatus may send, to an $i^{th}$ cooperation terminal apparatus, first DCI that carries an $i^{th}$ downlink transmission resource. Correspondingly, the network apparatus sends, to the target terminal apparatus, first DCI that carries an $(N+1)^{th}$ downlink transmission resource. In another possible implementation, the downlink transmission resource may be scheduled in a semi-persistent mode. The network apparatus may configure the determined $1^{st}$ downlink transmission resource of the $1^{st}$ cooperation terminal apparatus to the determined $(N+1)^{th}$ downlink transmission resource of the target terminal apparatus for the N cooperation terminal apparatuses and the target terminal apparatus by using RRC signaling.

Alternatively, the network apparatus may send the first data in a multicast or broadcast manner. The network apparatus may configure the downlink transmission resources for the N cooperation terminal apparatuses and the target terminal apparatus through dynamic scheduling using DCI. For example, first DCI separately sent by the network apparatus to the N cooperation terminal apparatuses and the target terminal apparatus may include the downlink transmission resource of each of the N cooperation terminal apparatuses and the downlink transmission resource of the target terminal apparatus. Further, the first data is sent to the N cooperation terminal apparatuses and the target terminal apparatus on the configured downlink transmission resources. In the semi-persistent mode of scheduling the downlink transmission resource, the network apparatus may configure a same downlink transmission resource for the N cooperation terminal apparatuses and the target terminal apparatus by using the RRC signaling. Further, the network apparatus may send the first data on the configured downlink transmission resource in the multicast or broadcast manner.

Step 4013: The cooperation terminal apparatus and/or the target terminal apparatus determine/determines the downlink transmission resource used to transmit the first data, and receive/receives the first data from the network apparatus on the corresponding downlink transmission resource.

In a unicast-based dynamic scheduling manner, the $i^{th}$ cooperation terminal apparatus may receive the first DCI from the network apparatus. In this case, the first DCI includes the $i^{th}$ downlink transmission resource determined for the $i^{th}$ cooperation terminal apparatus. Further, the $i^{th}$ cooperation terminal apparatus receives the first data from the network apparatus on the $i^{th}$ downlink transmission resource. For example, the CUE i blindly detects the first DCI in a candidate search space. If parsing succeeds, the CUE i may determine the $i^{th}$ downlink transmission resource that is carried in the first DCI and that is used to transmit the first data.

Correspondingly, the target terminal apparatus may receive the first DCI from the network apparatus. In this case, the first DCI includes the $(N+1)^{th}$ downlink transmission resource determined for the target terminal apparatus. For example, the TUE blindly detects the first DCI in a candidate search space. If parsing succeeds, the TUE may determine the $(N+1)^{th}$ downlink transmission resource that is carried in the first DCI and that is used to transmit the first data. Further, the target terminal apparatus receives the first data from the network apparatus on the $(N+1)^{th}$ downlink transmission resource.

In a unicast-based semi-persistent scheduling manner, the $i^{th}$ cooperation terminal apparatus may determine, based on the RRC signaling from the network apparatus, the $i^{th}$ downlink transmission resource determined by the network apparatus for the $i^{th}$ cooperation terminal apparatus. Further, the $i^{th}$ cooperation terminal apparatus receives the first data from the network apparatus on the $i^{th}$ downlink transmission resource. Correspondingly, the target terminal apparatus may determine, based on the RRC signaling from the network apparatus, the $(N+1)^{th}$ downlink transmission resource determined by the network apparatus for the target terminal apparatus. Further, the target terminal apparatus receives the first data from the network apparatus on the $(N+1)^{th}$ downlink transmission resource.

In a multicast-based or broadcast-based dynamic scheduling manner, the N cooperation terminal apparatuses and the target terminal apparatus receive the first DCI from the network apparatus. In this case, the first DCI includes the downlink transmission resource determined for the N cooperation terminal apparatuses and the target terminal apparatus. For example, the CUE and the TUE blindly detect the first DCI in a candidate search space. If parsing succeeds, the CUE and the TUE may determine the downlink transmission resource that is carried in the first DCI and that is used to transmit the first data. Further, the N cooperation terminal apparatuses and the target terminal apparatus receive the first data from the network apparatus on the downlink transmission resource.

In a multicast-based or broadcast-based semi-persistent scheduling manner, the N cooperation terminal apparatuses and the target terminal apparatus determine, based on the RRC signaling from the network apparatus, the downlink transmission resource determined by the network apparatus for the N cooperation terminal apparatuses and the target terminal apparatus. Further, the N cooperation terminal apparatuses and the target terminal apparatus receive the first data from the network apparatus on the downlink transmission resource.

In this case, if the target terminal device may receive the $(N+1)^{th}$ downlink transmission resource sent by the network apparatus, the target terminal device may receive the first data on the $(N+1)^{th}$ downlink transmission resource.

For a specific implementation, refer to the embodiments in FIG. 2 and FIG. 3, and details are not described herein again.

Second Phase: Sidelink Transmission Phase

Step 4021: The network apparatus determines, for the cooperative transmission group, a sidelink transmission resource set used to transmit second data.

The sidelink transmission resource set includes the $1^{st}$ time domain resource to an $N^{th}$ time domain resource. The $i^{th}$ sidelink transmission resource includes an $i^{th}$ time domain resource, the $i^{th}$ time domain resource is a time domain resource in the $i^{th}$ sidelink transmission resource, the $i^{th}$ time domain resource is different from a $j^{th}$ time domain resource, and the $j^{th}$ time domain resource is a time domain resource that is in a $j^{th}$ sidelink transmission resource and that is determined by the network apparatus based on time domain resources.

For a specific manner of determining the sidelink transmission resource set, refer to the embodiment in FIG. 2. Details are not described herein again.

Step 4022: The network apparatus sends a sidelink transmission resource set indication to the N cooperation terminal apparatuses and the target terminal apparatus.

In this case, the network apparatus may send the sidelink transmission resource set indication to the N cooperation terminals CUEs. For example, second DCI may be sent to send the sidelink transmission resource set indication to the N cooperation terminal apparatuses. The second DCI is used to indicate a sidelink transmission resource set allocated by the network apparatus to first CUE to transmit the second data. For example, the network apparatus determines a sidelink transmission resource set for a CUE 1 and a CUE 2, where the sidelink transmission resource set includes the $1^{st}$ sidelink transmission resource and the $2^{nd}$ sidelink transmission resource. The network apparatus generates second DCI that carries the sidelink transmission resource set, and then sends the second DCI to the CUE 1 and the CUE 2. Certainly, the sidelink transmission resource set may alternatively be configured by using RRC signaling, to be notified to the N cooperation terminal apparatuses. This is not limited herein.

Step 4023: The $i^{th}$ cooperation terminal apparatus and the target terminal apparatus receive the sidelink transmission resource set indication used to transmit the second data.

With reference to the foregoing example of sending the second DCI, the CUE 1 may independently select the $1^{st}$ sidelink transmission resource in the second DCI based on the second DCI from the network apparatus. In this case, the CUE 1 may send the second data to the TUE on the $1^{st}$ sidelink transmission resource. The CUE 2 may independently select the $2^{nd}$ sidelink transmission resource in the second DCI based on the second DCI from the network apparatus. In this case, the CUE 2 may send the second data to the TUE on the $2^{nd}$ sidelink transmission resource.

Further, the $i^{th}$ cooperation terminal apparatus CUE i may generate first SCI based on the sidelink transmission resource set, and send the first SCI to the TUE, so that the target terminal apparatus receives the second data of the $i^{th}$ cooperation terminal apparatus based on the sidelink transmission resource set.

Alternatively, in another possible implementation, the $i^{th}$ cooperation terminal apparatus CUE i may alternatively generate first SCI based on the selected $i^{th}$ sidelink transmission resource, and send the first SCI to the TUE.

In addition, the $i^{th}$ cooperation terminal apparatus may further send first indication information to the target terminal apparatus, where the first indication information is used to indicate that the $i^{th}$ cooperation terminal apparatus does not correctly decode the first data.

Step 4024: The $i^{th}$ cooperation terminal apparatus determines the $i^{th}$ sidelink transmission resource from the sidelink transmission resource set, and sends the second data to the TUE on the $i^{th}$ sidelink transmission resource.

Further, with reference to the foregoing example, the $i^{th}$ cooperation terminal apparatus CUE i may send the first SCI to the TUE, and send the second data to the TUE on the $i^{th}$ sidelink transmission resource of the $i^{th}$ cooperation terminal apparatus CUE i.

For example, the CUE 1 generates, based on the $1^{st}$ sidelink transmission resource, SCI 1 that carries the $1^{st}$ sidelink transmission resource, and sends the SCI 1 to the TUE. The CUE 1 sends the second data to the TUE on the $1^{st}$ sidelink transmission resource. Similarly, the CUE 2 may generate, based on the second DCI from the network apparatus, SCI 2 that carries the $2^{nd}$ sidelink transmission resource, and send the SCI 2 to the TUE. The CUE 2 sends the second data to the TUE on the $2^{nd}$ sidelink transmission resource.

Step 4025: The target terminal apparatus receives, on the sidelink transmission resource in the sidelink transmission resource set, the second data sent by the $i^{th}$ cooperation terminal apparatus.

In a possible implementation, if the TUE obtains the first SCI, the TUE may determine the $i^{th}$ sidelink transmission resource of the $i^{th}$ cooperation terminal apparatus based on the first SCI. In this case, the TUE may receive, on the $i^{th}$ sidelink transmission resource, the second data sent by the $i^{th}$ cooperation terminal apparatus.

In another possible implementation, if the first SCI obtained by the TUE carries the sidelink transmission resource set, the TUE may receive, on the sidelink transmission resource in the sidelink transmission resource set, the second data sent by the $i^{th}$ cooperation terminal apparatus.

In still another possible implementation, if the TUE obtains the sidelink transmission resource set indication sent by the network apparatus to the TUE, the TUE may receive, on the sidelink transmission resource in the sidelink transmission resource set, the second data sent by the $i^{th}$ cooperation terminal apparatus.

For example, the TUE obtains the SCI 1, and receives, on the $1^{st}$ sidelink transmission resource, the second data sent by the CUE 1. The TUE obtains the SCI 2, and receives, on the $2^{nd}$ sidelink transmission resource, the second data sent by the CUE 2.

If the TUE receives second data sent by a plurality of CUEs, the TUE may combine forwarded signals received from the plurality of CUEs in the second phase, to perform decoding. For example, if the TUE receives a signal 1 that includes the second data and that is sent by the CUE 1 and a signal 2 that includes the second data and that is sent by the CUE 2, the TUE may combine the signal 1 and the signal 2 to perform decoding, to improve accuracy of decoding the second data, and further improve performance of cooperative transmission.

It should be noted that the foregoing procedures merely represent a plurality of possible scenarios to which this application is applied, and are not intended to limit this application. The communication method provided in this embodiment of this application may be further applied to another application scenario involving cooperative transmission.

However, in the user autonomous-selection mode, a plurality of cooperation terminal apparatuses may all select sidelink transmission resources from the same sidelink transmission resource set. Consequently, a probability that resource collision occurs between the cooperation terminal apparatuses is high, affecting an effect of transmission through user cooperation.

The following specifically describes a format of the sidelink transmission resource in embodiments of this application.

In a process of determining the sidelink transmission resource set, the network apparatus may further divide the sidelink transmission resource set into a plurality of sub-channels based on a quantity of cooperation terminal apparatuses, where one cooperation terminal apparatus CUE uses one sub-channel. A sub-channel pattern (sub-channel pattern) may be periodically or aperiodically configured by the network apparatus by using RRC, or may be dynamically configured by the network apparatus by using DCI. This is not limited herein.

Example 1: A time domain resource in the $i^{th}$ sidelink transmission resource is an $i^{th}$ time domain resource, where the $i^{th}$ time domain resource is different from a $j^{th}$ time domain resource, and the $j^{th}$ time domain resource is a time domain resource that is in the $j^{th}$ sidelink transmission resource and that is determined by the network apparatus based on time domain resources.

Figure 5A:
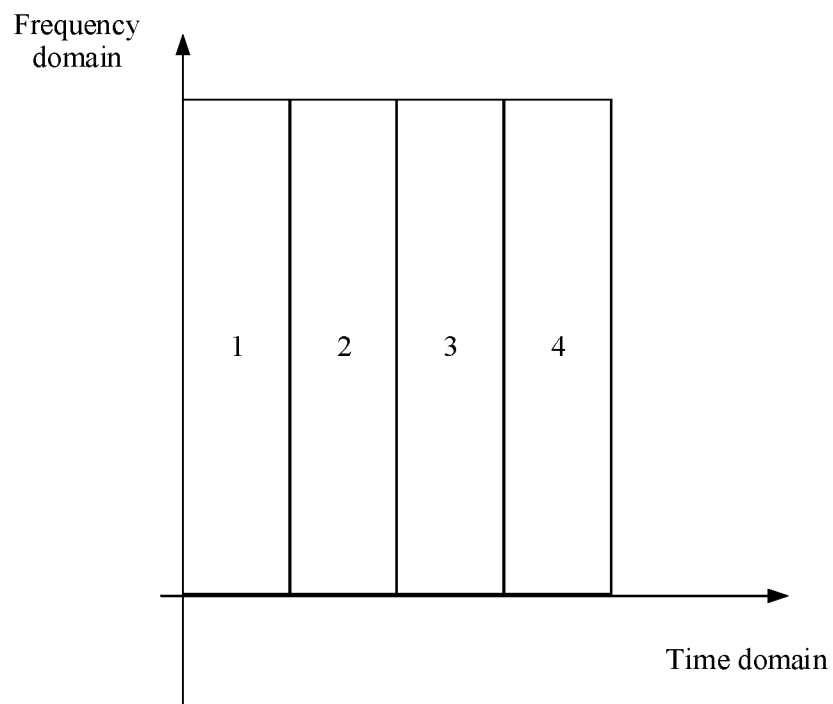
FIG. 5a and FIG. 5b each are an example diagram of a sidelink transmission resource according to an embodiment of this application.

The following uses an example in which there are four pieces of data of cooperation terminal apparatuses. As shown in FIG. 5a, time-frequency resources corresponding to four sub-channels are a sidelink time-frequency resource set allocated to a cooperative transmission group. The network apparatus may divide the sidelink transmission resource set into four sub-channels in time domain. It is assumed that the network apparatus determines that a time domain resource corresponding to the $1^{st}$ sub-channel is the $1^{st}$ time domain resource, and the $1^{st}$ time domain resource is a sidelink time domain resource used by the $1^{st}$ cooperation terminal apparatus to send second data. The network apparatus determines that a time domain resource corresponding to the $2^{nd}$ sub-channel is the $2^{nd}$ time domain resource, and the $2^{nd}$ time domain resource is a sidelink time domain resource used by the $2^{nd}$ cooperation terminal apparatus to send second data. The network apparatus determines that a time domain resource corresponding to the $3^{rd}$ sub-channel is the $3^{rd}$ time domain resource, and the $3^{rd}$ time domain resource is a sidelink time domain resource used by the $3^{rd}$ cooperation terminal apparatus to send second data. The network apparatus determines that a time domain resource corresponding to the 4th sub-channel is the 4th time domain resource, and the 4th time domain resource is a sidelink time domain resource used by the 4th cooperation terminal apparatus to send second data.

In this scenario, when receiving the second data on the $1^{st}$ time-frequency resource corresponding to the sub-channel 1, the TUE may immediately attempt decoding, to quickly obtain the second data. Therefore, in this scenario, low-latency cooperative transmission can be implemented, and frequency selective fading can be resisted.

Example 2: A frequency domain resource in the $i^{th}$ sidelink transmission resource is an $i^{th}$ frequency domain resource, where the $i^{th}$ frequency domain resource is different from a $j^{th}$ frequency domain resource, and the $j^{th}$ frequency domain resource is a frequency domain resource that is in the $j^{th}$ sidelink transmission resource and that is determined by the network apparatus based on time domain resources.

Figure 5B:
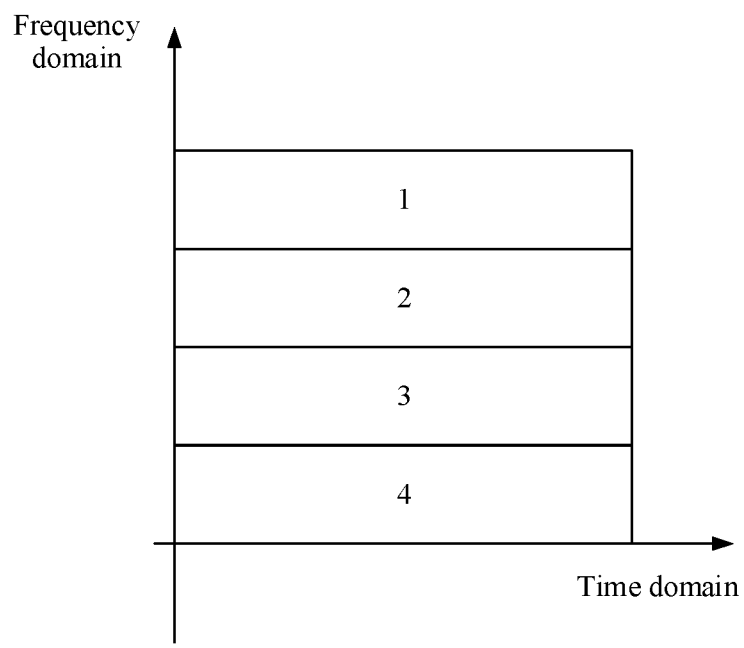

The following uses an example in which there are four pieces of data of cooperation terminal apparatuses. As shown in FIG. 5b, time-frequency resources corresponding to four sub-channels are a sidelink time-frequency resource set allocated to a cooperative transmission group. The network apparatus may divide the sidelink transmission resource set into four sub-channels in frequency domain. It is assumed that the network apparatus determines that a frequency domain resource corresponding to the $1^{st}$ sub-channel is the $1^{st}$ frequency domain resource, and the $1^{st}$ frequency domain resource is a sidelink frequency domain resource used by the $1^{st}$ cooperation terminal apparatus to send second data. The network apparatus determines that a frequency domain resource corresponding to the $2^{nd}$ sub-channel is the $2^{nd}$ frequency domain resource, and the $2^{nd}$ frequency domain resource is a sidelink frequency domain resource used by the $2^{nd}$ cooperation terminal apparatus to send second data. The network apparatus determines that a frequency domain resource corresponding to the $3^{rd}$ sub-channel is the $3^{rd}$ frequency domain resource, and the $3^{rd}$ frequency domain resource is a sidelink frequency domain resource used by the $3^{rd}$ cooperation terminal apparatus to send second data. The network apparatus determines that a frequency domain resource corresponding to the 4th sub-channel is the 4th frequency domain resource, and the 4th frequency domain resource is a sidelink frequency domain resource used by the 4th cooperation terminal apparatus to send second data.

In this scenario, when receiving the second data on the $1^{st}$ time-frequency resource corresponding to the sub-channel 1, the TUE needs to obtain all signals on time domain resources, and then attempts decoding. In this scenario, the signal received by the target terminal apparatus may resist burst interference.

Example 3: A time-frequency resource in the $i^{th}$ sidelink transmission resource is an $i^{th}$ sub-resource group, where the $i^{th}$ sub-resource group includes N sub-resources, a time-frequency resource in any one of the N sub-resources in the $i^{th}$ sub-resource group is different from a time-frequency resource in any one of N sub-resources in a $j^{th}$ sub-resource group, the $i^{th}$ sub-resource group is the time-frequency resource in the $i^{th}$ sidelink transmission resource, and the $j^{th}$ sub-resource group is a time-frequency resource that is in the $j^{th}$ sidelink transmission resource and that is determined by the network apparatus.

Figure 6A:
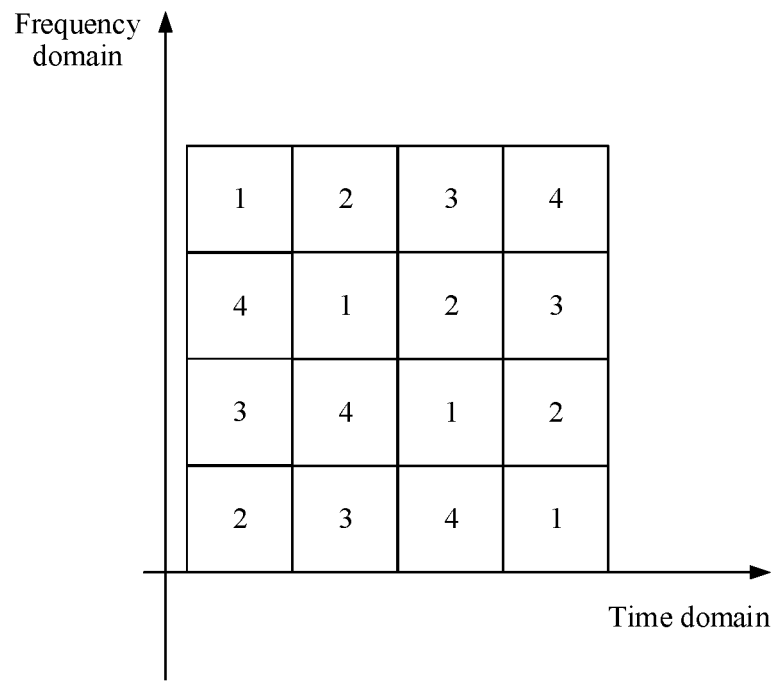
FIG. 6a to FIG. 6f each are an example diagram of a sidelink transmission resource according to an embodiment of this application.

The following uses an example in which there are four pieces of data of cooperation terminal apparatuses. As shown in FIG. 6a, time-frequency resources corresponding to 16 sub-channels are a sidelink time-frequency resource set allocated to a cooperative transmission group. The network apparatus may divide the sidelink transmission resource set into 16 resource grids in both time domain and frequency domain. Therefore, for the 16 resource grids, a plurality of sidelink time-frequency resources may be correspondingly obtained through division.

In embodiments of this application, the sidelink time-frequency resources obtained through division are classified based on implemented functions.

For a first type, adjacent sub-resources are different, each row includes one sub-resource in each sub-resource group, and each column includes one sub-resource in each sub-resource group, so that the sidelink time-frequency resources obtained through division can resist both the frequency selective fading and the burst interference.

In a possible division manner, as shown in FIG. 6a, it is assumed that the network apparatus determines that a time-frequency resource corresponding to a resource grid in the $1^{st}$ row and the $1^{st}$ column is the $1^{st}$ sub-resource in the $1^{st}$ sub-resource group, a time-frequency resource corresponding to a resource grid in the $2^{nd}$ row and the $2^{nd}$ column is the $2^{nd}$ sub-resource in the $1^{st}$ sub-resource group, a time-frequency resource corresponding to a resource grid in the $3^{rd}$ row and the $3^{rd}$ column is the $3^{rd}$ sub-resource in the $1^{st}$ sub-resource group, a time-frequency resource corresponding to a resource grid in the 4th row and the 4th column is the 4th sub-resource in the $1^{st}$ sub-resource group, and the $1^{st}$ sub-resource group is a sidelink frequency domain resource used by the $1^{st}$ cooperation terminal apparatus to send second data.

Similarly: the network apparatus determines that a time-frequency resource corresponding to a resource grid in the $1^{st}$ row and the $2^{nd}$ column is the $1^{st}$ sub-resource in the $2^{nd}$ sub-resource group, a time-frequency resource corresponding to a resource grid in the $2^{nd}$ row and the $3^{rd}$ column is the $2^{nd}$ sub-resource in the $2^{nd}$ sub-resource group, a time-frequency resource corresponding to a resource grid in the $3^{rd}$ row and the 4th column is the $3^{rd}$ sub-resource in the $2^{nd}$ sub-resource group, a time-frequency resource corresponding to a resource grid in the 4th row and the $1^{st}$ column is the 4th sub-resource in the $2^{nd}$ sub-resource group, and the $2^{nd}$ sub-resource group is a sidelink frequency domain resource used by the $2^{nd}$ cooperation terminal apparatus to send second data.

Similarly, the network apparatus determines that a time-frequency resource corresponding to a resource grid in the $1^{st}$ row and the $3^{rd}$ column is the $1^{st}$ sub-resource in the $3^{rd}$ sub-resource group, a time-frequency resource corresponding to a resource grid in the $2^{nd}$ row and the 4th column is the $2^{nd}$ sub-resource in the $3^{rd}$ sub-resource group, a time-frequency resource corresponding to a resource grid in the $3^{rd}$ row and the $1^{st}$ column is the $3^{rd}$ sub-resource in the $3^{rd}$ sub-resource group, a time-frequency resource corresponding to a resource grid in the 4th row and the $2^{nd}$ column is the 4th sub-resource in the $3^{rd}$ sub-resource group, and the $3^{rd}$ sub-resource group is a sidelink frequency domain resource used by the $3^{rd}$ cooperation terminal apparatus to send second data.

Similarly, the network apparatus determines that a time-frequency resource corresponding to a resource grid in the $1^{st}$ row and the 4th column is the $1^{st}$ sub-resource in the 4th sub-resource group, a time-frequency resource corresponding to a resource grid in the $2^{nd}$ row and the $1^{st}$ column is the $2^{nd}$ sub-resource in the 4th sub-resource group, a time-frequency resource corresponding to a resource grid in the $3^{rd}$ row and the $2^{nd}$ column is the $3^{rd}$ sub-resource in the 4th sub-resource group, a time-frequency resource corresponding to a resource grid in the 4th row and the $3^{rd}$ column is the 4th sub-resource in the $4^{th}$ sub-resource group, and the $4^{th}$ sub-resource group is a sidelink frequency domain resource used by the $4^{th}$ cooperation terminal apparatus to send second data.

In this scenario, when receiving the second data on the four sub-resources in the $1^{st}$ sub-resource group whose identifier is 1, the TUE attempts decoding, to obtain the second data sent by the $1^{st}$ cooperation terminal apparatus. In this scenario, both the frequency selective fading and the burst interference can be resisted.

Figure 6B:
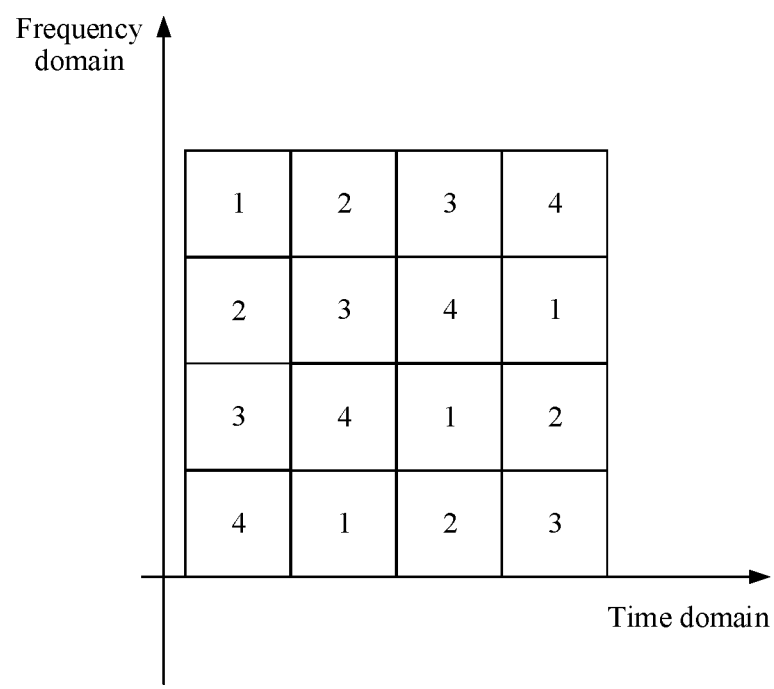

In another possible implementation, as shown in FIG. 6b, it is assumed that the network apparatus determines that a time-frequency resource corresponding to a resource grid in the $1^{st}$ row and the $1^{st}$ column is the $1^{st}$ sub-resource in the $1^{st}$ sub-resource group, a time-frequency resource corresponding to a resource grid in the $2^{nd}$ row and the $4^{th}$ column is the $2^{nd}$ sub-resource in the $1^{st}$ sub-resource group, a time-frequency resource corresponding to a resource grid in the $3^{rd}$ row and the $3^{rd}$ column is the $3^{rd}$ sub-resource in the $1^{st}$ sub-resource group, a time-frequency resource corresponding to a resource grid in the $4^{th}$ row and the $2^{nd}$ column is the $4^{th}$ sub-resource in the $1^{st}$ sub-resource group, and the $1^{st}$ sub-resource group is a sidelink frequency domain resource used by the $1^{st}$ cooperation terminal apparatus to send second data.

Similarly, the network apparatus determines that a time-frequency resource corresponding to a resource grid in the $1^{st}$ row and the $2^{nd}$ column is the $1^{st}$ sub-resource in the $2^{nd}$ sub-resource group, a time-frequency resource corresponding to a resource grid in the $2^{nd}$ row and the $1^{st}$ column is the $2^{nd}$ sub-resource in the $2^{nd}$ sub-resource group, a time-frequency resource corresponding to a resource grid in the $3^{rd}$ row and the $4^{th}$ column is the $3^{rd}$ sub-resource in the $2^{nd}$ sub-resource group, a time-frequency resource corresponding to a resource grid in the $4^{th}$ row and the $3^{rd}$ column is the $4^{th}$ sub-resource in the $2^{nd}$ sub-resource group, and the $2^{nd}$ sub-resource group is a sidelink frequency domain resource used by the $2^{nd}$ cooperation terminal apparatus to send second data.

Similarly: the network apparatus determines that a time-frequency resource corresponding to a resource grid in the $1^{st}$ row and the $3^{rd}$ column is the $1^{st}$ sub-resource in the $3^{rd}$ sub-resource group, a time-frequency resource corresponding to a resource grid in the $2^{nd}$ row and the $2^{nd}$ column is the $2^{nd}$ sub-resource in the $3^{rd}$ sub-resource group, a time-frequency resource corresponding to a resource grid in the $3^{rd}$ row and the $1^{st}$ column is the $3^{rd}$ sub-resource in the $3^{rd}$ sub-resource group, a time-frequency resource corresponding to a resource grid in the $4^{th}$ row and the $4^{th}$ column is the $4^{th}$ sub-resource in the $3^{rd}$ sub-resource group, and the $3^{rd}$ sub-resource group is a sidelink frequency domain resource used by the $3^{rd}$ cooperation terminal apparatus to send second data.

Similarly, the network apparatus determines that a time-frequency resource corresponding to a resource grid in the $1^{st}$ row and the $4^{th}$ column is the $1^{st}$ sub-resource in the $4^{th}$ sub-resource group, a time-frequency resource corresponding to a resource grid in the $2^{nd}$ row and the $3^{rd}$ column is the $2^{nd}$ sub-resource in the $4^{th}$ sub-resource group, a time-frequency resource corresponding to a resource grid in the $3^{rd}$ row and the $2^{nd}$ column is the $3^{rd}$ sub-resource in the $4^{th}$ sub-resource group, a time-frequency resource corresponding to a resource grid in the $4^{th}$ row and the $1^{st}$ column is the $4^{th}$ sub-resource in the $4^{th}$ sub-resource group, and the $4^{th}$ sub-resource group is a sidelink frequency domain resource used by the $4^{th}$ cooperation terminal apparatus to send second data.

In this scenario, when receiving the second data on the four sub-resources in the $1^{st}$ sub-resource group whose identifier is 1, the TUE attempts decoding, to obtain the second data sent by the $1^{st}$ cooperation terminal apparatus. In this scenario, both the frequency selective fading and the burst interference can be resisted.

For a second type, adjacent sub-resources may be the same or may be different, each row includes a plurality of sub-resources in a part of sub-resource groups, and each column includes a plurality of sub-resources in a part of sub-resource groups, so that the sidelink time-frequency resources obtained through division can resist both the frequency selective fading and the burst interference to some extent.

Figure 6C:
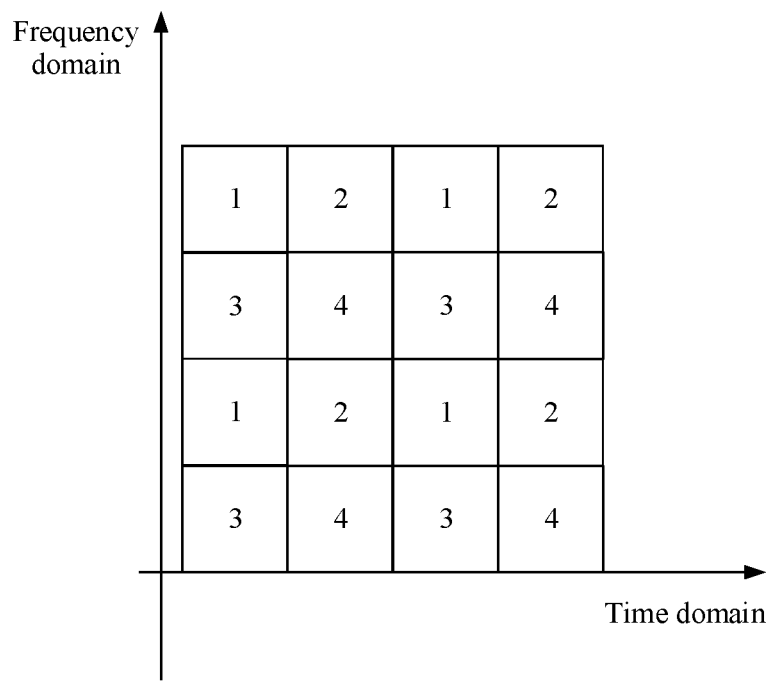

In a possible division manner, as shown in FIG. 6c, it is assumed that the network apparatus determines that a time-frequency resource corresponding to a resource grid in the $1^{st}$ row and the $1^{st}$ column is the $1^{st}$ sub-resource in the $1^{st}$ sub-resource group, a time-frequency resource corresponding to a resource grid in the $1^{st}$ row and the $3^{rd}$ column is the $2^{nd}$ sub-resource in the $1^{st}$ sub-resource group, a time-frequency resource corresponding to a resource grid in the $3^{rd}$ row and the $1^{st}$ column is the $3^{rd}$ sub-resource in the $1^{st}$ sub-resource group, a time-frequency resource corresponding to a resource grid in the $3^{rd}$ row and the $3^{rd}$ column is the $4^{th}$ sub-resource in the $1^{st}$ sub-resource group, and the $1^{st}$ sub-resource group is a sidelink frequency domain resource used by the $1^{st}$ cooperation terminal apparatus to send second data.

Similarly: the network apparatus determines that a time-frequency resource corresponding to a resource grid in the $1^{st}$ row and the $2^{nd}$ column is the $1^{st}$ sub-resource in the $2^{nd}$ sub-resource group, a time-frequency resource corresponding to a resource grid in the $1^{st}$ row and the $4^{th}$ column is the $2^{nd}$ sub-resource in the $2^{nd}$ sub-resource group, a time-frequency resource corresponding to a resource grid in the $3^{rd}$ row and the $2^{nd}$ column is the $3^{rd}$ sub-resource in the $2^{nd}$ sub-resource group, a time-frequency resource corresponding to a resource grid in the $3^{rd}$ row and the $4^{th}$ column is the $4^{th}$ sub-resource in the $2^{nd}$ sub-resource group, and the $2^{nd}$ sub-resource group is a sidelink frequency domain resource used by the $2^{nd}$ cooperation terminal apparatus to send second data.

Similarly, the network apparatus determines that a time-frequency resource corresponding to a resource grid in the $2^{nd}$ row and the $1^{st}$ column is the $1^{st}$ sub-resource in the $3^{rd}$ sub-resource group, a time-frequency resource corresponding to a resource grid in the $2^{nd}$ row and the $3^{rd}$ column is the 2nd sub-resource in the 3rd sub-resource group, a time-frequency resource corresponding to a resource grid in the 4th row and the 1st column is the 3rd sub-resource in the 3rd sub-resource group, a time-frequency resource corresponding to a resource grid in the 3rd row and the 3rd column is the 4th sub-resource in the 3rd sub-resource group, and the 3rd sub-resource group is a sidelink frequency domain resource used by the 3rd cooperation terminal apparatus to send second data.

Similarly, the network apparatus determines that a time-frequency resource corresponding to a resource grid in the 2nd row and the 2nd column is the 1st sub-resource in the 4th sub-resource group, a time-frequency resource corresponding to a resource grid in the 2nd row and the 4th column is the 2nd sub-resource in the 4th sub-resource group, a time-frequency resource corresponding to a resource grid in the 4th row and the 2nd column is the 3rd sub-resource in the 4th sub-resource group, a time-frequency resource corresponding to a resource grid in the 4th row and the 4th column is the 4th sub-resource in the 4th sub-resource group, and the 4th sub-resource group is a sidelink frequency domain resource used by the 4th cooperation terminal apparatus to send second data.

In this scenario, when receiving the second data on the four sub-resources in the 1st sub-resource group whose identifier is 1, the TUE attempts decoding, to obtain the second data sent by the 1st cooperation terminal apparatus. In this scenario, a part of same sub-resources in a sub-resource group are set in both time domain and frequency domain. Therefore, both the frequency selective fading and the burst interference can be resisted to some extent.

Figure 6D:
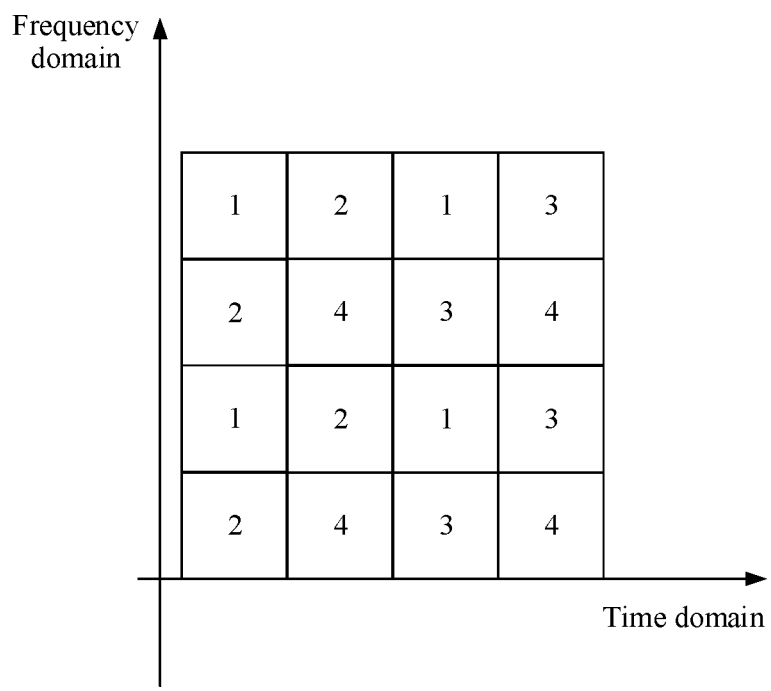

In another possible implementation, as shown in FIG. 6d, it is assumed that the network apparatus determines that a time-frequency resource corresponding to a resource grid in the 1st row and the 1st column is the 1st sub-resource in the 1st sub-resource group, a time-frequency resource corresponding to a resource grid in the 1st row and the 3rd column is the 2nd sub-resource in the 1st sub-resource group, a time-frequency resource corresponding to a resource grid in the 3rd row and the 1st column is the 3rd sub-resource in the 1st sub-resource group, a time-frequency resource corresponding to a resource grid in the 3rd row and the 3rd column is the 4th sub-resource in the 1st sub-resource group, and the 1st sub-resource group is a sidelink frequency domain resource used by the 1st cooperation terminal apparatus to send second data.

Similarly, the network apparatus determines that a time-frequency resource corresponding to a resource grid in the 1st row and the 2nd column is the 1st sub-resource in the 2nd sub-resource group, a time-frequency resource corresponding to a resource grid in the 2nd row and the 1st column is the 2nd sub-resource in the 2nd sub-resource group, a time-frequency resource corresponding to a resource grid in the 3rd row and the 2nd column is the 3rd sub-resource in the 2nd sub-resource group, a time-frequency resource corresponding to a resource grid in the 4th row and the 1st column is the 4th sub-resource in the 2nd sub-resource group, and the 2nd sub-resource group is a sidelink frequency domain resource used by the 2nd cooperation terminal apparatus to send second data.

Similarly, the network apparatus determines that a time-frequency resource corresponding to a resource grid in the 1st row and the 4th column is the 1st sub-resource in the 3rd sub-resource group, a time-frequency resource corresponding to a resource grid in the 2nd row and the 3rd column is the 2nd sub-resource in the 3rd sub-resource group, a time-frequency resource corresponding to a resource grid in the 3rd row and the 4th column is the 3rd sub-resource in the 3rd sub-resource group, a time-frequency resource corresponding to a resource grid in the 4th row and the 3rd column is the 4th sub-resource in the 3rd sub-resource group, and the 3rd sub-resource group is a sidelink frequency domain resource used by the 3rd cooperation terminal apparatus to send second data.

Similarly, the network apparatus determines that a time-frequency resource corresponding to a resource grid in the 2nd row and the 2nd column is the 1st sub-resource in the 4th sub-resource group, a time-frequency resource corresponding to a resource grid in the 2nd row and the 4th column is the 2nd sub-resource in the 4th sub-resource group, a time-frequency resource corresponding to a resource grid in the 4th row and the 2nd column is the 3rd sub-resource in the 4th sub-resource group, a time-frequency resource corresponding to a resource grid in the 4th row and the 4th column is the 4th sub-resource in the 4th sub-resource group, and the 4th sub-resource group is a sidelink frequency domain resource used by the 4th cooperation terminal apparatus to send second data.

In this scenario, when receiving the second data on the four sub-resources in the 1st sub-resource group whose identifier is 1, the TUE attempts decoding, to obtain the second data sent by the 1st cooperation terminal apparatus. In this scenario, a part of same sub-resources in a sub-resource group are set in both time domain and frequency domain. Therefore, both the frequency selective fading and the burst interference can be resisted to some extent.

For a third type, adjacent sub-resources may be the same or may be different, each row includes one sub-resource in each sub-resource group, and each column includes a plurality of sub-resources in a part of sub-resource groups, so that the sidelink time-frequency resources obtained through division can resist the frequency selective fading, and can also resist the burst interference to some extent.

Figure 6E:
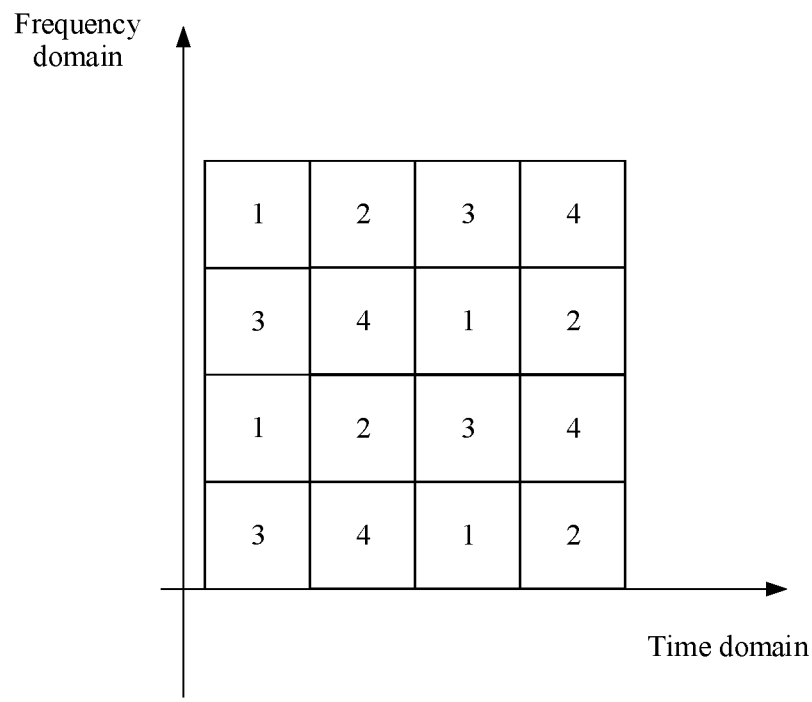

In a possible division manner, as shown in FIG. 6e, it is assumed that the network apparatus determines that a time-frequency resource corresponding to a resource grid in the 1st row and the 1st column is the 1st sub-resource in the 1st sub-resource group, a time-frequency resource corresponding to a resource grid in the 2nd row and the 3rd column is the 2nd sub-resource in the 1st sub-resource group, a time-frequency resource corresponding to a resource grid in the 3rd row and the 1st column is the 3rd sub-resource in the 1st sub-resource group, a time-frequency resource corresponding to a resource grid in the 4th row and the 3rd column is the 4th sub-resource in the 1st sub-resource group, and the 1st sub-resource group is a sidelink frequency domain resource used by the 1st cooperation terminal apparatus to send second data.

Similarly, the network apparatus determines that a time-frequency resource corresponding to a resource grid in the 1st row and the 2nd column is the 1st sub-resource in the 2nd sub-resource group, a time-frequency resource corresponding to a resource grid in the 2nd row and the 4th column is the 2nd sub-resource in the 2nd sub-resource group, a time-frequency resource corresponding to a resource grid in the 3rd row and the 2nd column is the 3rd sub-resource in the 2nd sub-resource group, a time-frequency resource corresponding to a resource grid in the 4th row and the 4th column is the 4th sub-resource in the 2nd sub-resource group, and the 2nd sub-resource group is a sidelink frequency domain resource used by the 2nd cooperation terminal apparatus to send second data.

Similarly, the network apparatus determines that a time-frequency resource corresponding to a resource grid in the 1st row and the 3rd column is the 1st sub-resource in the 3rd sub-resource group, a time-frequency resource corresponding to a resource grid in the 2nd row and the 1st column is the 2nd sub-resource in the 3rd sub-resource group, a time-frequency resource corresponding to a resource grid in the 3rd row and the 3rd column is the 3rd sub-resource in the 3rd sub-resource group, a time-frequency resource corresponding to a resource grid in the 4th row and the 1st column is the 4th sub-resource in the 3rd sub-resource group, and the 3rd sub-resource group is a sidelink frequency domain resource used by the 3rd cooperation terminal apparatus to send second data.

Similarly, the network apparatus determines that a time-frequency resource corresponding to a resource grid in the 1st row and the 4th column is the 1st sub-resource in the 4th sub-resource group, a time-frequency resource corresponding to a resource grid in the 2nd row and the 2nd column is the 2nd sub-resource in the 4th sub-resource group, a time-frequency resource corresponding to a resource grid in the 3rd row and the 4th column is the 3rd sub-resource in the 4th sub-resource group, a time-frequency resource corresponding to a resource grid in the 4th row and the 2nd column is the 4th sub-resource in the 4th sub-resource group, and the 4th sub-resource group is a sidelink frequency domain resource used by the 4th cooperation terminal apparatus to send second data.

In this scenario, when receiving the second data on the four sub-resources in the 1st sub-resource group whose identifier is 1, the TUE attempts decoding, to obtain the second data sent by the 1st cooperation terminal apparatus. In this scenario, sub-resources in different sub-resource groups are set in time domain, and a part of same sub-resources in a sub-resource group are set in frequency domain. Therefore, the frequency selective fading can be resisted, and the burst interference can also be resisted to some extent.

For a fourth type, adjacent sub-resources may be the same or may be different, each column includes one sub-resource in each sub-resource group, and each row includes a plurality of sub-resources in a part of sub-resource groups, so that the sidelink time-frequency resources obtained through division can resist the frequency selective fading to some extent, and can also resist the burst interference.

Figure 6F:
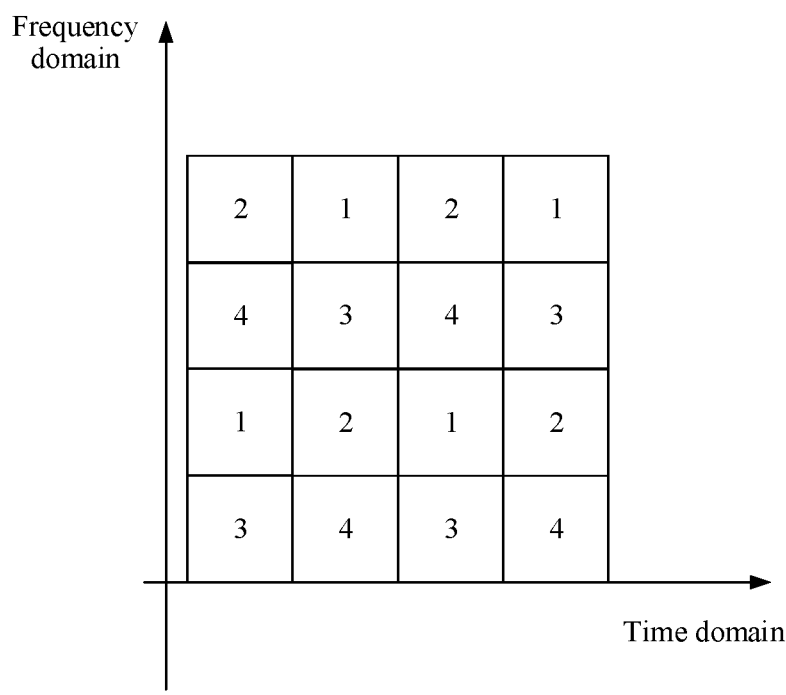

In a possible division manner, as shown in FIG. 6f, it is assumed that the network apparatus determines that a time-frequency resource corresponding to a resource grid in the 1st row and the 2nd column is the 1st sub-resource in the 1st sub-resource group, a time-frequency resource corresponding to a resource grid in the 1st row and the 4th column is the 2nd sub-resource in the 1st sub-resource group, a time-frequency resource corresponding to a resource grid in the 3rd row and the 1st column is the 3rd sub-resource in the 1st sub-resource group, a time-frequency resource corresponding to a resource grid in the 3rd row and the 3rd column is the 4th sub-resource in the 1st sub-resource group, and the 1st sub-resource group is a sidelink frequency domain resource used by the 1st cooperation terminal apparatus to send second data.

Similarly: the network apparatus determines that a time-frequency resource corresponding to a resource grid in the 1st row and the 1st column is the 1st sub-resource in the 2nd sub-resource group, a time-frequency resource corresponding to a resource grid in the 1st row and the 3rd column is the 2nd sub-resource in the 2nd sub-resource group, a time-frequency resource corresponding to a resource grid in the 3rd row and the 2nd column is the 3rd sub-resource in the 2nd sub-resource group, a time-frequency resource corresponding to a resource grid in the 3rd row and the 4th column is the 4th sub-resource in the 2nd sub-resource group, and the 2nd sub-resource group is a sidelink frequency domain resource used by the 2nd cooperation terminal apparatus to send second data.

Similarly, the network apparatus determines that a time-frequency resource corresponding to a resource grid in the 2nd row and the 2nd column is the 1st sub-resource in the 3rd sub-resource group, a time-frequency resource corresponding to a resource grid in the 2nd row and the 4th column is the 2nd sub-resource in the 3rd sub-resource group, a time-frequency resource corresponding to a resource grid in the 4th row and the 1st column is the 3rd sub-resource in the 3rd sub-resource group, a time-frequency resource corresponding to a resource grid in the 4th row and the 3rd column is the 4th sub-resource in the 3rd sub-resource group, and the 3rd sub-resource group is a sidelink frequency domain resource used by the 3rd cooperation terminal apparatus to send second data.

Similarly, the network apparatus determines that a time-frequency resource corresponding to a resource grid in the 2nd row and the 1st column is the 1st sub-resource in the 4th sub-resource group, a time-frequency resource corresponding to a resource grid in the 2nd row and the 3rd column is the 2nd sub-resource in the 4th sub-resource group, a time-frequency resource corresponding to a resource grid in the 4th row and the 2nd column is the 3rd sub-resource in the 4th sub-resource group, a time-frequency resource corresponding to a resource grid in the 4th row and the 4th column is the 4th sub-resource in the 4th sub-resource group, and the 4th sub-resource group is a sidelink frequency domain resource used by the 4th cooperation terminal apparatus to send second data. When receiving the second data on the four sub-resources in the 1st sub-resource group whose identifier is 1, the TUE attempts decoding, to obtain the second data sent by the 1st cooperation terminal apparatus. In this scenario, sub-resources in different sub-resource groups are set in frequency domain, and a part of same sub-resources in a sub-resource group are set in time domain. Therefore, the frequency selective fading can be resisted to some extent, and the burst interference can also be resisted.

In the foregoing embodiments, the sidelink time-frequency resources are obtained through division to implement time-frequency multiplexing, and there is no interference between the CUEs. The sidelink transmission resource in the sidelink transmission resource set is in a time-frequency multiplexing manner, and different sidelink time-frequency resources are used to transmit data to a same TUE. Using the i$^{th}$ cooperation terminal apparatus as an example, when the i$^{th}$ cooperation terminal apparatus CUE i correctly receives the first data sent by the network apparatus to the TUE, the i$^{th}$ cooperation terminal apparatus forwards the second data to the TUE in the time-frequency multiplexing manner on the i$^{th}$ sidelink transmission resource, to transmit the second data or the third data in the sidelink transmission phase in the cooperative transmission process.

Example 4: The sidelink transmission resource set may alternatively be in a spatial multiplexing manner, and space resources in different sidelink transmission resources are used to transmit data to a same TUE. The space resource may be mutually orthogonal reference signal sequences, and one CUE uses one space resource. Specifically, a code resource in the i$^{th}$ sidelink transmission resource includes an i$^{th}$ reference signal sequence, the i$^{th}$ reference signal sequence is different from a j$^{th}$ reference signal sequence, and the j$^{th}$ reference signal sequence is a code resource that is in the j$^{th}$ sidelink transmission resource and that is determined by the network apparatus. The $i^{th}$ reference signal sequence and the $j^{th}$ reference signal sequence may alternatively be a same reference signal sequence. This is not limited herein. The code resource in the $i^{th}$ sidelink transmission resource may be periodically or aperiodically configured by the network apparatus by using RRC signaling, or may be dynamically configured by the network apparatus by sending DCI. Alternatively, the $i^{th}$ cooperation terminal apparatus may independently select the $i^{th}$ reference signal sequence from a code resource set in the sidelink transmission resource set. This is not limited herein.

The following uses an example in which there are two pieces of data of cooperation terminal apparatuses. The $1^{st}$ reference signal sequence and the $2^{nd}$ reference signal sequence are used as a code resource set in a sidelink time-frequency resource set allocated by the network apparatus to a cooperative transmission group.

In a possible design, the $i^{th}$ sidelink transmission resource includes the $i^{th}$ reference signal sequence that is of the $i^{th}$ cooperation terminal apparatus and that is determined by the network apparatus, the $i^{th}$ reference signal sequence is a code resource that is in the $i^{th}$ sidelink transmission resource and that is determined by the network apparatus, the $i^{th}$ reference signal sequence is different from the $j^{th}$ reference signal sequence, and the $j^{th}$ reference signal sequence is a code resource that is in the $j^{th}$ sidelink transmission resource and that is determined by the network apparatus.

For example, the network apparatus may allocate a same sidelink time-frequency resource to the N cooperation terminal apparatuses, and the same sidelink time-frequency resource may be selected from the $1^{st}$ sidelink time-frequency resource to an $N^{th}$ sidelink time-frequency resource in the sidelink time-frequency resource set. For example, with reference to the foregoing example of the time-frequency multiplexing, the network apparatus may use the $1^{st}$ sidelink time-frequency resource as the same sidelink time-frequency resource allocated to the N cooperation terminal apparatuses. The following uses an example in which the $1^{st}$ sidelink time-frequency resource is the same sidelink time-frequency resource allocated. Further, the network apparatus may send a sidelink transmission resource set indication to the N cooperation terminal apparatuses and the target terminal apparatus, where a sidelink transmission resource set may include an $i^{th}$ sidelink time-frequency resource set and the code resource set.

In this case, after receiving the sidelink transmission resource set sent by the network apparatus, the $i^{th}$ cooperation terminal apparatus CUE i may further receive the $i^{th}$ reference signal sequence sent by the network apparatus to indicate the $i^{th}$ cooperation terminal apparatus to send the second data or the third data to the target terminal apparatus on the $1^{st}$ sidelink time-frequency resource based on the $i^{th}$ reference signal sequence.

Correspondingly, the TUE receives the $i^{th}$ reference signal sequence of the $i^{th}$ cooperation terminal apparatus sent by the network apparatus, and receives, on the $1^{st}$ sidelink time-frequency resource based on the $i^{th}$ reference signal sequence, the second data sent by the $i^{th}$ cooperation terminal apparatus.

In another possible implementation, each cooperation terminal apparatus receives the $1^{st}$ sidelink transmission resource to the $N^{th}$ sidelink transmission resource sent by the network apparatus, where the $i^{th}$ sidelink transmission resource belongs to the $1^{st}$ sidelink transmission resource to the $N^{th}$ sidelink transmission resource. Using the $i^{th}$ sidelink transmission resource as an example, the $i^{th}$ sidelink transmission resource includes an $i^{th}$ sidelink time-frequency resource and an $i^{th}$ code resource, and the $i^{th}$ sidelink transmission resource is a sidelink transmission resource determined by the network apparatus for the $i^{th}$ cooperation terminal apparatus.

In a possible implementation, the $i^{th}$ reference signal sequence is a DMRS generated based on the $i^{th}$ cooperation terminal apparatus. Therefore, the TUE may receive the code resource set determined by the network apparatus, may receive the $i^{th}$ code resource determined by the cooperation terminal apparatus, or may determine the $i^{th}$ reference signal sequence DMRS of the $i^{th}$ cooperation terminal apparatus based on the code resource set. This is not limited herein.

In this case, the $i^{th}$ cooperation terminal apparatus CUE i sends the second data or the third data to the target terminal apparatus on the $i^{th}$ sidelink time-frequency resource based on the $i^{th}$ reference signal sequence in the $i^{th}$ code resource.

Correspondingly, the TUE determines the $i^{th}$ reference signal sequence of the $i^{th}$ cooperation terminal apparatus, and receives, on the $i^{th}$ sidelink time-frequency resource based on the $i^{th}$ reference signal sequence, the second data sent by the $i^{th}$ cooperation terminal apparatus.

In still another possible implementation, after receiving the sidelink transmission resource set sent by the network apparatus, the $i^{th}$ cooperation terminal apparatus CUE i independently selects the $i^{th}$ reference signal sequence, and further sends, on the $i^{th}$ sidelink time-frequency resource, the second data or the third data to the target terminal apparatus by using the $i^{th}$ reference signal sequence.

Correspondingly, after receiving the $i^{th}$ sidelink transmission resource or the sidelink transmission resource set sent by the network apparatus, the target terminal apparatus TUE indicates a reference signal sequence DMRS of each CUE to the TUE. Using the $i^{th}$ cooperation terminal apparatus CUE i as an example, when the $i^{th}$ cooperation terminal apparatus receives the first data sent by the network apparatus to the TUE, the $i^{th}$ cooperation terminal apparatus CUE i sends the second data to the target terminal apparatus on the $1^{st}$ sidelink time-frequency resource by using the $i^{th}$ reference signal sequence DMRS.

In another possible design, reference signal sequences determined by the network apparatus for the N cooperation terminal apparatuses are the same. For example, the $i^{th}$ sidelink transmission resource includes an $i^{th}$ time-frequency resource and an $i^{th}$ reference signal sequence.

It should be noted that, because resources allocated to sidelink transmission links are the same, second data generated by the N CUEs needs to be the same, to avoid interference between signals including the second data that are sent by the N CUEs on the sidelink transmission links.

In a possible implementation, the network apparatus may send a DMRS of the TUE to the N CUEs as code resources of the CUE. In this case, using the $i^{th}$ cooperation terminal apparatus as an example, a sidelink transmission resource received by the $i^{th}$ cooperation terminal apparatus includes the $1^{st}$ time-frequency resource and the reference signal sequence of the TUE. A sidelink transmission resource received by another cooperation terminal apparatus is also the same. Therefore, each cooperation terminal apparatus may send the second data to the TUE on the $1^{st}$ time-frequency resource by using the reference signal sequence of the TUE. Correspondingly, the TUE may receive the $1^{st}$ time-frequency resource sent by the network apparatus, or may receive the $1^{st}$ time-frequency resource sent by the $i^{th}$ cooperation terminal apparatus. Further, the TUE may receive, on the $1^{st}$ time-frequency resource by using the reference signal sequence of the TUE, the second data sent by each cooperation terminal apparatus.

In the foregoing embodiment, the code resource set in the sidelink transmission resource set is divided, to implement spatial multiplexing of the code resources, and avoid interference between the CUEs. When correctly receiving the first data sent by the network apparatus to the TUE, each CUE uses the configured $i^{th}$ reference signal sequence or independently selects the $i^{th}$ reference signal sequence from the code resource set, to forward the second data to the TUE on the $i^{th}$ sidelink transmission resource in a spatial multiplexing manner.

In embodiments of this application, a solution in which the network apparatus determines the sidelink transmission resource set or the sidelink transmission resource for the cooperation terminal apparatus in the cooperative transmission process is determined. A plurality of sidelink transmission resource sets or the $i^{th}$ sidelink transmission resource of the $i^{th}$ cooperation terminal apparatus, and the time-frequency resource or the space resource in the $i^{th}$ sidelink transmission resource are determined, so that each CUE is configured to assist in transmitting a part or all of the first data sent by the network apparatus to the target terminal apparatus, to improve the performance of the cooperative transmission. In addition, the soft combination performed by the cooperation terminal apparatus in the sidelink transmission is added, to improve the receiving reliability of the TUE and the transmission efficiency in the system.

It may be understood that, in embodiments of this application, different examples may be used independently or in combination. These all fall within the protection scope of this application.

In the foregoing embodiments provided in this application, the methods provided in embodiments of this application are described from perspectives of the network apparatus, the terminal, and interaction between the network apparatus and the terminal. To implement functions in the methods provided in the foregoing embodiments of this application, the network apparatus and the terminal may include a hardware structure and/or a software module, and implement the foregoing functions by using the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

Figure 7:
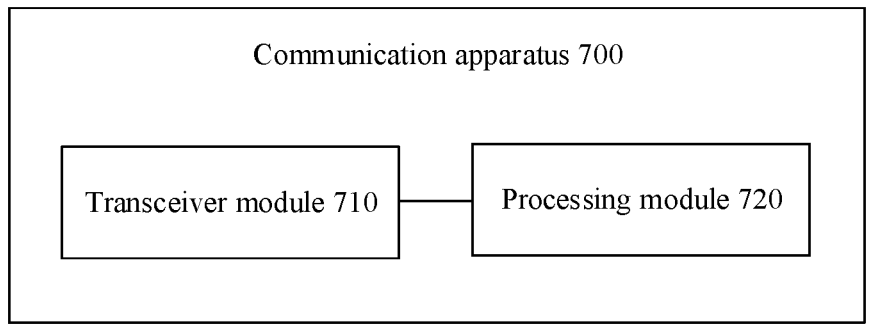
FIG. 7 is a schematic diagram of a structure of a communication apparatus according to an embodiment of this application.

Based on the same concept, an embodiment of this application provides a communication apparatus. FIG. 7 is a schematic diagram of a structure of another communication apparatus according to this embodiment of this application. The communication apparatus 700 includes a transceiver module 710 and a processing module 720. The communication apparatus may be configured to implement functions of the network apparatus in any one of the foregoing method embodiments. For example, the communication apparatus may be a network apparatus or a chip included in the network apparatus, or the communication apparatus may be another combined component, component, or the like having the functions of the foregoing network apparatus. When the communication apparatus is the network apparatus, the transceiver module may be a transceiver, and may include an antenna, a radio frequency circuit, and the like. The processing module may be a processor, for example, a central processing unit (central processing unit. CPU). When the communication apparatus is the component having the functions of the network apparatus, the transceiver module may be a radio frequency unit, and the processing module may be a processor. When the communication apparatus is a chip system, the transceiver module may be an input/output interface of the chip system, and the processing module may be a processor of the chip system.

When the communication apparatus is used as the network apparatus to perform the method embodiments shown in FIG. 2 to FIG. 4, the transceiver module 710 is configured to send an $i^{th}$ sidelink transmission resource to an $i^{th}$ cooperation terminal apparatus and a target terminal apparatus. Alternatively, the transceiver module 710 is configured to send first data to an $i^{th}$ cooperation terminal apparatus.

The processing module 720 is configured to determine the $i^{th}$ sidelink transmission resource of the $i^{th}$ cooperation terminal apparatus, where the $i^{th}$ cooperation terminal apparatus belongs to N cooperation terminals, and the $i^{th}$ sidelink transmission resource belongs to the $1^{st}$ sidelink transmission resource to an $N^{th}$ sidelink transmission resource, where i is an integer greater than or equal to 1 and less than or equal to N, and N is an integer greater than or equal to 1: the $i^{th}$ sidelink transmission resource is different from a $j^{th}$ sidelink transmission resource, the $j^{th}$ sidelink transmission resource is a sidelink transmission resource that is of a $j^{th}$ cooperation terminal apparatus and that is determined by the communication apparatus, and the $j^{th}$ cooperation terminal apparatus belongs to the N cooperation terminals, where j is an integer greater than or equal to 1 and less than or equal to N, and j is not equal to i; and the $i^{th}$ sidelink transmission resource is used by the $i^{th}$ cooperation terminal apparatus to send second data to the target terminal apparatus, the second data is determined based on first data sent by the communication apparatus to the $i^{th}$ cooperation terminal apparatus, and the N cooperation terminal apparatuses and the target terminal apparatus belong to a same cooperative transmission group.

Alternatively, the processing module 720 is configured to determine the $i^{th}$ sidelink transmission resource of N cooperation terminal apparatuses, where the $i^{th}$ sidelink transmission resource belongs to the $1^{st}$ sidelink transmission resource to an $N^{th}$ sidelink transmission resource, where i is an integer greater than or equal to 1 and less than or equal to N, and N is an integer greater than or equal to 1: the $i^{th}$ sidelink transmission resource is different from a $j^{th}$ sidelink transmission resource, where j is an integer greater than or equal to 1 and less than or equal to N, and j is not equal to i; and the $i^{th}$ sidelink transmission resource is a sidelink transmission resource of the N cooperation terminal apparatuses that is determined by the communication apparatus, the $i^{th}$ sidelink transmission resource is used by the N cooperation terminal apparatuses to send second data to the target terminal apparatus, the second data is determined based on first data sent by the communication apparatus to the $i^{th}$ cooperation terminal apparatus, and the N cooperation terminal apparatuses and the target terminal apparatus belong to a same cooperative transmission group.

Alternatively, the processing module 720 is configured to send a sidelink transmission resource set indication to N cooperation terminal apparatuses and the target terminal apparatus, where the N cooperation terminal apparatuses include the $i^{th}$ cooperation terminal apparatus, a sidelink transmission resource set is used by the $i^{th}$ cooperation terminal apparatus to select the $i^{th}$ sidelink transmission resource, the $i^{th}$ sidelink transmission resource belongs to the sidelink transmission resource set, the $i^{th}$ sidelink transmission resource is used by the $i^{th}$ cooperation terminal apparatus to send second data to the target terminal apparatus, and the second data is determined based on the first data, where i is an integer greater than or equal to 1 and less than or equal to N, and N is an integer greater than or equal to 1.

In a possible design, the $i^{th}$ sidelink transmission resource includes an $i^{th}$ time domain resource that is of the $i^{th}$ cooperation terminal apparatus and that is determined by the communication apparatus based on time domain resources, where the $i^{th}$ time domain resource is a time domain resource in the $i^{th}$ sidelink transmission resource, the $i^{th}$ time domain resource is different from a $j^{th}$ time domain resource, and the $j^{th}$ time domain resource is a time domain resource that is in the $j^{th}$ sidelink transmission resource and that is determined by the communication apparatus based on the time domain resources.

In a possible design, the $i^{th}$ sidelink transmission resource includes an $i^{th}$ frequency domain resource that is of the $i^{th}$ cooperation terminal apparatus and that is determined by the communication apparatus based on frequency domain resources, where the $i^{th}$ frequency domain resource is a frequency domain resource in the $i^{th}$ sidelink transmission resource, the $i^{th}$ frequency domain resource is different from a $j^{th}$ frequency domain resource, and the $j^{th}$ frequency domain resource is a frequency domain resource that is in the $j^{th}$ sidelink transmission resource and that is determined by the communication apparatus based on time domain resources.

In a possible design, the $i^{th}$ sidelink transmission resource includes an $i^{th}$ sub-resource group that is of the $i^{th}$ cooperation terminal apparatus and that is determined by the communication apparatus based on time domain resources and frequency domain resources, where the $i^{th}$ sub-resource group includes N sub-resources, a time-frequency resource in any one of the N sub-resources in the $i^{th}$ sub-resource group is different from a time-frequency resource in any one of N sub-resources in a $j^{th}$ sub-resource group, the $i^{th}$ sub-resource group is a time-frequency resource in the $i^{th}$ sidelink transmission resource, and the $j^{th}$ sub-resource group is a time-frequency resource that is in the $j^{th}$ sidelink transmission resource and that is determined by the communication apparatus.

In a possible design, the $i^{th}$ sidelink transmission resource includes an $i^{th}$ reference signal sequence that is of the $i^{th}$ cooperation terminal apparatus and that is determined by the communication apparatus, where the $i^{th}$ reference signal sequence is a code resource that is in the $i^{th}$ sidelink transmission resource and that is determined by the communication apparatus, the $i^{th}$ reference signal sequence is different from a $j^{th}$ reference signal sequence, and the $j^{th}$ reference signal sequence is a code resource that is in the $j^{th}$ sidelink transmission resource and that is determined by the communication apparatus.

It should be understood that the processing module 720 in the communication apparatus may be implemented by a processor or a processor-related circuit component, and the transceiver module 1010 may be implemented by a transceiver or a transceiver-related circuit component. Operations and/or functions of the modules in the communication apparatus are respectively used to implement corresponding procedures of the methods shown in FIG. 2 to FIG. 4. If the communication apparatus is used as the network apparatus in FIG. 2 to FIG. 4, the transceiver module 710 may be configured to perform step 2012, step 2023, step 3012, and step 3023, and the processing module 720 may be configured to perform step 2011, step 2021, step 2022, step 3011, step 3021, step 3022, step 4031, and step 4041. For brevity, examples are not enumerated one by one herein.

Figure 8:
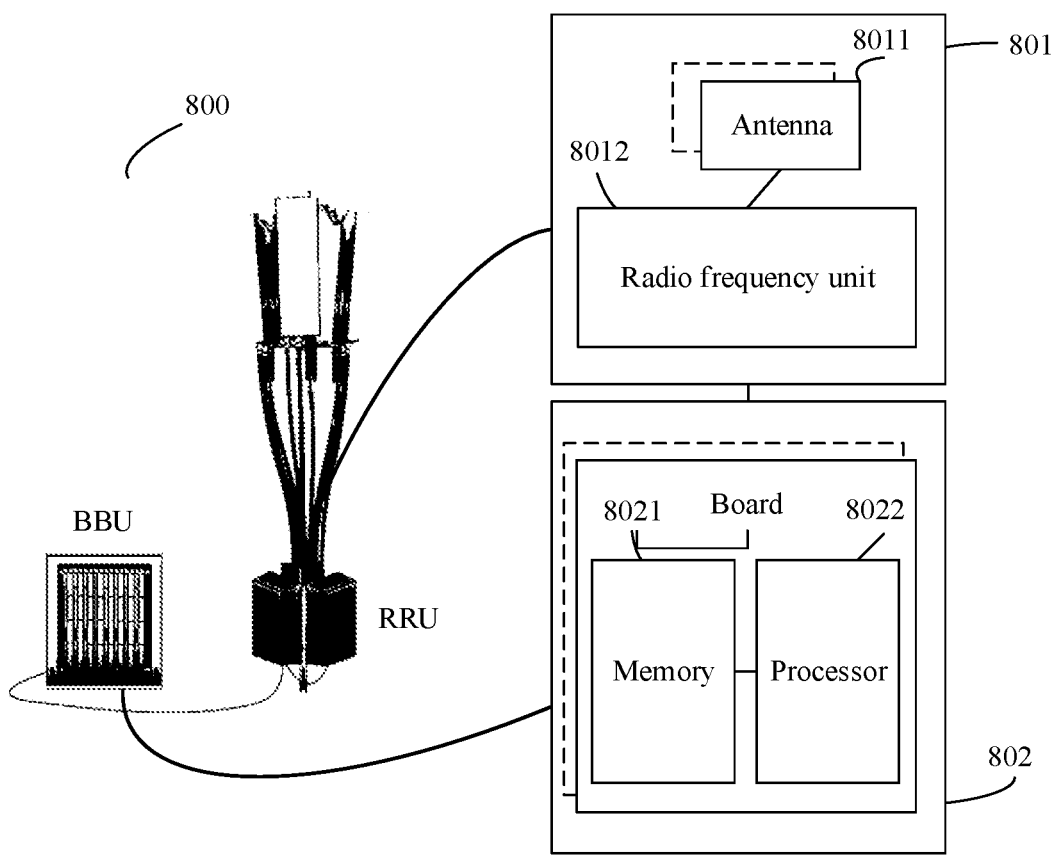
FIG. 8 is a schematic diagram of a structure of a communication apparatus according to an embodiment of this application.

FIG. 8 is a schematic diagram of another structure of another communication apparatus according to an embodiment of this application. The communication apparatus may be specifically a network apparatus, for example, a base station, configured to implement functions of the network apparatus in any one of the foregoing method embodiments.

The network apparatus includes one or more radio frequency units, such as a remote radio unit (remote radio unit. RRU) 801 and one or more baseband units (baseband unit. BBU) (which may also be referred to as digital units (digital unit. DU)) 802. The RRU 801 may be referred to as a transceiver unit, a transceiver machine, a transceiver circuit, a transceiver, or the like, and may include at least one antenna 8011 and a radio frequency unit 8012. The RRU 801 is mainly configured to send and receive a radio frequency signal and perform conversion between the radio frequency signal and a baseband signal. The BBU 802 is mainly configured to: perform baseband processing, control a base station, and so on. The RRU 801 and the BBU 802 may be physically disposed together, or may be physically separated, that is, in a distributed base station.

The BBU 802 is a control center of the base station, may also be referred to as a processing module, and is mainly configured to implement baseband processing functions such as channel coding, multiplexing, modulation, and spreading. For example, the BBU (the processing module) 802 may be configured to control the base station to perform an operation procedure related to the network apparatus in the foregoing method embodiments.

In an example, the BBU 802 may include one or more boards. A plurality of boards may jointly support a radio access network (for example, an LTE network) of a single access standard, or may separately support radio access networks (such as an LTE network, a 5G network, or another network) of different access standards. The BBU 802 may further include a memory 8021 and a processor 8022. The memory 8021 is configured to store necessary instructions and data. The processor 8022 is configured to control the base station to perform a necessary action, for example, is configured to control the base station to perform a sending operation in the foregoing method embodiments. The memory 8021 and the processor 8022 may serve one or more boards. In other words, the memory and processor may be separately set on each board. Alternatively: a plurality of boards may share a same memory and a same processor. In addition, a necessary circuit may be further disposed on each board.

Figure 9:
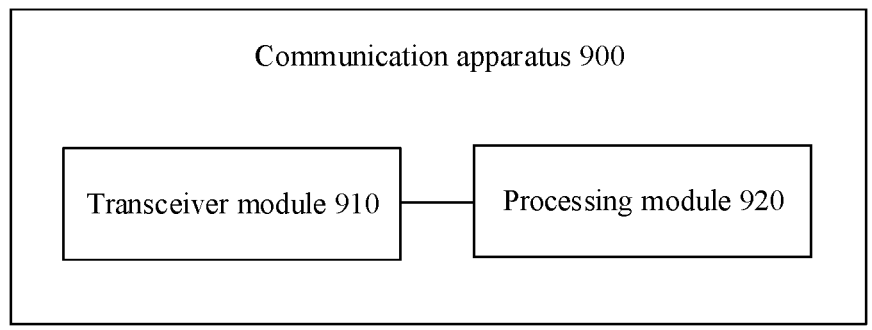
FIG. 9 is a schematic diagram of a structure of a communication apparatus according to an embodiment of this application.

An embodiment of this application further provides another communication apparatus. FIG. 9 is a schematic diagram of a structure of a communication apparatus according to an embodiment of this application. The communication apparatus 900 includes a transceiver module 910 and a processing module 920. The communication apparatus may be configured to implement functions of the first cooperation terminal apparatus or the target terminal apparatus in any one of the foregoing method embodiments. For example, the communication apparatus may be a terminal apparatus, for example, a handheld terminal apparatus or an in-vehicle terminal apparatus; or the communication apparatus may be a chip included in the terminal apparatus, or an apparatus including the terminal apparatus, for example, various types of vehicles. The communication apparatus may alternatively be another combined component, component, or the like having functions of the foregoing terminal apparatus. When the communication apparatus is the terminal apparatus, the transceiver module may be a transceiver, and may include an antenna, a radio frequency circuit, and the like. The processing module may be a processor, for example, a central processing unit (central processing unit, CPU). When the communication apparatus is the component having the functions of the terminal apparatus, the transceiver module may be a radio frequency unit, and the processing module may be a processor. When the communication apparatus is a chip system, the transceiver module may be an input/output interface of the chip system, and the processing module may be a processor of the chip system.

When the communication apparatus is used as an $i^{th}$ cooperation terminal apparatus to perform the method embodiments shown in FIG. 2 to FIG. 4, the transceiver module 910 is configured to receive a first sidelink transmission resource from a network apparatus, where the communication apparatus is the $i^{th}$ cooperation terminal apparatus in N cooperation terminals, and the first sidelink transmission resource is an $i^{th}$ sidelink transmission resource in the $1^{st}$ sidelink transmission resource to an $N^{th}$ sidelink transmission resource, where i is an integer greater than or equal to 1 and less than or equal to N, and N is an integer greater than or equal to 1: the $i^{th}$ sidelink transmission resource is different from a $j^{th}$ sidelink transmission resource, the $j^{th}$ sidelink transmission resource is a sidelink transmission resource of a $j^{th}$ cooperation terminal apparatus, and the $j^{th}$ cooperation terminal apparatus belongs to the N cooperation terminals, where j is an integer greater than or equal to 1 and less than or equal to N, and j is not equal to i; and the N cooperation terminal apparatuses and a target terminal apparatus belong to a same cooperative transmission group.

Alternatively, the transceiver module 910 is configured to receive an $i^{th}$ sidelink transmission resource from a network apparatus, where the communication apparatus is the $i^{th}$ cooperation terminal apparatus in N cooperation terminals, the $i^{th}$ sidelink transmission resource belongs to the $1^{st}$ sidelink transmission resource to an $N^{th}$ sidelink transmission resource, the $i^{th}$ sidelink transmission resource is a sidelink transmission resource of the N cooperation terminal apparatuses, and the $i^{th}$ sidelink transmission resource is different from a $j^{th}$ sidelink transmission resource, where j is an integer greater than or equal to 1 and less than or equal to N, j is not equal to i, i is an integer greater than or equal to 1 and less than or equal to N, and N is an integer greater than or equal to 1; and the N cooperation terminal apparatuses and a target terminal apparatus belong to a same cooperative transmission group.

Alternatively, the transceiver module 910 is configured to: receive first data from a network apparatus, and receive a sidelink transmission resource set indication from the network apparatus, where a sidelink transmission resource set includes the $1^{st}$ sidelink transmission resource to an $N^{th}$ sidelink transmission resource.

The processing module 920 is configured to send second data to the target terminal apparatus on the first sidelink transmission resource, where the second data is determined by the communication apparatus based on first data received from the network apparatus.

Alternatively, the processing module 920 is configured to send second data to the target terminal apparatus on the $i^{th}$ sidelink transmission resource, where the second data is determined based on the first data, and the $i^{th}$ sidelink transmission resource is selected by the communication apparatus from the sidelink transmission resource set.

The processing module 920 in the communication apparatus may be implemented by a processor or a processor-related circuit component, and the transceiver module 910 may be implemented by a transceiver or a transceiver-related circuit component. Operations and/or functions of the modules in the communication apparatus are respectively used to implement corresponding procedures of the methods shown in FIG. 2 to FIG. 4. If the communication apparatus is the $i^{th}$ cooperation terminal apparatus in FIG. 2 to FIG. 4, the transceiver module 910 may be configured to perform step 2014, step 2025, step 3014, step 3024, step 4014, and step 4024, and the processing module 920 may be configured to perform step 2024, step 3025, and step 4023.

If the communication apparatus is the target terminal apparatus, the transceiver module 910 may be configured to perform step 2014, step 2026, step 3026, step 4014, and step 4024, and the processing module 920 may be configured to perform step 2026, step 3026, and step 4025.

For specific execution processes of the processing module 920 and the transceiver module 910, refer to the description in the foregoing method embodiments. Division into modules in embodiments of this application is an example, is merely logical function division, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

When the communication apparatus is used as the target terminal apparatus to perform the method embodiments shown in FIG. 2 to FIG. 4, the transceiver module 910 is configured to receive an $i^{th}$ sidelink transmission resource of an $i^{th}$ cooperation terminal apparatus from a network apparatus, where the $i^{th}$ cooperation terminal apparatus belongs to N cooperation terminals, and the $i^{th}$ sidelink transmission resource belongs to the $1^{st}$ sidelink transmission resource to an $N^{th}$ sidelink transmission resource, where i is an integer greater than or equal to 1 and less than or equal to N, and N is an integer greater than or equal to 1: the $i^{th}$ sidelink transmission resource is different from a $j^{th}$ sidelink transmission resource, the $j^{th}$ sidelink transmission resource is a sidelink transmission resource of a $j^{th}$ cooperation terminal apparatus, and the $j^{th}$ cooperation terminal apparatus belongs to the N cooperation terminals, where j is an integer greater than or equal to 1 and less than or equal to N, and j is not equal to i; and the N cooperation terminal apparatuses and the target terminal apparatus belong to a same cooperative transmission group.

Alternatively, the transceiver module 910 is configured to receive an $i^{th}$ sidelink transmission resource from a network apparatus, where the $i^{th}$ sidelink transmission resource is a sidelink transmission resource of N cooperation terminal apparatuses, the $i^{th}$ sidelink transmission resource belongs to the $1^{st}$ sidelink transmission resource to an $N^{th}$ sidelink transmission resource, and the $i^{th}$ sidelink transmission resource is different from a $j^{th}$ sidelink transmission resource, where i is an integer greater than or equal to 1 and less than or equal to N, j is an integer greater than or equal to 1 and less than or equal to N, j is not equal to i, and N is an integer greater than or equal to 1; and the N cooperation terminal apparatuses and the target terminal apparatus belong to a same cooperative transmission group.

Alternatively, the transceiver module 910 is configured to: receive first data from a network apparatus, and receive a sidelink transmission resource set from the network apparatus, where the sidelink transmission resource set includes the $1^{st}$ sidelink transmission resource to the $N^{th}$ sidelink transmission resource.

The processing module 920 is configured to receive second data from the i$^{th}$ cooperation terminal apparatus on the i$^{th}$ sidelink transmission resource, where the second data is determined by the i$^{th}$ cooperation terminal apparatus based on first data received from the network apparatus.

Alternatively, the processing module 920 is configured to receive, on a sidelink transmission resource in the sidelink transmission resource set, second data sent by the i$^{th}$ cooperation terminal apparatus, where the second data is determined by the i$^{th}$ cooperation terminal apparatus based on first data, and the i$^{th}$ cooperation terminal apparatus belongs to the N cooperation terminal apparatuses.

Figure 10:
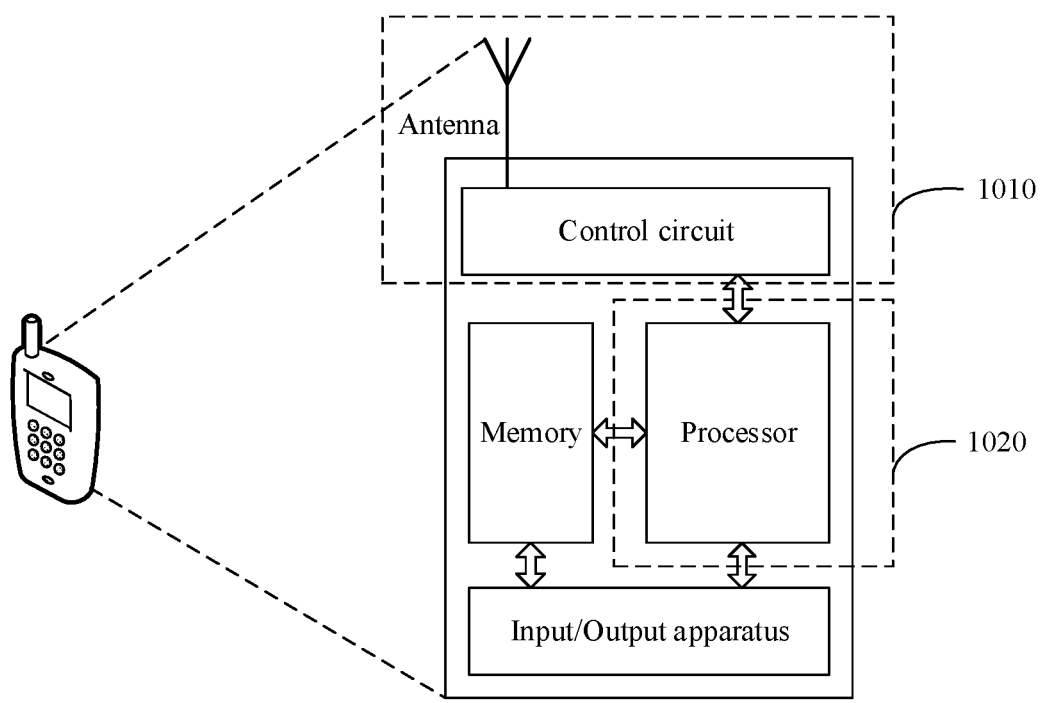
FIG. 10 is a schematic diagram of a structure of a communication apparatus according to an embodiment of this application.

FIG. 10 is a schematic diagram of another structure of a communication apparatus according to an embodiment of this application. The communication apparatus may be specifically a terminal apparatus. For ease of understanding and illustration, an example in which the terminal apparatus is a mobile phone is used in FIG. 8. As shown in FIG. 8, the terminal apparatus includes a processor, and may further include a memory. In addition, the terminal apparatus may further include a radio frequency circuit, an antenna, an input/output apparatus, and the like. The processor is mainly configured to: process a communication protocol and communication data, control the terminal apparatus, execute a software program, process data of the software program, and so on. The memory is mainly configured to store the software program and the data. The radio frequency circuit is mainly configured to: convert a baseband signal and a radio frequency signal, and process the radio frequency signal. The antenna is mainly configured to send and receive the radio frequency signal in an electromagnetic wave form. The input/output apparatus, such as a touchscreen, a display screen, or a keyboard, is mainly configured to receive data input by a user and output data to the user. It should be noted that some types of terminal apparatuses may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in the electromagnetic wave form through the antenna. When data is sent to the terminal apparatus, the radio frequency circuit receives a radio frequency signal through the antenna, converts the radio frequency signal into a baseband signal, and outputs the baseband signal to the processor. The processor converts the baseband signal into data, and processes the data. For ease of description. FIG. 8 shows only one memory and only one processor. In an actual terminal apparatus product, there may be one or more processors and one or more memories. The memory may also be referred to as a storage medium, a storage apparatus, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver module of the terminal apparatus, and the processor that has a processing function may be considered as a processing module of the terminal apparatus. That is, the terminal apparatus includes the transceiver module and the processing module. The transceiver module may also be referred to as a transceiver, a transceiver machine, a transceiver apparatus, or the like. The processing module may also be referred to as a processor, a processing board, a processing module, a processing apparatus, or the like. Optionally, a component for implementing the receiving function in the transceiver module may be considered as a receiving module, and a component for implementing the sending function in the transceiver module may be considered as a sending module. That is, the transceiver module includes the receiving module and the sending module. The transceiver module may also be sometimes referred to as a transceiver machine, a transceiver, a transceiver circuit, or the like. The receiving module may also be sometimes referred to as a receiver machine, a receiver, a receive circuit, or the like. The sending module may also be sometimes referred to as a transmitter machine, a transmitter, a transmit circuit, or the like. It should be understood that the transceiver module is configured to perform the sending operation and the receiving operation of the terminal apparatus in the foregoing method embodiments, and the processing module is configured to perform an operation other than the sending operation and the receiving operation of the terminal apparatus in the foregoing method embodiments.

An embodiment of this application further provides a chip system, including a processor, where the processor is coupled to a memory. The memory is configured to store a program or instructions. When the program or the instructions is/are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system-on-a-chip (SoC), a central processing unit (CPU), a network processor (NP), a digital signal processor (DSP), a micro controller unit (MCU), a programmable controller (PLD), or another integrated chip.

It should be understood that steps in the foregoing method embodiments may be implemented by using a hardware integrated logic circuit in the processor or instructions in a form of software. The steps of the methods disclosed with reference to embodiments of this application may be directly performed and completed by a hardware processor, or may be performed and completed by using a combination of hardware in the processor and a software module.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a network apparatus and at least one terminal apparatus.

It should be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (read-only memory. ROM), a programmable read-only memory (programmable ROM. PROM), an erasable programmable read-only memory (erasable PROM. EPROM), an electrically erasable programmable read-only memory (electrically EPROM. EEPROM), or a flash memory. The volatile memory may be a random access memory (random access memory. RAM) that is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another appropriate type.

It should be understood that sequence numbers of the foregoing processes do not mean execution sequences in various embodiments of this application. The execution sequences of the processes should be determined based on functions and internal logic of the processes, and should not be construed as any limitation on implementation processes of embodiments of the present invention.

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in an electrical form, a mechanical form, or other forms.

The units described as separate parts may or may not be physically separate, and parts displayed as units may or may not be physical units, and may be located at one position, or may be distributed on a plurality of network units. Some or all of the units may be selected based on an actual requirement to achieve the objectives of the solutions of embodiments.

In addition, the functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions provided in embodiments of this application essentially, or the part contributing to the prior art, or some of the technical solutions may be implemented in a form of a software product. The computer software product is stored in a storage medium, and includes several instructions for instructing a computer apparatus (which may be a personal computer, a server, a network apparatus, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a network apparatus, an $i^{th}$ sidelink transmission resource of an $i^{th}$ cooperation terminal apparatus, wherein the $i^{th}$ cooperation terminal apparatus belongs to N cooperation terminals, and the $i^{th}$ sidelink transmission resource belongs to the $1^{st}$ sidelink transmission resource to an $N^{th}$ sidelink transmission resource, wherein i is an integer greater than or equal to 1 and less than or equal to N, and N is an integer greater than or equal to 1: the $i^{th}$ sidelink transmission resource is different from a $j^{th}$ sidelink transmission resource, the $j^{th}$ sidelink transmission resource is a sidelink transmission resource that is of a $j^{th}$ cooperation terminal apparatus and that is determined by the network apparatus, and the $j^{th}$ cooperation terminal apparatus belongs to the N cooperation terminals, wherein j is an integer greater than or equal to 1 and less than or equal to N, and j is not equal to i; and the $i^{th}$ sidelink transmission resource is used by the $i^{th}$ cooperation terminal apparatus to send second data to a target terminal apparatus, the second data is determined based on first data sent by the network apparatus to the $i^{th}$ cooperation terminal apparatus, and the N cooperation terminal apparatuses and the target terminal apparatus belong to a same cooperative transmission group; and sending, by the network apparatus, the $i^{th}$ sidelink transmission resource to the $i^{th}$ cooperation terminal apparatus and the target terminal apparatus.

2. The method according to claim 1, wherein the method further comprises: determining, by the network apparatus, a sidelink transmission resource set, wherein the sidelink transmission resource set comprises the $1^{st}$ sidelink transmission resource to the $N^{th}$ sidelink transmission resource; and sending, by the network apparatus, a sidelink transmission resource set indication to the N cooperation terminal apparatuses and the target terminal apparatus; and the determining, by a network apparatus, an $i^{th}$ sidelink transmission resource of an $i^{th}$ cooperation terminal apparatus comprises: determining, by the network apparatus, the $i^{th}$ sidelink transmission resource from the sidelink transmission resource set.

3. The method according to claim 1, wherein the $i^{th}$ sidelink transmission resource comprises an $i^{th}$ time domain resource that is of the $i^{th}$ cooperation terminal apparatus and that is determined by the network apparatus based on time domain resources, wherein the $i^{th}$ time domain resource is a time domain resource in the $i^{th}$ sidelink transmission resource, the $i^{th}$ time domain resource is different from a $j^{th}$ time domain resource, and the $j^{th}$ time domain resource is a time domain resource that is in the $j^{th}$ sidelink transmission resource and that is determined by the network apparatus based on the time domain resources.

4. The method according to claim 1, wherein the $i^{th}$ sidelink transmission resource comprises an $i^{th}$ frequency domain resource that is of the $i^{th}$ cooperation terminal apparatus and that is determined by the network apparatus based on frequency domain resources, wherein the $i^{th}$ frequency domain resource is a frequency domain resource in the $i^{th}$ sidelink transmission resource, the $i^{th}$ frequency domain resource is different from a $j^{th}$ frequency domain resource, and the $j^{th}$ frequency domain resource is a frequency domain resource that is in the $j^{th}$ sidelink transmission resource and that is determined by the network apparatus based on time domain resources.

5. The method according to claim 1, wherein the $i^{th}$ sidelink transmission resource comprises an $i^{th}$ sub-resource group that is of the $i^{th}$ cooperation terminal apparatus and that is determined by the network apparatus based on time domain resources and frequency domain resources, wherein the $i^{th}$ sub-resource group comprises N sub-resources, a time-frequency resource in any one of the N sub-resources in the $i^{th}$ sub-resource group is different from a time-frequency resource in any one of N sub-resources in a $j^{th}$ sub-resource group, the $i^{th}$ sub-resource group is a time-frequency resource in the $i^{th}$ sidelink transmission resource, and the $j^{th}$ sub-resource group is a time-frequency resource that is in the $j^{th}$ sidelink transmission resource and that is determined by the network apparatus.

6. The method according to claim 1, wherein the $i^{th}$ sidelink transmission resource comprises an $i^{th}$ reference signal sequence that is of the $i^{th}$ cooperation terminal apparatus and that is determined by the network apparatus, wherein the $i^{th}$ reference signal sequence is a code resource that is in the $i^{th}$ sidelink transmission resource and that is determined by the network apparatus, the $i^{th}$ reference signal sequence is different from a $j^{th}$ reference signal sequence, and the $j^{th}$ reference signal sequence is a code resource that is in the $j^{th}$ sidelink transmission resource and that is determined by the network apparatus.

7. The method according to claim 1, wherein the $i^{th}$ sidelink transmission resource further comprises an $i^{th}$ soft combination indication field, wherein the $i^{th}$ soft combination indication field is used to indicate whether the second data sent by the $i^{th}$ cooperation terminal apparatus to the target terminal apparatus is data on which the target terminal apparatus is to perform soft combination.

8. The method according to claim 1, wherein the method further comprises:

determining, by the network apparatus, an $i^{th}$ soft combination indication field of the $i^{th}$ cooperation terminal apparatus, wherein the $i^{th}$ soft combination indication field is used to indicate whether the second data sent by the $i^{th}$ cooperation terminal apparatus to the target terminal apparatus is data on which the target terminal apparatus is to perform soft combination.

9. The method according to claim 7, wherein the $i^{th}$ soft combination indication field comprises at least one of a first time offset and a second time offset, wherein the first time offset is used to indicate that, if the target terminal apparatus receives the second data from the $i^{th}$ cooperation terminal apparatus at a second moment obtained by increasing a first moment by the time offset, the second data is determined as the data on which the target terminal apparatus is to perform soft combination, wherein the first moment is a moment of receiving sidelink control signaling sent by the $i^{th}$ cooperation terminal apparatus; and the second time offset is used to indicate that, if the target terminal apparatus receives the second data from the $i^{th}$ cooperation terminal apparatus at a third moment obtained by increasing the first moment by the second time offset, the second data is determined as data on which the target terminal apparatus is not to perform soft combination.

10. The method according to claim 1, wherein the $i^{th}$ sidelink transmission resource comprises a first transmission resource and a second transmission resource, wherein the first transmission resource is used to indicate that the second data sent by the $i^{th}$ cooperation terminal apparatus to the target terminal apparatus on the first transmission resource is data on which the target terminal apparatus is to perform soft combination, and the second transmission resource is used to indicate that the second data sent by the $i^{th}$ cooperation terminal apparatus to the target terminal apparatus on the second transmission resource is data on which the target terminal apparatus is not to perform soft combination.

11. The method according to claim 10, wherein the first transmission resource comprises one or more of the following: a first time-frequency resource and a first code resource; and the second transmission resource comprises one or more of the following: a second time-frequency resource and a second code resource.

12. The method according to claim 1, wherein the $i^{th}$ sidelink transmission resource further comprises an $i^{th}$ redundancy version set, wherein the $i^{th}$ redundancy version set comprises at least one redundancy version, the redundancy version set is used by the $i^{th}$ cooperation terminal apparatus to determine a first redundancy version in the redundancy version set, the first redundancy version is used by the $i^{th}$ cooperation terminal apparatus to determine, based on the first redundancy version, a start location at which the $i^{th}$ cooperation terminal apparatus is to send third data on which soft combination needs to be performed, and the third data is generated by the $i^{th}$ cooperation terminal based on the first data received from the network apparatus.

13. The method according to claim 12, wherein the $i^{th}$ sidelink transmission resource further comprises the $i^{th}$ redundancy version set, wherein the $i^{th}$ redundancy version set comprises the at least one redundancy version, the redundancy version is used by the $i^{th}$ cooperation terminal apparatus to determine a second redundancy version based on an intra-group identifier of the $i^{th}$ cooperation terminal apparatus in the cooperative transmission group, the second redundancy version is used by the $i^{th}$ cooperation terminal apparatus to determine, based on the second redundancy version, the start location at which the $i^{th}$ cooperation terminal apparatus is to send the third data on which the soft combination needs to be performed, and the third data is generated by the $i^{th}$ cooperation terminal apparatus based on the first data received from the network apparatus.

14. A communication apparatus, comprising:
   a processor;
   a transceiver; and
   a memory, wherein the memory stores instructions; and when the processor executes the instructions, the apparatus is enabled to perform steps comprising:
      determining, by a network apparatus, an $i^{th}$ sidelink transmission resource of an $i^{th}$ cooperation terminal apparatus, wherein the $i^{th}$ cooperation terminal apparatus belongs to N cooperation terminals, and the $i^{th}$ sidelink transmission resource belongs to the $1^{st}$ sidelink transmission resource to an $N^{th}$ sidelink transmission resource, wherein i is an integer greater than or equal to 1 and less than or equal to N, and N is an integer greater than or equal to 1: the $i^{th}$ sidelink transmission resource is different from a $j^{th}$ sidelink transmission resource, the $j^{th}$ sidelink transmission resource is a sidelink transmission resource that is of a $j^{th}$ cooperation terminal apparatus and that is determined by the network apparatus, and the $j^{th}$ cooperation terminal apparatus belongs to the N cooperation terminals, wherein j is an integer greater than or equal to 1 and less than or equal to N, and j is not equal to i; and the $i^{th}$ sidelink transmission resource is used by the $i^{th}$ cooperation terminal apparatus to send second data to a target terminal apparatus, the second data is determined based on first data sent by the network apparatus to the $i^{th}$ cooperation terminal apparatus, and the N cooperation terminal apparatuses and the target terminal apparatus belong to a same cooperative transmission group; and
      sending, by the network apparatus, the $i^{th}$ sidelink transmission resource to the $i^{th}$ cooperation terminal apparatus and the target terminal apparatus.

15. A communication method, comprising:
   receiving, by a first cooperation terminal apparatus, a first sidelink transmission resource from a network apparatus, wherein the first cooperation terminal apparatus is an $i^{th}$ cooperation terminal apparatus in N cooperation terminals, and the first sidelink transmission resource is an $i^{th}$ sidelink transmission resource in the $1^{st}$ sidelink transmission resource to an $N^{th}$ sidelink transmission resource, wherein i is an integer greater than or equal to 1 and less than or equal to N, and N is an integer greater than or equal to 1: the $i^{th}$ sidelink transmission resource is different from a $j^{th}$ sidelink transmission resource, the $j^{th}$ sidelink transmission resource is a sidelink transmission resource of a $j^{th}$ cooperation terminal apparatus, and the $j^{th}$ cooperation terminal apparatus belongs to the N cooperation terminals, wherein j is an integer greater than or equal to 1 and less than or equal to N, and j is not equal to i; and the N cooperation terminal apparatuses and a target terminal apparatus belong to a same cooperative transmission group; and
   sending, by the first cooperation terminal apparatus, second data to the target terminal apparatus on the first sidelink transmission resource, wherein the second data is determined by the first cooperation terminal apparatus based on first data received from the network apparatus.

16. The method according to claim 14, wherein the method further comprises:
   receiving, by the first cooperation terminal apparatus, a sidelink transmission resource set indication from the network apparatus, wherein a sidelink transmission resource set comprises the $1^{st}$ sidelink transmission resource to the $N^{th}$ sidelink transmission resource, and the first sidelink transmission resource is the $i^{th}$ sidelink transmission resource in the sidelink transmission resource set.

17. The method according to claim 14, wherein the method further comprises:
   sending, by the first cooperation terminal apparatus, first indication information to the target terminal apparatus, wherein the first indication information is used to indicate that the first cooperation terminal apparatus does not correctly decode the first data.

18. The method according to claim 14, wherein a time domain resource in the $i^{th}$ sidelink transmission resource is an $i^{th}$ time domain resource, the $i^{th}$ time domain resource is different from a $j^{th}$ time domain resource, and the $j^{th}$ time domain resource is a time domain resource that is in the $j^{th}$ sidelink transmission resource and that is determined by the network apparatus based on time domain resources.

19. The method according to claim 14, wherein a frequency domain resource in the $i^{th}$ sidelink transmission resource is an $i^{th}$ frequency domain resource, the $i^{th}$ frequency domain resource is different from a $j^{th}$ frequency domain resource, and the $j^{th}$ frequency domain resource is a frequency domain resource that is in the $j^{th}$ sidelink transmission resource and that is determined by the network apparatus based on time domain resources.

20. The method according to claim 14, wherein a time-frequency resource in the $i^{th}$ sidelink transmission resource is an $i^{th}$ sub-resource group, the $i^{th}$ sub-resource group comprises N sub-resources, a time-frequency resource in any one of the N sub-resources in the $i^{th}$ sub-resource group is different from a time-frequency resource in any one of N sub-resources in a $j^{th}$ sub-resource group, the $i^{th}$ sub-resource group is the time-frequency resource in the $i^{th}$ sidelink transmission resource, and the $j^{th}$ sub-resource group is a time-frequency resource that is in the $j^{th}$ sidelink transmission resource and that is determined by the network apparatus.

* * * * *

UNITED STATES PATENT AND TRADEMARK OFFICE
CERTIFICATE OF CORRECTION

PATENT NO.       : 12,267,845 B2
APPLICATION NO.  : 17/703728
DATED            : April 1, 2025
INVENTOR(S)      : Liu et al.

Page 1 of 1

It is certified that error appears in the above-identified patent and that said Letters Patent is hereby corrected as shown below:

In the Claims

Claim 1: Column 91, Line 1: "greater than or equal to 1: the $i^{th}$ sidelink transmission" should read as -- greater than or equal to 1; the $i^{th}$ sidelink transmission --.

Claim 14: Column 93, Line 43: "is an integer greater than or equal to 1: the $i^{th}$ sidelink" should read as -- is an integer greater than or equal to 1; the $i^{th}$ sidelink --.

Claim 15: Column 94, Line 6: "greater than or equal to 1: the $i^{th}$ sidelink transmission" should read as -- greater than or equal to 1; the $i^{th}$ sidelink transmission --.

Signed and Sealed this
Fifteenth Day of July, 2025

Coke Morgan Stewart
*Acting Director of the United States Patent and Trademark Office*